United States Patent
Ikriannikov et al.

(10) Patent No.: US 9,627,125 B2
(45) Date of Patent: Apr. 18, 2017

(54) VOLTAGE CONVERTER INDUCTOR HAVING A NONLINEAR INDUCTANCE VALUE

(71) Applicant: Volterra Semiconductor LLC, San Jose, CA (US)

(72) Inventors: Alexandr Ikriannikov, Castro Valley, CA (US); Ognjen Djekic, Fremont, CA (US)

(73) Assignee: Volterra Semiconductor LLC, San Jose, CA (US)

( * ) Notice: Subject to any disclaimer, the term of this patent is extended or adjusted under 35 U.S.C. 154(b) by 200 days.

(21) Appl. No.: 14/486,175

(22) Filed: Sep. 15, 2014

(65) Prior Publication Data

US 2015/0002129 A1 Jan. 1, 2015

Related U.S. Application Data

(62) Division of application No. 12/405,146, filed on Mar. 16, 2009, now Pat. No. 8,836,463.

(Continued)

(51) Int. Cl.
*H02M 3/158* (2006.01)
*G05F 1/32* (2006.01)
(Continued)

(52) U.S. Cl.
CPC ............... *H01F 27/24* (2013.01); *G05F 1/32* (2013.01); *G05F 1/325* (2013.01); *G05F 1/33* (2013.01);
(Continued)

(58) Field of Classification Search
CPC ... G05F 1/32; G05F 1/325; G05F 1/33; G05F 1/333; G05F 1/38; H02M 3/1584; H02M 3/158
(Continued)

(56) References Cited

U.S. PATENT DOCUMENTS 2,170,446 A 8/1939 Edwards
2,298,935 A 10/1942 Freeman
(Continued)

FOREIGN PATENT DOCUMENTS

DE 922 423 1/1955
DE 26 53 568 6/1978
(Continued)

OTHER PUBLICATIONS

Sun et al., "Light Load Efficiency Improvement for Laptop VRs", APEC 2007, pp. 120-126, Feb. 25, 2007-Mar. 1, 2007.
(Continued)

*Primary Examiner* — Timothy J Dole
*Assistant Examiner* — Ishrat Jamali
(74) *Attorney, Agent, or Firm* — Lathrop & Gage LLP

(57) ABSTRACT

Single phase inductors have non-linear inductance values, and M-phase coupled inductors having non-linear leakage inductance values. Each inductor includes, for example, at least one of the following: a saturable magnetic element, a gap of non-uniform thickness, a core formed of a distributed gap material, or a non-homogeneous core. A DC-to-DC converter includes an inductor having a non-linear inductance value, a switching subsystem, and an output filer. Another DC-to-DC converter includes an output filter, a coupled inductor having non-linear leakage inductance values, and switching subsystems.

13 Claims, 37 Drawing Sheets

Related U.S. Application Data

(60) Provisional application No. 61/046,736, filed on Apr. 21, 2008, provisional application No. 61/036,836, filed on Mar. 14, 2008.

(51) Int. Cl.
| | |
|---|---|
| *H01F 27/24* | (2006.01) |
| *G05F 1/38* | (2006.01) |
| *G05F 1/325* | (2006.01) |
| *G05F 1/33* | (2006.01) |
| *H01F 3/14* | (2006.01) |
| *H01F 38/02* | (2006.01) |
| *H02M 7/00* | (2006.01) |

(52) U.S. Cl.
CPC ............... *G05F 1/38* (2013.01); *H01F 3/14* (2013.01); *H01F 38/023* (2013.01); *H02M 3/158* (2013.01); *H02M 3/1584* (2013.01); *H02M 7/003* (2013.01); *H01F 2038/026* (2013.01)

(58) Field of Classification Search
USPC ................. 336/212, 220–223, 233–234, 178
See application file for complete search history.

(56) References Cited

U.S. PATENT DOCUMENTS

| | | | |
|---|---|---|---|
| 2,403,393 A | 7/1946 | Peterson | |
| 3,396,342 A | 8/1968 | Feinberg | |
| 3,447,068 A | 5/1969 | Hart | |
| 3,448,421 A | 6/1969 | Berg et al. | |
| 3,671,847 A | 6/1972 | Shibano | |
| 3,878,495 A | 4/1975 | Thomas | |
| 4,282,567 A * | 8/1981 | Voigt | H01F 27/255 336/178 |
| 4,390,819 A * | 6/1983 | Babcock | H04N 3/18 315/411 |
| 4,455,545 A | 6/1984 | Shelly | |
| 4,531,085 A | 7/1985 | Mesenhimer | |
| 4,543,554 A | 9/1985 | Muellenheim et al. | |
| 4,829,232 A | 5/1989 | Erickson, Jr. | |
| 4,935,710 A | 6/1990 | Yamakazi et al. | |
| 5,123,989 A | 6/1992 | Horiishi et al. | |
| 5,161,098 A | 11/1992 | Balakrishnan | |
| 5,350,980 A | 9/1994 | Dye et al. | |
| 5,436,818 A | 7/1995 | Barthold | |
| 5,469,334 A | 11/1995 | Balakrishnan | |
| 5,525,951 A | 6/1996 | Sunano et al. | |
| 5,568,111 A | 10/1996 | Metsler | |
| 5,574,420 A | 11/1996 | Roy et al. | |
| 5,731,666 A | 3/1998 | Folker et al. | |
| 5,737,203 A | 4/1998 | Barrett | |
| 6,304,460 B1 | 10/2001 | Cuk | |
| 6,342,778 B1 | 1/2002 | Catalano et al. | |
| 6,348,848 B1 | 2/2002 | Herbert | |
| 6,356,179 B1 | 3/2002 | Yamada | |
| 6,362,986 B1 | 3/2002 | Schultz et al. | |
| 6,388,896 B1 | 5/2002 | Cuk | |
| 6,549,111 B1 | 4/2003 | DeGraff | |
| 6,578,253 B1 | 6/2003 | Herbert | |
| 6,714,428 B2 | 3/2004 | Huang et al. | |
| 6,737,951 B1 | 5/2004 | Decristofaro et al. | |
| 6,774,758 B2 | 8/2004 | Gokhale et al. | |
| 6,784,644 B2 | 8/2004 | Xu et al. | |
| 6,856,230 B2 | 2/2005 | Lu | |
| 6,903,648 B2 | 6/2005 | Baumann et al. | |
| 6,922,883 B2 | 8/2005 | Gokhale et al. | |
| 6,965,290 B2 | 11/2005 | Gokhale et al. | |
| 6,980,077 B1 | 12/2005 | Chandrasekaran et al. | |
| 7,038,924 B2 | 5/2006 | Wu | |
| 7,199,695 B1 * | 4/2007 | Zhou | H01F 37/00 336/212 |
| 7,233,132 B1 | 6/2007 | Dong et al. | |
| 7,239,530 B1 | 7/2007 | Djekic et al. | |
| 7,248,139 B1 | 7/2007 | Podlisk et al. | |
| 7,259,648 B2 | 8/2007 | Matsutani et al. | |
| 7,280,025 B2 | 10/2007 | Sano | |
| 7,292,128 B2 | 11/2007 | Hanley | |
| 7,352,269 B2 | 4/2008 | Li et al. | |
| 7,425,883 B2 | 9/2008 | Matsutani et al. | |
| 7,498,920 B2 | 3/2009 | Sullivan | |
| 7,821,375 B2 * | 10/2010 | Dong | H01F 37/00 336/200 |
| 7,880,577 B1 | 2/2011 | Glaser | |
| 8,836,463 B2 | 9/2014 | Ikriannikov et al. | |
| 2002/0067234 A1 | 6/2002 | Kung | |
| 2002/0093413 A1 | 7/2002 | Shin'ei | |
| 2004/0113741 A1 * | 6/2004 | Li | H01F 17/04 336/212 |
| 2005/0024179 A1 | 2/2005 | Chandrasekaran et al. | |
| 2006/0145800 A1 | 7/2006 | Dadafshar et al. | |
| 2006/0145804 A1 | 7/2006 | Matsutani et al. | |
| 2006/0158297 A1 | 7/2006 | Sutardja | |
| 2006/0197510 A1 | 9/2006 | Chandrasekaran | |
| 2007/0175701 A1 | 8/2007 | Xu et al. | |
| 2007/0176726 A1 * | 8/2007 | Xu | H02M 3/1584 336/229 |
| 2008/0012674 A1 | 1/2008 | Sano et al. | |
| 2008/0024259 A1 | 1/2008 | Chandrasekaran et al. | |
| 2008/0054874 A1 * | 3/2008 | Chandrasekaran | H01F 37/00 323/362 |
| 2008/0150666 A1 | 6/2008 | Chandrasekaran et al. | |
| 2008/0205098 A1 | 8/2008 | Xu et al. | |
| 2008/0246577 A1 | 10/2008 | Sullivan et al. | |
| 2008/0303624 A1 | 12/2008 | Yamada et al. | |
| 2009/0179723 A1 | 7/2009 | Ikriannikov et al. | |
| 2009/0237197 A1 | 9/2009 | Ikriannikov et al. | |
| 2010/0007453 A1 | 1/2010 | Yan et al. | |
| 2010/0007457 A1 | 1/2010 | Yan et al. | |
| 2010/0013587 A1 | 1/2010 | Yan et al. | |
| 2010/0271161 A1 | 10/2010 | Yan et al. | |
| 2012/0134180 A1 | 5/2012 | Watanabe et al. | |

FOREIGN PATENT DOCUMENTS

| | | |
|---|---|---|
| DE | 3123006 | 1/1983 |
| DE | 37 03 561 | 8/1988 |
| DE | 101 05 087 | 8/2001 |
| EP | 0 012 629 | 6/1980 |
| EP | 0 142 207 | 5/1985 |
| EP | 0 577 334 | 1/1994 |
| EP | 0 755 060 | 1/1997 |
| EP | 1 835 604 | 9/2007 |
| JP | 60-015908 | 1/1985 |
| JP | 11 144983 | 5/1999 |
| JP | 11 307369 | 11/1999 |
| JP | 2002057049 | 2/2002 |
| JP | 2005 310865 | 11/2005 |
| WO | WO 2006/026674 | 3/2006 |

OTHER PUBLICATIONS

Dong et al., Twisted Core Coupled Inductors for Microprocessor Voltage Regulators, Power Electronics Specialist Conference, pp. 2386-2392, Jun. 17-21, 2007.
Dong et al, The Short Winding Path Coupled Inductor Voltage Regulators, Applied Power Electronics Conference and Exposition, pp. 1446-1452, Feb. 24-28, 2008.
Dong et al, Evaluation of Coupled Inductor Voltage Regulators, Applied Power Electronics Conference and Exposition, pp. 831-837, Feb. 24-28, 2008.
Panasonic, Power Choke Coil data sheet, 2 pages, Jan. 2008.
Vishay, Low Profile, High Current IHLP Inductor data sheet, 3 pages.
Micrometals, Inc., Composite Cores parts listing, 1 page, accessed via the internet at http://www.micrometals.com/pcparts/ccore.html on Dec. 18, 2007.
TSC Pyroferric Composite Toroid datasheet, 1 page, accessed via the internet at http://www.tscinternational.net/comptoroidprint.pdf on Dec. 18, 2007.

(56) References Cited

OTHER PUBLICATIONS

Pulse, SMT Power Inductors datasheet, 2 pages, Nov. 2007.
Cooper Bussman, "Product Data Sheet for Low Profile Inductors (Surface Mount)", retrieved from http://www.angilac.com, May 2003.
Wong, et al., "Performance Improvements of Interleaving VRMs with Coupling Inductors", IEEE Trans on Power Electronics, vol. 16, No. 4, pp. 499-507; Jul. 2001.
Pulse, SMT Power Inductors Power Beads—PA0766NL Series, pp. 53-55, Mar. 2006.
Vitec, Dual High Freq., High Power Inductor, AF4390A, datasheet, 1 page.
PCT/US09/37320 International Search Report and Written Opinion mailed Jun. 30, 2009, 19 pages.
Chandrasekaran et al., "Integrated magnetic for interleaved DC-DC boost converter for fuel cell powered vehicles" 2004 35th Annual IEEE Power Electronics Specialists Conference pp. 356-361.
U.S. Appl. No. 12/405,146, Office Action issued May 6, 2013, 9 pages.
U.S. Appl. No. 12/405,146, Response to Office Action filed Sep. 6, 2013, 11 pages.
U.S. Appl. No. 12/405,146, Office Action issued Feb. 21, 2014, 7 pages.
U.S. Appl. No. 12/405,146, Response to Office Action filed Apr. 21, 2014, 8 pages.

\* cited by examiner

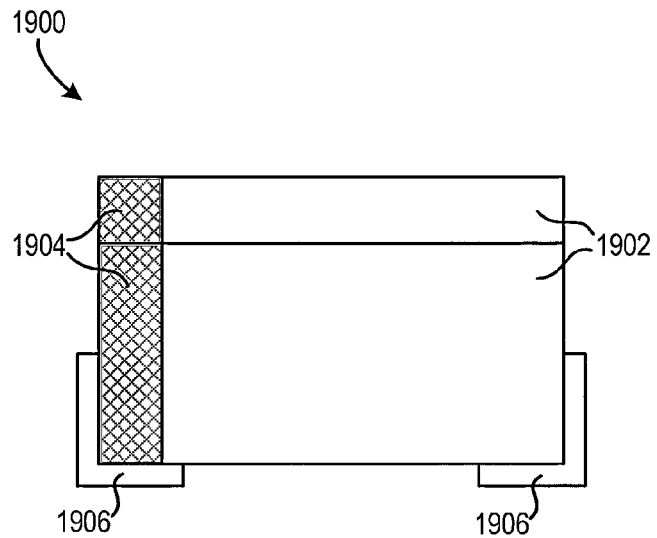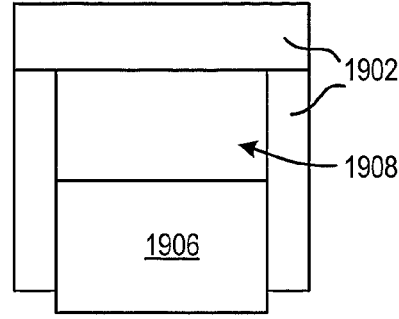
FIG. 19  FIG. 20
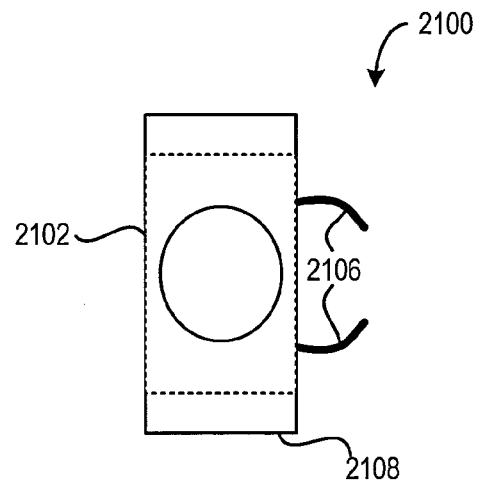
FIG. 21
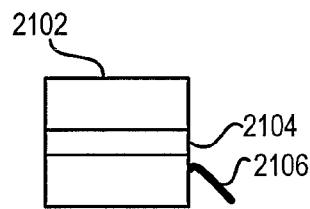
FIG. 22

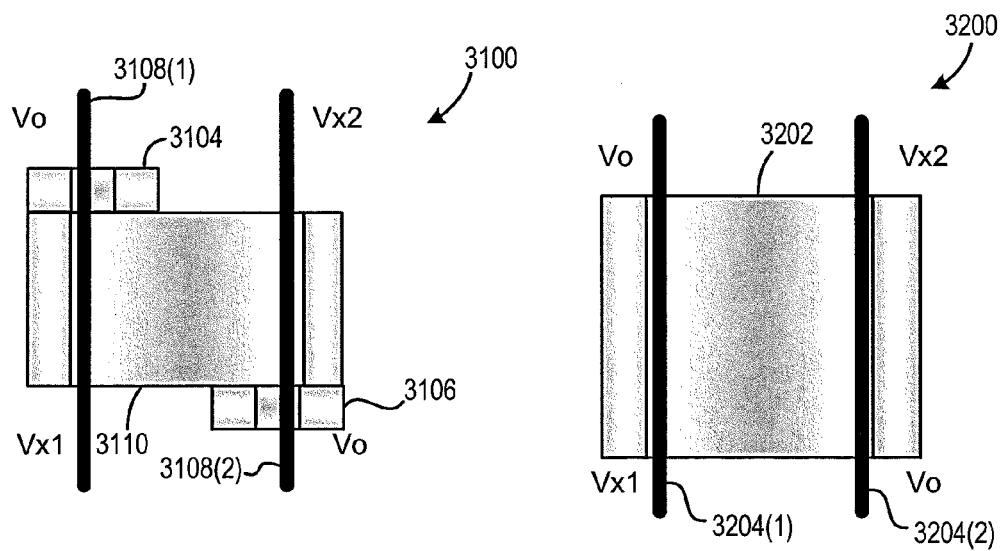
FIG. 31
FIG. 32
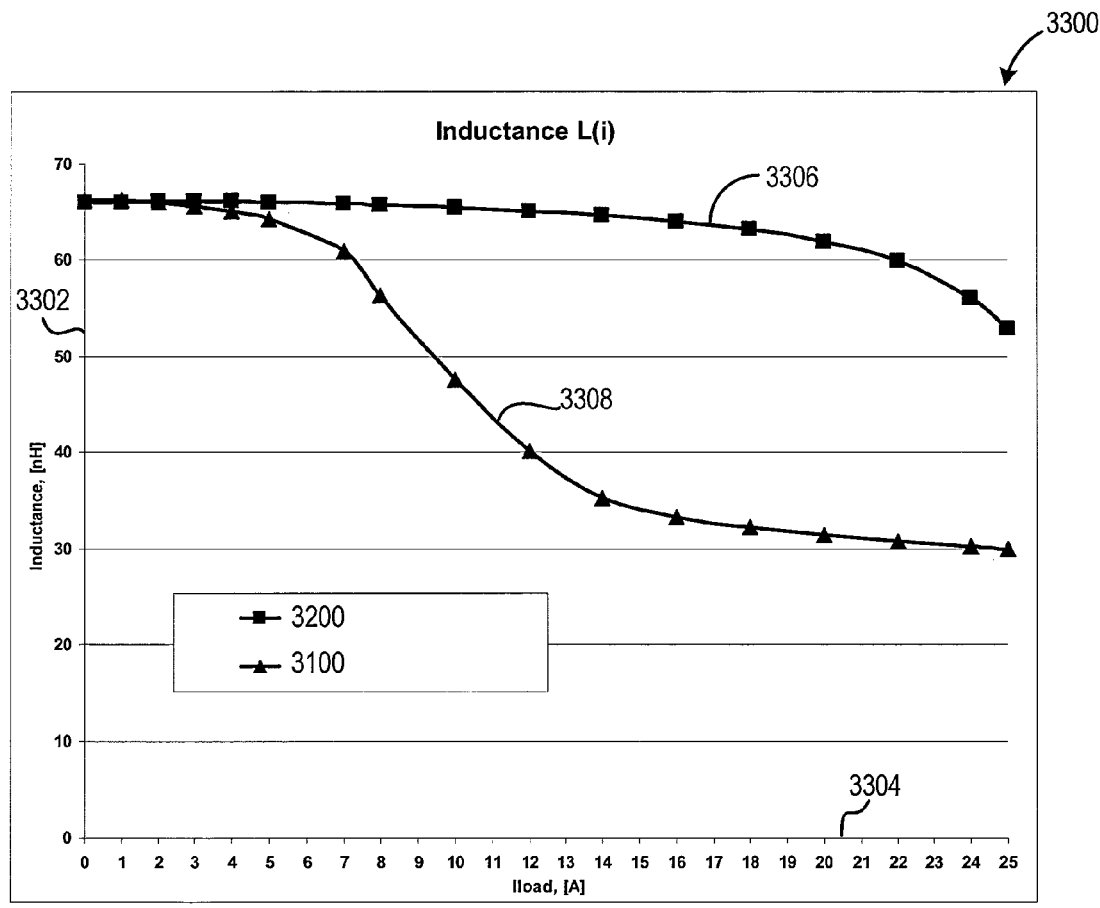
FIG. 33

VOLTAGE CONVERTER INDUCTOR HAVING A NONLINEAR INDUCTANCE VALUE

CROSS-REFERENCE TO RELATED APPLICATIONS

This application is a divisional of U.S. patent application Ser. No. 12/405,146, filed 16 Mar. 2009, which claims benefit of priority of U.S. Provisional Patent Application Ser. No. 61/036,836, filed 14 Mar. 2008, and U.S. Provisional Patent Application Ser. No. 61/046,736, filed 21 Apr. 2008. Each of the aforementioned patent applications is incorporated herein by reference.

BACKGROUND

Switching power supplies are a class of power supplies where power is converted from one form to another at least in part by periodically cycling one or more switches (e.g., transistors) between their fully on and fully off conditions. Switching power supplies may be contrasted with linear power supplies where one or more devices (e.g., transistors) are operated in their linear region as opposed to in their fully on or fully off conditions. Switching power supplies commonly offer a number of advantages over linear power supplies including higher efficiency and/or smaller size.

Switching power supplies, such as DC-to-DC converters, commonly have at least one inductor that is charged and discharged during each switching cycle of the power supply. Such charging and discharging of the inductor causes an alternating current, frequently referred to as ripple current, to flow through the inductor. Although some ripple current must flow through the inductor in order for the switching power supply to properly function, the ripple current generally causes undesirable power losses in the inductor and other components (e.g., switching transistors) of the power supply. Accordingly, it may be desirable to reduce ripple current magnitude in order to reduce power loss in the power supply. Furthermore, in some switching power supplies, output ripple voltage is generated in proportion to the magnitude of inductor ripple current. This ripple voltage is generally not desired, and it may be desirable to reduce inductor ripple current magnitude in order to reduce output ripple voltage.

Buck and buck derived DC-to-DC converters are a class of switching power supplies. In such DC-to-DC converters, an inductor is connected to an output filter of the DC-to-DC converter. The magnitude of ripple current through the inductor is a function of factors including the voltage applied across the inductor, the DC-to-DC converter's switching frequency, the DC-to-DC converter's duty cycle, and the inductor's inductance value. For example, a buck converter's peak-to-peak inductor ripple current magnitude can be expressed according to the following equation under ideal, steady state conditions:

$$\Delta I = \frac{V_{on}D}{FL} \quad \text{EQN. 1}$$

In EQN. 1, $\Delta I$ is the peak-to-peak ripple current magnitude, $V_{on}$ is the magnitude of the voltage across the inductor when it is being charged (i.e., input voltage minus output voltage), D is the duty cycle of the buck converter, F is the buck converter's switching frequency, and L is the inductor's inductance value.

Note that load current does not appear in EQN. 1. Accordingly, in buck and buck derived converters, the inductor's ripple current magnitude is largely independent of the load powered by the converter. Thus, at light load conditions, the relative ripple current magnitude may be significant, and significant power may be lost in the DC-to-DC converter even when it is powering a light load. Such light load power loss may be highly undesirable in applications, such as battery powered portable applications, where battery life must be maximized.

Although ripple current magnitude in a buck and a buck derived converter may be decreased by increasing the inductor's inductance value, as can be observed from EQN. 1, doing so impairs the converter's ability to respond to changing loads, commonly referred to as transient loads, by limiting the speed at which the converter's output current magnitude can change. How a power supply (e.g., a DC-to-DC converter) responds to rapid changes in load is frequently referred to as the power supply's transient response. Thus, the faster a DC-to-DC converter is able to respond to a change in load, the better the DC-to-DC converter's transient response.

In many buck and buck derived converters, it is important that the converter have a good transient response. For example, the converter may be powering a microprocessor that presents large transient loads and yet has stringent voltage regulation specifications. The converter must quickly respond to the transient loads in order to maintain its output voltage within the microprocessor's stringent voltage regulation specifications.

Output capacitors are required to handle a transient load to the extent that the transient load cannot be handled by the buck or buck derived converter. As a rule, the better a converter's transient response, the less output capacitance is required. Thus, if a buck or buck derived converter's transient response is improved (e.g., by lowering its inductance value), the converter's output capacitance requirements may be reduced, thereby reducing cost and/or saving space. Further, if a buck or buck derived converter's transient response is improved, costly and difficult to procure capacitors having a very low equivalent series resistance ("ESR") may be replaced with lower cost, easier to obtain capacitors having a higher ESR.

Thus, a buck or buck derived converter's efficiency may be improved by increasing its inductor's inductance value. However, doing so degrades the converter's transient response. Alternately, a buck or buck derived converter's transient response may be improved by lowering its inductor's inductance value. However, doing so degrades the converter's efficiency.

Sun et al. have disclosed a saturable inductor intended to improve light load efficiency in a single phase buck converter. See Sun et al., Light Load Efficiency Improvement for Laptop VRs, Applied Power Electronics Conference, APEC 2007, Feb. 25, 2007-Mar. 1, 2007. Sun's inductor is formed on an E-I core with a winding around the center leg. A small cross section of the center leg core material is designed to saturate when the current through the inductor exceeds a predetermined level so that the inductor has one inductance value at heavy loads, and a larger inductance value at loads below the saturation limit to improve light-load efficiency during discontinuous conduction mode operation.

SUMMARY

An M-phase coupled inductor having non-linear leakage inductance values includes a magnetic core and M windings, where M is an integer greater than one. Each winding is wound at least partially about a portion of the magnetic core. Each winding is magnetically coupled to each other winding, and each winding has a respective leakage inductance. The magnetic core is configured and arranged such that a respective leakage inductance value of each winding decreases as the magnitude of current flowing through the winding increases in a range of currents anticipated in normal operation of the coupled inductor.

An inductor having a non-linear inductance value includes a magnetic core formed of a material having a distributed gap. The inductor further includes a winding wound around the magnetic core and forming less than one complete turn around the magnetic core. The magnetic core is configured and arranged such that the inductor has an inductance value that decreases as magnitude of current through the inductor increases in a range of currents anticipated in normal operation of the inductor.

An inductor having a non-linear inductance value includes a magnetic core including a first magnetic element formed of a first material that does not saturate during anticipated normal operation of the inductor. The magnetic core further includes a second magnetic element formed of a second material that saturates as the magnitude of current flowing through the inductor increases in a range of currents anticipated in normal operation of the inductor. The first material is different from the second material. The magnetic core is configured and arranged such that the inductor has an inductance value that decreases as magnitude of current through the inductor increases in a range of currents anticipated in normal operation of the inductor.

An inductor having a non-linear inductance value includes a magnetic core forming a gap and a saturable magnetic element bridging the gap. The saturable magnetic element is configured and arranged such that the inductor has an inductance value that decreases as magnitude of current through the inductor increases in a range of currents anticipated in normal operation of the inductor.

A DC-to-DC converter includes an inductor having a non-linear inductance value, a switching subsystem, and an output filter. The inductor includes a magnetic core including a first magnetic element formed of a first material that does not saturate during anticipated normal operation of the inductor. The magnetic core further includes a second magnetic element formed of a second material that saturates as the magnitude of current flowing through the inductor increases in a range of currents anticipated in normal operation of the inductor. The first material is different from the second material. The inductor further includes a winding wound around the magnetic core and forming less than one complete turn around the magnetic core. The winding has a first terminal and a second terminal. The switching subsystem couples the first terminal of the winding to an input power source, and the switching subsystem alternately charges and discharges the winding. The output filter is connected to the second terminal of the winding.

A DC-to-DC converter includes an inductor having a non-linear inductance value, a switching subsystem, and an output filter. The inductor includes a magnetic core formed of a material having a distributed gap and a winding. The winding is wound around the magnetic core and forms less than one complete turn around the magnetic core. The winding has a first terminal and a second terminal. The magnetic core is configured and arranged such that the inductor has an inductance value that decreases as magnitude of current through the inductor increases in a range of currents anticipated in normal operation of the inductor. The switching subsystem couples the first terminal of the winding to an input power source, and the switching subsystem alternately charges and discharges the winding. The output filter is connected to the second terminal of the winding.

A DC-to-DC converter includes an inductor having a non-linear inductance value, a switching subsystem, and an output filter. The inductor includes a magnetic core forming a gap and a winding having a first terminal and a second terminal. The winding is wound around the magnetic core and forms less than one complete turn around the magnetic core. The inductor further includes a saturable magnetic element bridging the gap. The saturable magnetic element is configured and arranged such that the inductor has an inductance value that decreases as magnitude of current through the inductor increases in a range of currents anticipated in normal operation of the inductor. The switching subsystem couples the first terminal of the winding to an input power source, and the switching subsystem alternately charges and discharges the inductor. The output filter is connected to the second terminal of the winding.

A DC-to-DC converter includes an output filter, a coupled inductor, and M switching subsystems, where M is an integer greater than one. The coupled inductor includes a magnetic core, and M windings. Each winding has a first and a second terminal, and each second terminal is electrically coupled to the output filter. Each winding is wound at least partially about at least a portion of the magnetic core, and each winding is magnetically coupled to each other winding. Each winding has a respective leakage inductance. The magnetic core is configured and arranged such that a respective leakage inductance value of each winding decreases with increasing current through the winding in a range of currents anticipated during normal operation of the DC-to-DC converter and the coupled inductor. Each switching subsystem couples the first terminal of a respective winding to an input power source, and the switching subsystems alternately charge and discharge their respective windings.

BRIEF DESCRIPTION OF DRAWINGS

FIG. 19 is a side plan view of one inductor having a non-linear inductance value, according to an embodiment.

FIG. 20 is an end plan view of the inductor of FIG. 19.

FIG. 21 is a top plan view of one inductor, according to an embodiment.

FIG. 22 is a side plan view of the inductor of FIG. 21.

FIG. 31 is a cross sectional view of one coupled inductor having non-linear leakage inductance values, according to an embodiment.

FIG. 32 is a cross sectional view of one coupled inductor, according to an embodiment.

FIG. 33 is a graph of leakage inductance versus winding current magnitude for each of the inductors of FIGS. 31 and 32.

DETAILED DESCRIPTION OF DRAWINGS

Figure 1:
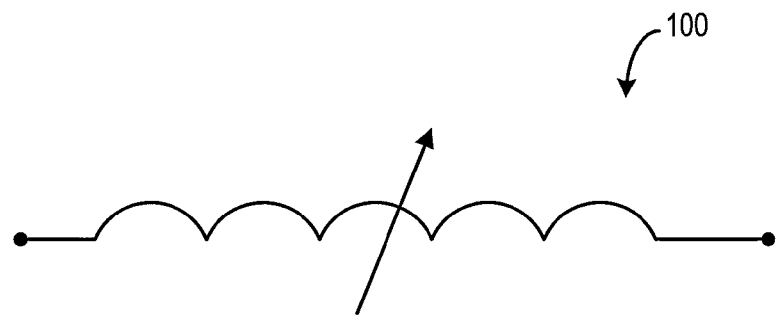
FIG. 1 schematically illustrates one inductor having a non-linear inductance value, according to an embodiment.

For purposes of illustrative clarity, certain elements in the drawings may not be drawn to scale. Specific instances of an item may be referred to by use of a numeral in parentheses (e.g., inductor 100(1)) while numerals without parentheses refer to any such item (e.g., inductor 100).

FIG. 1 schematically illustrates one inductor 100 having a non-linear inductance value. Inductor 100 may for example be advantageously used in a buck or buck derived converter to at least partially avoid the tradeoffs between transient response and efficiency discussed above. Specifically, as discussed below, inductor 100 may be used in a buck or buck derived converter in place of an inductor with relatively constant inductance to (1) improve the converter's efficiency at light load without significantly impairing the converter's transient response, and/or (2) improve the converter's transient response without significantly impairing the converter's efficiency at light load.

Inductor 100's inductance value varies according to the magnitude of current flowing through its winding. Current flowing through an inductor's winding may hereinafter be referred to as the inductor's winding current. Specifically, the inductance value of inductor 100 decreases as the magnitude of its winding current increases, thereby providing a relatively large inductance value when the magnitude of its winding current is small, and a relatively small inductance value when the magnitude of its winding current is large. Such change in inductance value as a function of winding current may be referred to as inductance swing or nonlinearity.

As discussed below, inductor 100 differs from Sun's non-linear inductor in that inductor 100 achieves a desired inductance swing in advantageous and new ways. For example, some embodiments of inductor 100 are easier and/or simpler to manufacture than Sun's inductor, and allow easier change of inductance value and/or inductance swing curves during the inductor's design than does Sun's inductor. Additionally, as discussed below with respect to FIG. 3, some embodiments of inductor 100 have inductance swing characteristics that improve converter transient response or improve both converter transient response and light load efficiency, in either continuous or discontinuous conduction mode. In contrast, Sun's inductor is merely directed at improving light load efficiency during discontinuous conduction mode. Furthermore, some embodiments of inductor 100 include a winding forming less than one complete turn around the magnetic core, such as a "staple winding" having a shape similar to a staple. This partial turn winding has significantly lower resistance than Sun's winding, thereby offering higher efficiency and current-handling capability than Sun's inductor. Moreover, some embodiments of inductor 100 are coupled inductors with non-linear leakage inductance values, while Sun's inductor is limited to one phase.

Embodiments of inductor 100, for example, have an anticipated winding current range from $I_1$ to $I_2$ during normal operation of the inductor, where $I_2$ is greater than $I_1$. $I_1$ is, for example, zero to 35 percent of $I_2$. $I_2$ is, for example, a maximum current rating for inductor 100. As another example, $I_2$ is a maximum current value (e.g., steady state current value) anticipated during normal operation of inductor 100 in a particular application. Inductor 100 has an inductance of $L_1$ at $I_1$, and an inductance of $L_2$ at $I_2$. The desired value of inductor 100's inductance swing may vary with its application. As a general matter, the inductance swing must be sufficiently large (e.g., $L_1$ is at least 1.25 times $L_2$) for there to be a significant benefit to using inductor 100. Conversely, if the inductance swing is too large (e.g., $L_1$ is more than ten times $L_2$), core losses may be unacceptably high in some applications (e.g., when used in a buck or buck derived converter). An embodiment of inductor 100 where $L_1$ is 1.5 times to 3.5 times $L_2$ may for example advantageously offer a good compromise between inductance swing and core losses. If core losses in a particular application are a relatively small contributor to total losses, a larger difference between $L_1$ and $L_2$ (i.e., a larger inductance swing) could improve overall efficiency because a decrease in circuit losses at light loads may outweigh a potential increase in core losses at heavy loads.

The rate at which inductor 100's inductance value decreases as the magnitude of its winding current increases varies among embodiments of inductor 100. Some embodiments of inductor 100 have an inductance value that decreases rapidly as the inductor's winding current magnitude increases—such embodiments have a "narrow" inductance curve. Other embodiments of inductor 100 have an inductance value that decreases relatively slowly as the inductor's winding current magnitude increases—such embodiments have a "wide" inductance curve. As discussed below, the shape of inductor 100's inductance curve may affect the performance (e.g., efficiency, transient response) of a DC-to-DC converter using inductor 100.

For example, consider an embodiment of inductor 100 installed in a DC-to-DC converter having an anticipated output current range from $I_1$ to $I_2$ during normal operation of the inductor and the DC-to-DC converter, where $I_2$ is greater than $I_1$. The inductor has a first inductance value ("$L_{1st}$")

when the DC-to-DC converter's output current is equal to $I_1$, and the inductor has a second inductance value ("$L_{2nd}$") when the DC-to-DC converter's output current is equal to $I_2$. Because the inductor's inductance value decreases as the magnitude of its winding current increases, $L_{1st}$ is greater than $L_{2nd}$. An embodiment of the inductor having a narrow inductance curve has an inductance value of less than $L_{2nd}+(0.1)(L_{1st}-L_{2nd})$ when the DC-to-DC converter's output current magnitude is equal to $I_1+(0.25)(I_2-I_1)$. An embodiment of the inductor having a wide inductance curve has an inductance value of greater than $L_{2nd}+(0.5)(L_{1st}-L_{2nd})$ when the DC-to-DC converter's output current magnitude is equal to $I_1+(0.4)(I_2-I_1)$. Another embodiment of the inductor having a wide inductance curve has an inductance value of greater than $L_{2nd}+(0.5)(L_{1st}-L_{2nd})$ when the DC-to-DC converter's output current magnitude is equal to $I_1+(0.2)(I_2-I_1)$.

Figure 2:
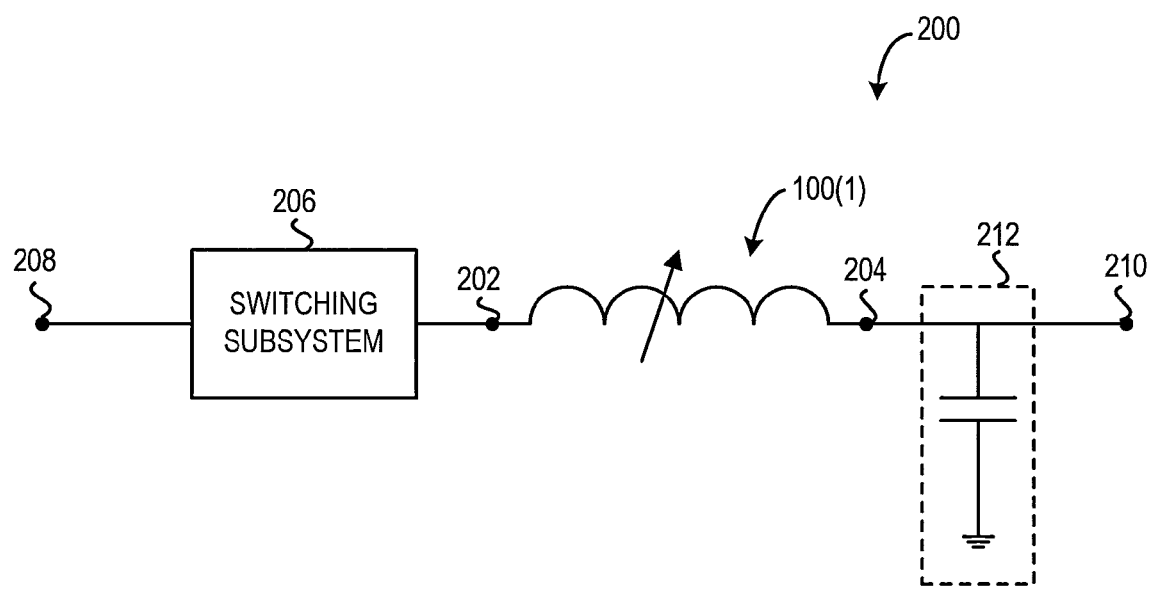
FIG. 2 schematically illustrates one DC-to-DC converter including an inductor having a non-linear inductance value, according to an embodiment.

FIG. 2 schematically illustrates one possible application of inductor 100. Specifically, FIG. 2 schematically illustrates one DC-to-DC converter 200 including inductor 100(1), which is an embodiment of inductor 100. DC-to-DC converter 200 is, for example, a buck or buck derived converter; in such embodiments of DC-to-DC converter 200, inductor 100(1) is a buck inductor. As another example, some embodiments of DC-to-DC converter 200 may be a boost converter or other step-up topology. DC-to-DC converter 200 has an anticipated output current ranging from $I_1$ to $I_2$ during normal operation, where $I_2$ is greater than $I_1$.

Inductor 100(1) includes a first terminal 202 and a second terminal 204. A switching subsystem 206 couples first terminal 202 to an input power source 208. Switching subsystem 206 includes, for example, a high side switch and a low side switch configured such that DC-to-DC converter 200 operates as a buck converter. Switching subsystem 206 alternately charges and discharges inductor 100(1) in order to regulate the voltage on converter output 210. An output filter 212 is connected to second terminal 204. Output filter 212 includes, for example, at least one capacitor. Use of inductor 100(1) in place of an inductor having a relatively constant inductance may improve DC-to-DC converter 200's light load efficiency and/or transient response.

Figure 3:
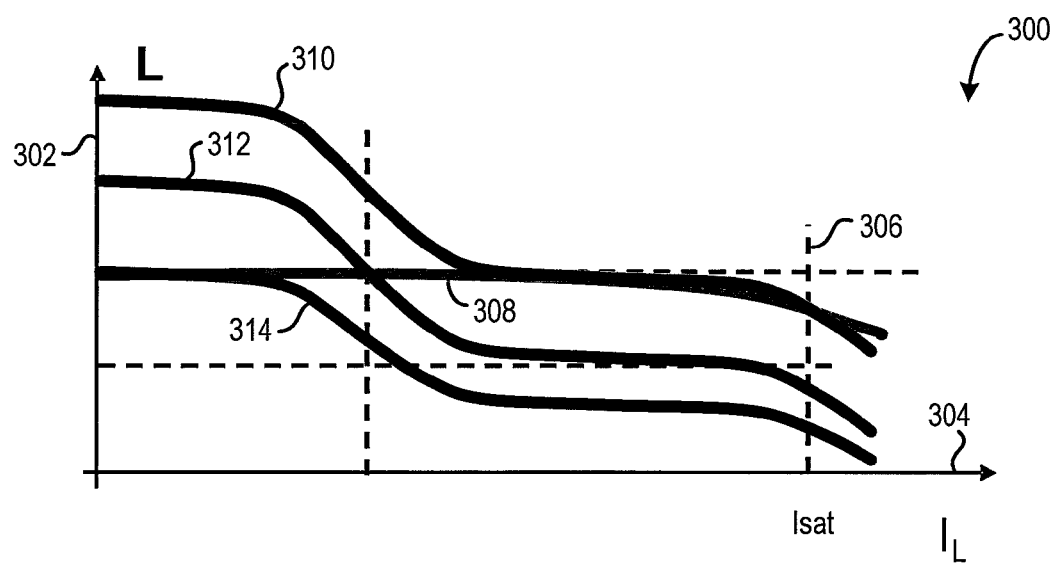
FIG. 3 is a graph of inductance value versus winding current magnitude for four different inductors.

As discussed above, inductor 100's inductance value is a function of its winding current magnitude. Such inductance/current relationship may be tuned to affect the performance of a converter using inductor 100. FIG. 3, which is a graph 300 of an inductor's inductance value versus its winding current magnitude, shows three examples of inductance/current relationships of inductor 100. Y-axis 302 represents the inductor's inductance value, and X-axis 304 represents the inductor's winding current magnitude. Vertical dashed line 306 represents the inductor's saturation current.

Curve 308 corresponds to a prior art inductor L4 that has essentially a constant inductance value, although L4's inductance value does begin to decrease as its winding current approaches saturation current 306. Curves 310, 312, and 314 represent the inductance values of inductors L1, L2, and L3, respectively. Inductors L1, L2, and L3 are different embodiments of inductor 100.

As can be observed from FIG. 3, L1 (curve 310) has an inductance value that is significantly greater than that of inductor L4 (curve 308) at small winding current magnitudes, and L1 has an inductance value that is substantially equal to that of inductor L4 at large winding current magnitudes. A buck or buck derived converter using L1 is expected to have a greater light load efficiency than a converter using L4 due to L1 having a greater inductance value than L4 at small winding current magnitudes. However, a buck or buck derived converter using L1 is expected to have only a slightly worse transient response than a converter using L4 due to L3's inductance value being similar to that of L4 at large winding current magnitudes. In summary, L1 is expected to provide superior light load efficiency and slightly degraded transient response when compared to L4.

In contrast to L1, L3 (curve 314) has an inductance value at small winding current magnitudes that is substantially similar to that of L4 (curve 308). However, the inductance value of L3 is significantly less than that of inductor L4 at large winding current magnitudes. Accordingly, a buck or buck derived converter using L3 is expected to have light load efficiency similar to that of a converter using L4. However, a buck or buck derived converter using L3 is expected to have a better transient response than a converter using L4 due to L3's inductance value dropping off at large winding current magnitudes.

L2's inductance value is somewhat greater than that of L4 at small winding current magnitudes, and L2's inductance value is somewhat less than that of L4 at large winding current magnitudes. Accordingly, L2 is a compromise between L1 and L3. L2 is expected to offer better light load efficiency than L4, but not as high light load efficiency as L1. Additionally, L2 is expected to provide better transient response than L4, but not as good of a transient response as L3.

As discussed above, core losses of an inductor having a non-linear inductance value (e.g., inductor 100) may be greater than those of a prior art inductor having a relatively constant inductance when used in a DC-to-DC converter. Such core losses are proportional to the inductor's inductance swing magnitude. Accordingly, when inductor 100 is used in a DC-to-DC converter, its inductance swing should be chosen such that the inductance swing does not result in unacceptably high core losses. For example, inductor 100's inductance swing may be chosen such that when a DC-to-DC converter's inductor is replaced with inductor 100, the increase in core losses associated with the inductance swing are smaller than the reduction in other losses (e.g., ripple current conduction losses) resulting from the inductance swing.

Inductor 100, for example, includes a magnetic core configured and arranged such that inductor 100's inductance value decreases as magnitude of current through the inductor increases in a range of currents anticipated in normal operation of inductor 100. One example of such a core is a core including at least one saturable magnetic element that saturates as winding current increases and thereby causes the inductance value to decrease as the magnitude of current flowing through the inductor increases. In some embodiments of such cores, the at least one saturable magnetic element is formed of a different material than a main portion of the core. For example, the at least one saturable magnetic element may be formed of a material having a higher permeability than the main portion of the core. As another example, the at least one saturable magnetic element may be formed of a powered iron material while the main portion of the core is formed of a ferrite material. FIGS. 4-16 show examples of embodiments of inductor 100 including a magnetic core with at least one saturable magnetic element.

Figure 4:
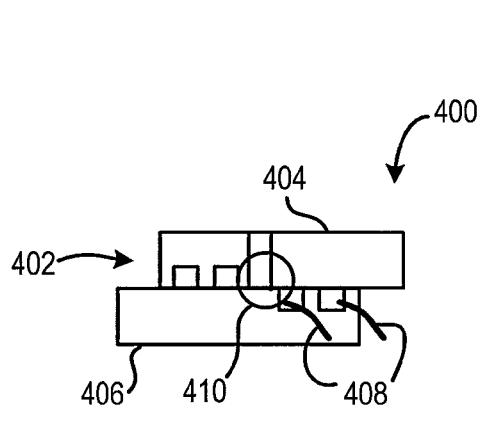
FIG. 4 is a side plan view of one inductor having a non-linear inductance value, according to an embodiment.
Figure 5:
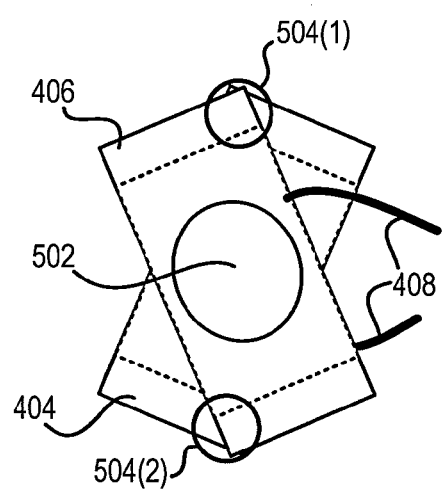
FIG. 5 is a bottom plan view of the inductor of FIG. 4.

FIG. 4 is a side plan view of one inductor 400, and FIG. 5 is a bottom plan view of inductor 400. Inductor 400 includes a core 402 having a first section 404 and second section 406. Winding 408 is wound through second section 406, and first and second sections 404 and 406 are displaced from each other, as shown in FIGS. 4 and 5.

The inductance swing of inductor 400 largely results from core 402 not having a non-magnetic spacer or air gap and first section 404 being displaced from second section 406. Core 402 has a relatively wide magnetic flux path near its center 502 due to the significant overlap between first section 404 and second section 406 in this area. However, core 402 has significantly narrower flux paths in areas where first section 404 and second section 406 barely overlap (approximated by circle 410 in FIG. 4 and circles 504(1) and 504(2) in FIG. 5). Inductor 400 has a relatively large inductance value at zero winding current due to core 402 not having a non-magnetic spacer. However, as the magnitude of current flowing through winding 408 increases, the magnetic flux density in areas of core 402 with narrow flux paths (e.g., areas approximated by circles 410, 504(1), and 504(2)) increases at a significantly greater rate than the magnetic flux density in areas of core 402 with a wide flux path (e.g., center 502). Accordingly, the areas of core 402 with a narrow flux path can be considered saturable magnetic elements that saturate while the areas of core 502 with a wide path do not saturate. Such partial saturation of core 402 causes inductor 400's inductance value to moderately drop from its zero winding current value in proportion to winding current. In contrast, if a large portion or all of core 402 were to saturate, inductor 400's inductance would drop to an unacceptable value leading to excessive core losses and/or improper operation of a DC-to-DC converter using inductor 400.

Inductor 400 has numerous advantages over Sun's inductor. For example, first section 404 and second section 406 can optionally be standard or off the shelf magnetic core pieces, advantageously allowing inductor 400 to be constructed without special tooling and/or cutting operations, thereby easing procurement, construction, and cost. In contrast, constructing Sun's inductor would likely require special tooling to custom cut the small portion of the core center leg that saturates. Additionally, first and second sections 404 and 406 are typically less fragile than Sun's core with its small saturating center section. Furthermore, inductor's 400 inductance swing can be changed merely by changing the overlap between first section 404 and second section 406.

Figure 6:
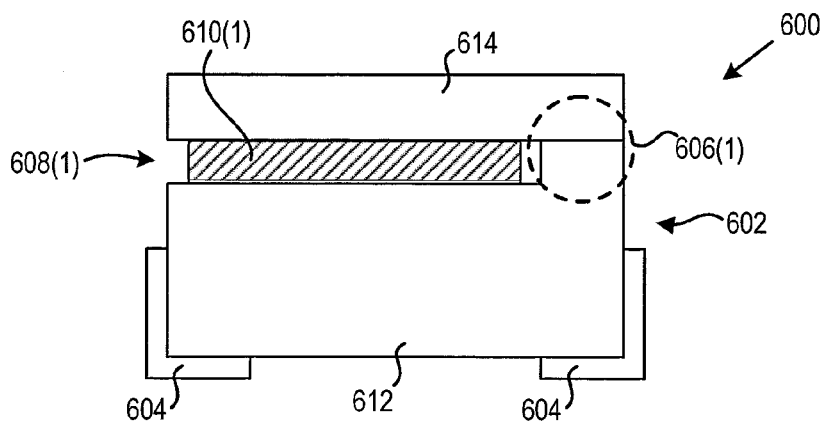
FIG. 6 is a side plan view of one inductor having a non-linear inductance value, according to an embodiment.
Figure 7:
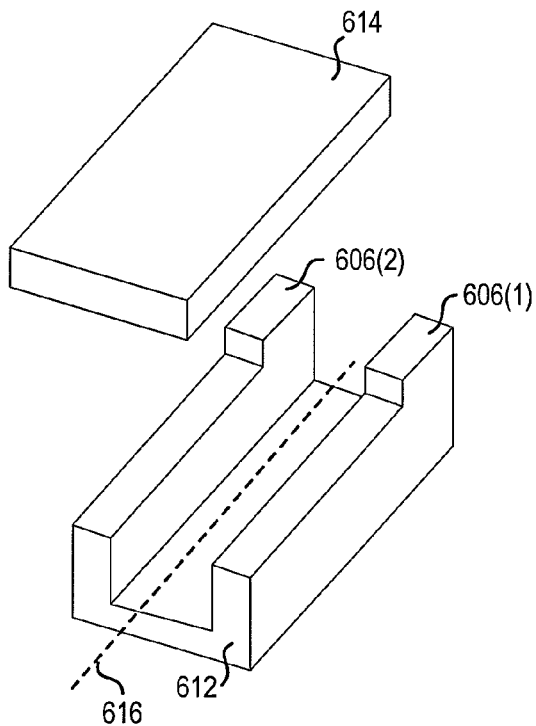
FIG. 7 is an exploded side perspective view of the inductor of FIG. 6.
Figure 8:
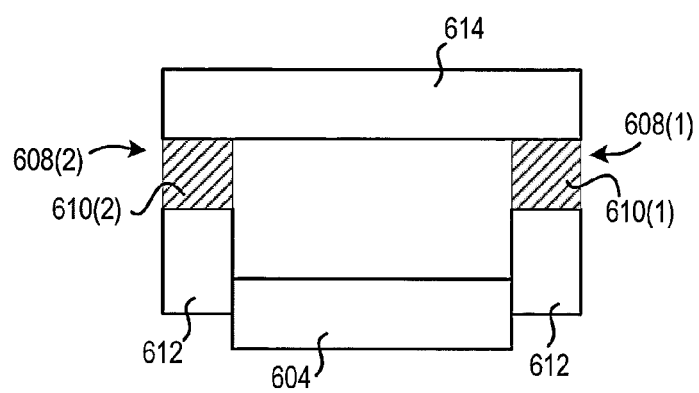
FIG. 8 is an end plan view of the inductor of FIG. 6.
Figure 9:
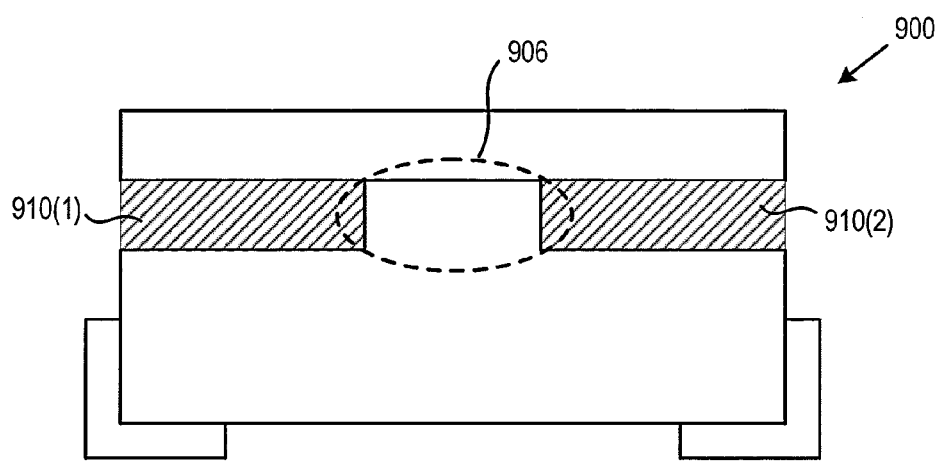
FIG. 9 is a side plan view of an alternative embodiment of the inductor of FIG. 6.
Figure 10:
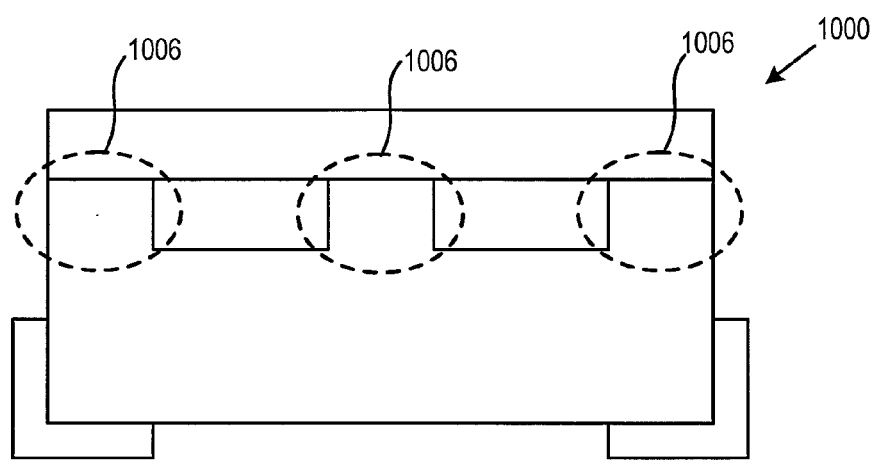
FIG. 10 is a side plan view of an alternative embodiment of the inductor of FIG. 6.
Figure 11:
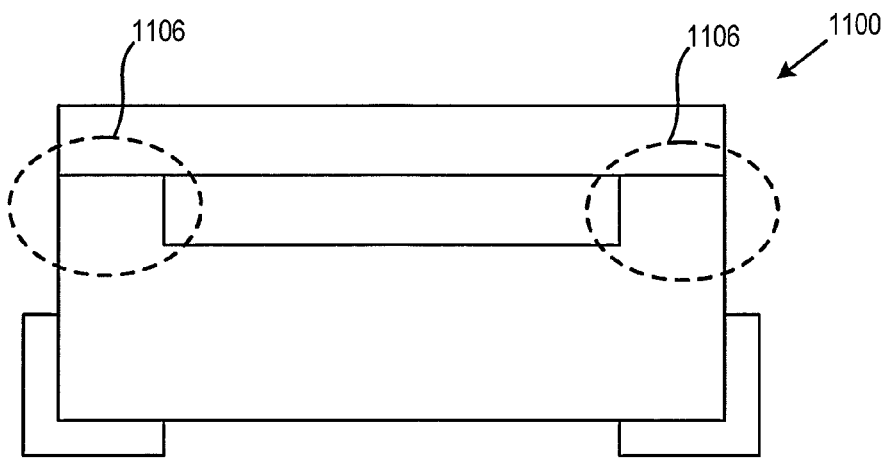
FIG. 11 is a side plan view of an alternative embodiment of the inductor of FIG. 6.

FIG. 6 shows a side plan view, FIG. 7 shows an exploded side perspective view, and FIG. 8 is an end plan view of one inductor 600, which is an embodiment of inductor 100. Inductor 600 includes a core 602, which may be formed of a ferrite material. Although core 602 is shown as including two magnetic elements 612 and 614, core 602 could be a single piece or be formed of more than two magnetic elements.

A winding 604 is wound at least partially around core 602. In some embodiments, winding 604 forms less than one complete turn around core 604. For example, winding 604 may be a single layer staple winding, as shown in FIGS. 6-8. Embodiments of winding 604 that form less than one complete turn around core 602 have a short length and may have a relatively small inductance. Short winding length advantageously reduces resistance and associated power loss as well as increases current-handling capability. Small inductance advantageously improves transient response. In contrast, Sun's inductor must have a winding forming at least one turn.

Some embodiments of winding 604 have a large cross section (e.g., a rectangular cross section), thereby also reducing resistance and associated power loss and increasing current-handling capability. Note that winding 604 is omitted in the perspective view of FIG. 7 to more clearly show core 602.

Core 602 forms two gaps 608, which are optionally at least partially filled by non-magnetic spacers 610. Gaps 608 are, for example, symmetrically distributed with respect to a center axis 616, which eases manufacturing of core 602, compared to a core with a single gap or asymmetrically distributed gaps. Although FIG. 8 shows each gap 608 including a respective spacer 610, a single non-magnetic spacer could fill both gaps 608. At least one saturable magnetic elements 606 bridges each gap 608. Saturable magnetic elements 606 saturate as current through winding 604 increases, thereby causing inductance to drop as current increases. Saturable magnetic elements 606 are, for example, symmetrically distributed with respect to center axis 616. This advantageously facilitates manufacturing of inductor 600. In contrast, Sun's inductor 100 has only a single saturable element in the core's center, which is typically more difficult to manufacture than a core with symmetrical saturable magnetic elements.

Saturable magnetic elements 606 may be part of core 602, such as part of magnetic element 612. Alternately, saturable magnetic elements 606 may be discrete elements and optionally formed of a different material than core 602. Saturable magnetic elements 606 can be configured differently than shown in FIGS. 6 and 7. For example, FIGS. 9, 10, 11 respectively show inductors 900, 1000, and 1100, each being an embodiment of inductor 600 and having respective saturable magnetic elements 906, 1006, and 1106 symmetrically distributed with respect to center axes (not shown). Inductor 900 is shown with optional non-magnetic spacers 910, and inductors 1000 and 1100 are shown without spacers.

Inductor 600's construction facilitates easy inductance setting. For example, inductance characteristics can be determined by changing the dimensions, construction, and/or location of saturable magnetic elements 606, thereby advantageously enabling a family of inductors 600 to be based on a single set of magnetic elements 612, 614.

Figure 12:
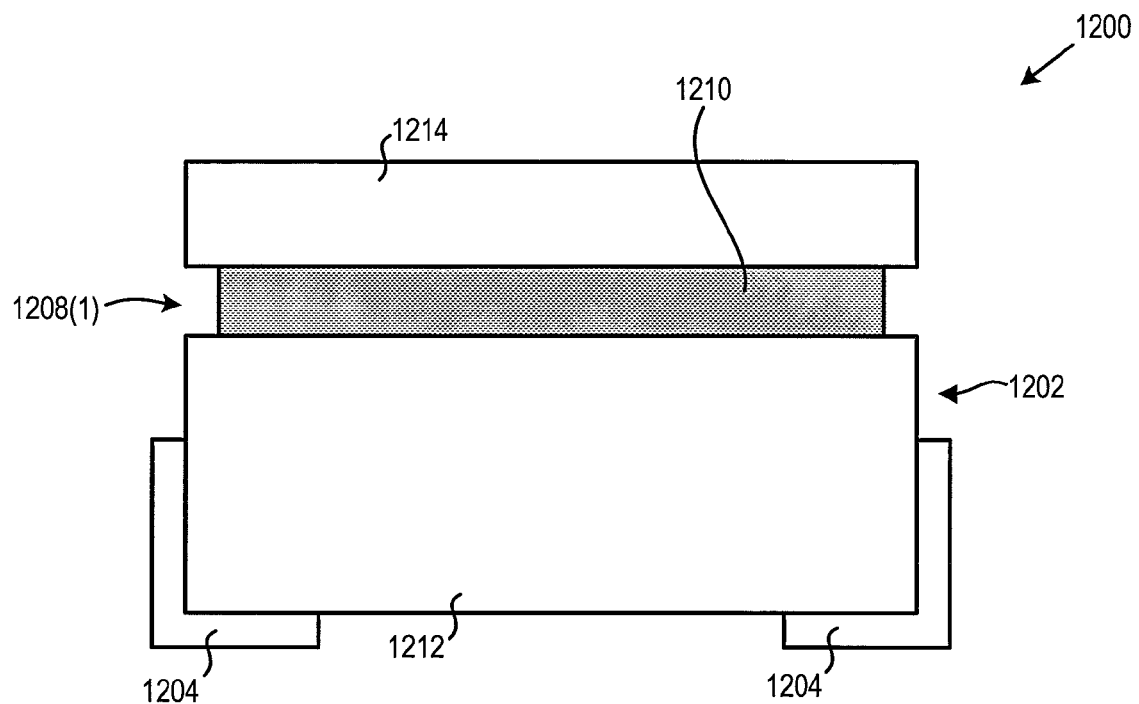
FIG. 12 is a side plan view of one inductor having a non-linear inductance value, according to an embodiment.
Figure 13:
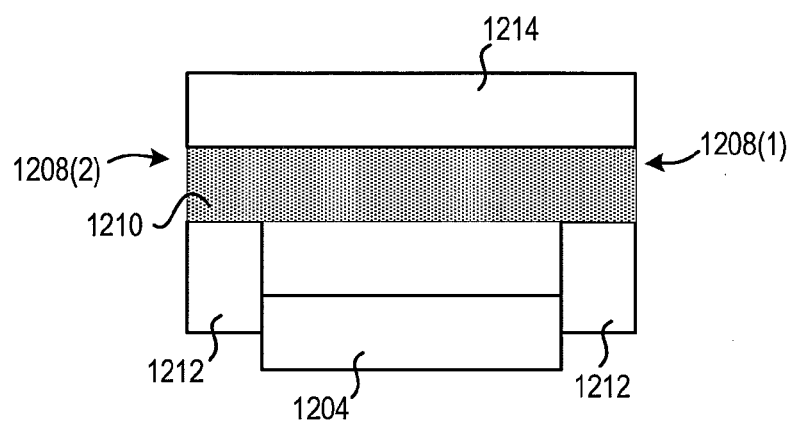
FIG. 13 is an end plan view of the inductor of FIG. 12.

FIG. 12 shows a side plan view and FIG. 13 shows an end plan view of one inductor 1200, which is an embodiment of inductor 100. Inductor 1200 includes a core 1202 formed of magnetic elements 1212 and 1214. Magnetic elements 1212 and 1214 are, for example, formed of a ferrite material. A winding 1204 is wound at least partially around magnetic element 1212. Winding 1204 is, for example, a winding (e.g., a staple winding) that forms less than a full turn around magnetic element 1212. Magnetic elements 1212 and 1214 form two gaps 1208, each of which is at least partially filled with and bridged by a saturable magnetic spacer 1210. Saturable magnetic spacer 1210 saturates as current through winding 1204 increases, thereby causing a corresponding drop in inductance. Although FIG. 13 show a single saturable magnetic spacer 1210 bridging both gaps 1208, each gap 1208 could alternately be bridged with a respective saturable magnetic spacer 1210.

Inductor 1200 is, for example, mostly or completely formed from standard or off the shelf components, thereby negating the need for custom components. This may help reduce cost and/or may ease procurement of inductor 1200. Additionally, construction of inductor 1200 is relatively simple—for example, magnetic elements 1212, 1214 may be simply joined with saturable magnetic spacer 1210. In contrast, Sun's inductor likely would require custom components and complex assembly. Furthermore, magnetic elements 1212, 1214 and saturable magnetic spacer 1210 may be relatively large and robust components, where Sun's inductor requires a small and fragile center leg element.

Figure 14:
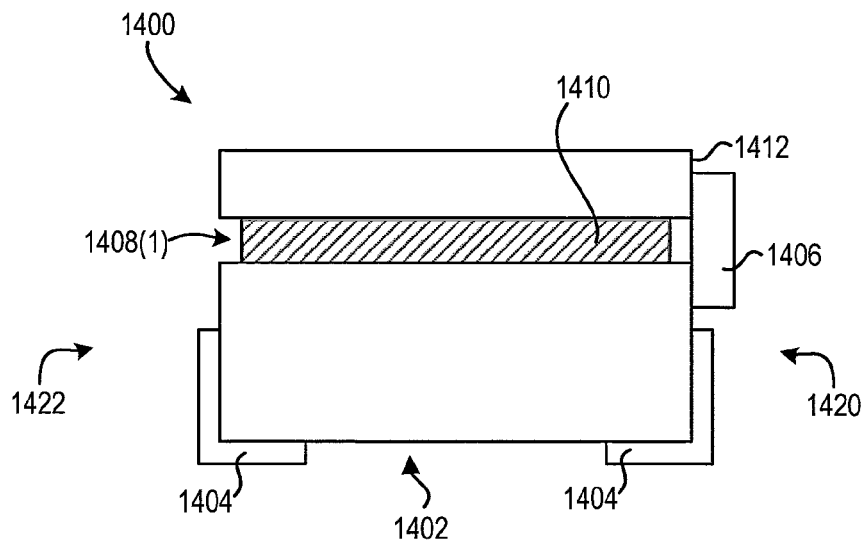
FIG. 14 is a side plan view of one inductor having a non-linear inductance value, according to an embodiment.
Figure 15:
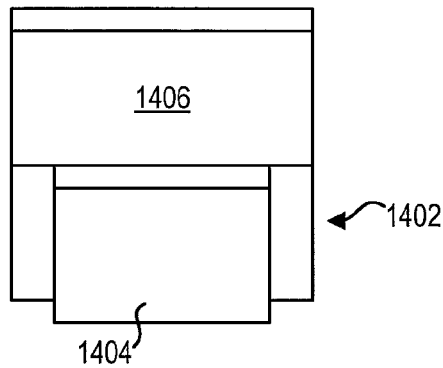
FIG. 15 is an end plan view of the inductor of FIG. 14.
Figure 16:
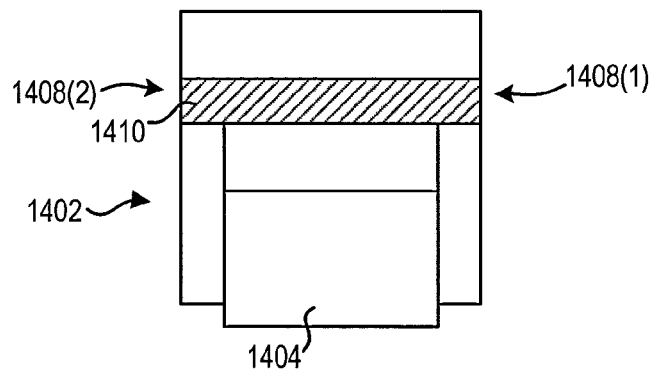
FIG. 16 is another end plan view of the inductor of FIG. 14.

FIG. 14 shows a side plan view of inductor 1400, which is an embodiment of inductor 100. FIG. 15 shows a plan view of end 1420, and FIG. 16 shows a plan view of end 1422 of inductor 1400. Inductor 1400 includes a core 1402, which for example is formed of a ferrite material. Core 1402 forms gaps 1408(1) and 1408(2). Gaps 1408 are optionally at least partially filled with a non-magnetic spacer 1410, as shown in FIGS. 14 and 16. Although spacer 1410 is shown as a single element, each gap 1408 could be at least partially filled with a respective spacer 1410. Winding 1404 is, for example, a winding (e.g., a staple winding) that forms less than one full turn around core 1402.

Inductor 1400 includes at least one saturable magnetic element 1406 disposed on an outer surface 1412 of core 1402. Saturable magnetic element 1406 bridges gaps 1408 and saturates as current through winding 1404 increases, thereby causing inductance to decrease. Saturable magnetic elements 1406 could be configured differently than shown in FIGS. 14-16. For example, a different saturable magnetic element 1406 could bridge each gap 1408, or more than one saturable magnetic element 1406 could bridge each gap 1408. Furthermore, saturable magnetic elements 1406 could be disposed on different outer surfaces of core 1402 than shown in FIGS. 14 and 15.

Core 1402 and/or winding 1404 could be varied from the embodiment shown in FIGS. 14-16. For example, core 1402 could form only a single gap 1408, and winding 1404 could be a multiturn winding.

One advantage of inductor 1400 is that it can be formed from a standard inductor having a relative constant inductance under expected normal operating conditions. In particular, saturable magnetic element 1406 can be affixed to the side of the standard inductor to bridge a gap, such as shown in FIG. 14. This helps reduce cost and may ease procurement of components of inductor 1400. Additionally, inductance characteristics can be adjusted by changing the size, material, and/or location of saturable magnetic element 1406. In contrast, as discussed above, Sun's inductor would need to be rebuilt to change its inductance.

Another example of a magnetic core configured and arranged such that inductor 100's inductance decreases as magnitude of current through the inductor increases is a magnetic core including at least one gap with non-uniform thickness. The at least one gap of non-uniform thickness causes the magnetic core to partially saturate as winding current increases, thereby causing the inductance value of each winding to decrease as the magnitude of current flowing through the inductor increases.

An additional example of a magnetic core configured and arranged such that inductor 100's inductance value decreases as magnitude of current through the inductor increases is a core with a distributed gap, such as a powdered iron core having a "soft" saturation characteristic. Such core progressively saturates as current through the inductor increases, thereby causing the inductance value to decrease.

Figure 17:
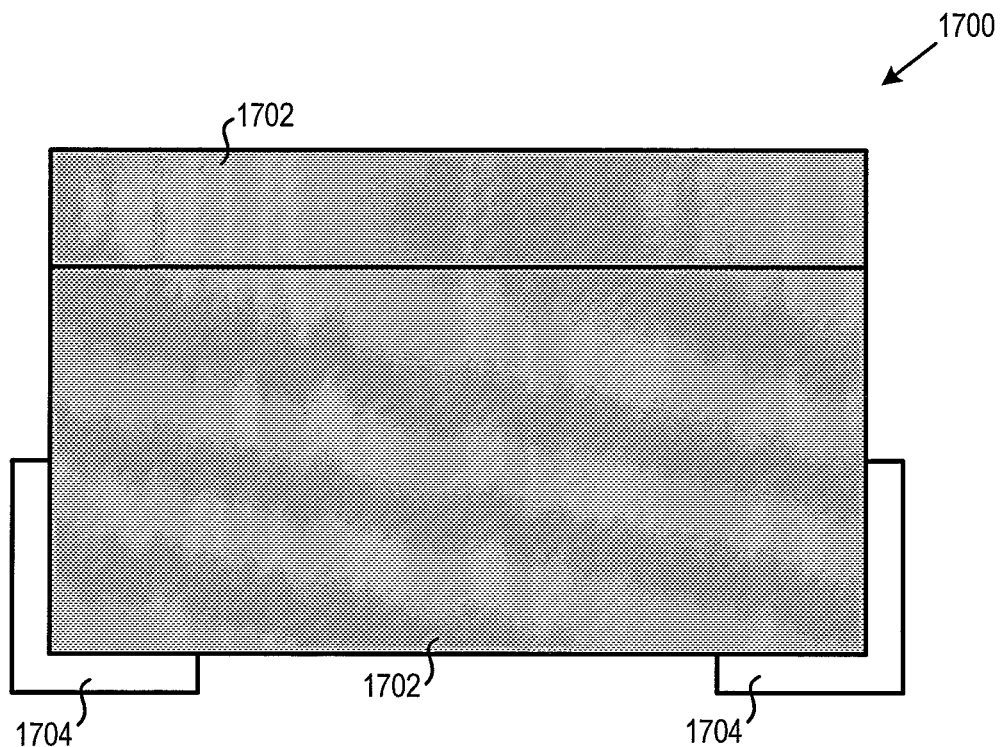
FIG. 17 is a side plan view of one inductor having a non-linear inductance value, according to an embodiment.
Figure 18:
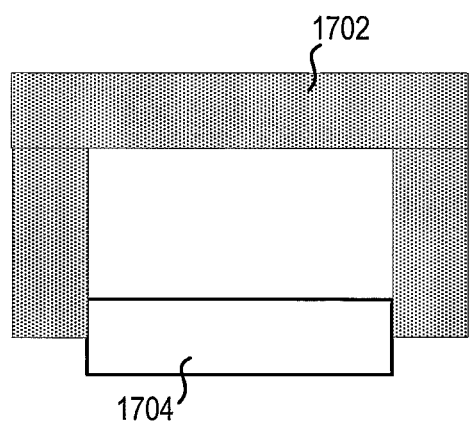
FIG. 18 is an end plan view of the inductor of FIG. 17.

FIG. 17 shows a side plan view and FIG. 18 shows an end plan view of one inductor 1700, which is an embodiment of inductor 100. Inductor 1700 includes a core 1702 and a winding 1704 wound at least partially around core 1702. Winding 1704 is, for example, a winding (e.g., a staple winding) that forms less than one full turn around core 1702. Core 1702 includes a material having a distributed gap, such as a powered iron material. Accordingly, core 1702 has a soft saturation characteristic, and the inductance increases as magnitude of current through winding 1704 increases. Note that inductor 1700 advantageously does not require small elements that are intended to saturate, which may thereby reduce cost and/or simplify manufacturing.

Yet another example of a magnetic core configured and arranged such that inductor 100's inductance value decreases as magnitude of current through the inductor increases is a non-homogenous core including at least a first and a second magnetic element. The first magnetic element is formed of a first magnetic material that does not saturate during anticipated normal operation of the inductor, and the second magnetic element is formed of a second magnetic material (e.g., having a higher permeability that the first magnetic material) that does not saturate at low currents but saturates at high currents as the current flowing through the inductor increases in the range of currents anticipated in normal operation of the inductor.

FIG. 19 shows a side plan view of one inductor 1900, which is an embodiment of inductor 100 having a non-homogenous core. FIG. 20 shows an end plan view of inductor 1900. Inductor 1900 includes a magnetic core including a first magnetic element 1902 and a second magnetic element 1904. The magnetic core forms a passageway 1908, as visible in FIG. 20. A winding 1906 is wound at least partially around the core and through passageway 1908. Winding 1906 is, for example, a winding (e.g., a staple winding) that forms less than one full turn around the magnetic core.

First magnetic element 1902 is formed of a first magnetic material (e.g., a distributed gap material), and second magnetic element 1904 is formed of a second magnetic material. The second magnetic material has a higher permeability than the first magnetic material. Accordingly, second magnetic element 1904 saturates as current flowing through winding 1906 increases, while first magnetic element 1902 remains relatively unsaturated during normal operation of inductor 1900. Saturation of second magnetic element 1904 causes inductance to decrease as current through winding 1906 increases.

Note that a magnetic core of inductor 100 may include several features for causing inductor 100's inductance value to decrease with increasing currents in the range of currents anticipated in normal operation of inductor 100. For example, a magnetic core of inductor 100 may include a combination of at least two of the following features: (1) at least one saturable magnetic element, (2) at least one gap of non-uniform thickness, (3) a core material having a distributed gap, and (4) a non-homogenous core.

Experiments were performed to demonstrate how performance of a buck or buck derived converter using inductor 100 is affected by the inductance/current characteristics of inductor 100. In order to perform such experiments, one inductor 2100 intended to have a relatively constant inductance was constructed according to FIGS. 21 and 22. FIG. 21 is a top plan view of inductor 2100; elements visible in FIG. 21 include core 2102 and windings 2106. FIG. 22 is a plan view of side 2108 of inductor 2100. Non-magnetic spacer 2104, which helps inductor 2100 maintain a relatively constant inductance, is visible in FIG. 22.

Figure 23:
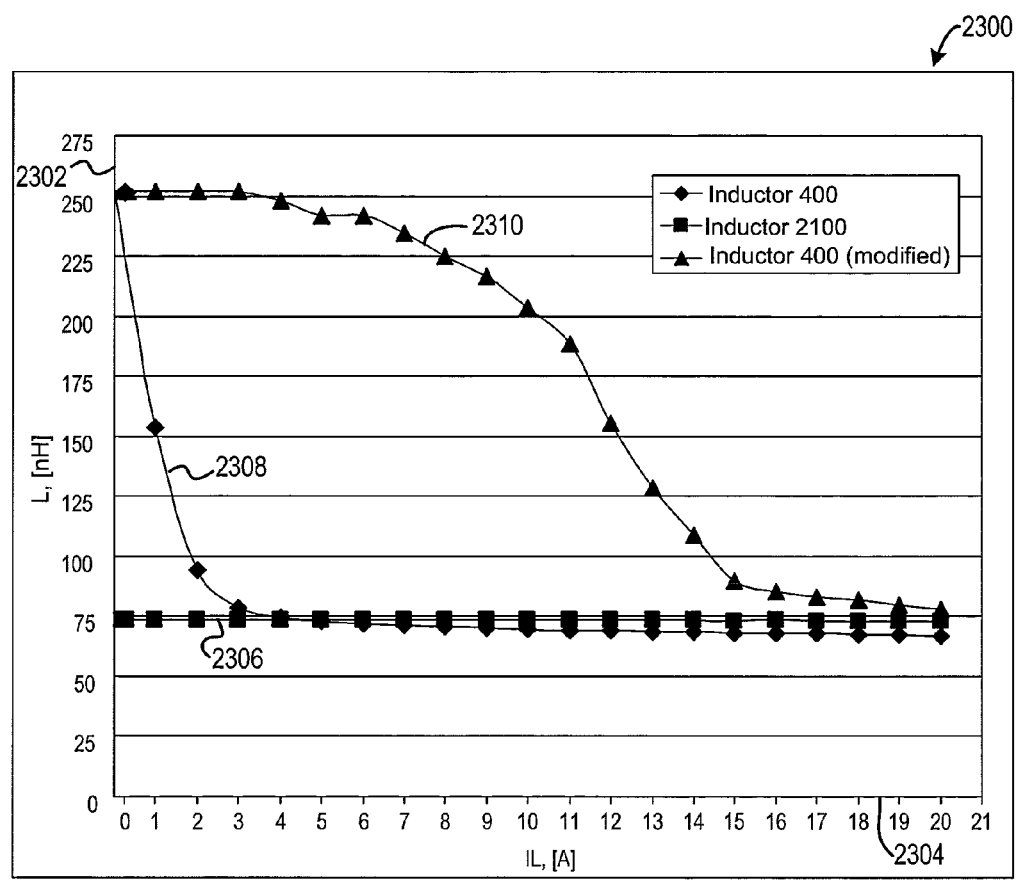
FIG. 23 is graph of inductance value versus winding current magnitude for three different inductors.

FIG. 23 is a graph 2300 of inductance value versus winding current magnitude of inductor 2100 and two different embodiments of inductor 400 at a test frequency of 800 KHz. Y-axis 2302 represents the inductor's inductance value, and X-axis 2304 represents the inductor's winding current magnitude. Curve 2306 corresponds to inductor 2100 of FIGS. 21 and 22, and curve 2308 corresponds to inductor 400 of FIGS. 4 and 5. Curve 2310 corresponds to an inductor (not shown) that is similar to inductor 400, but includes a non-magnetic spacer (which is smaller than non-magnetic spacer 2104 of inductor 2100) and has a greater overlap between first section 404 and second section 406.

As can be observed from graph 2300, curve 2306 remains essentially unchanged as a function of winding current. However, curve 2308 decreases rapidly as a function of winding current and then approximately follows curve 2306. Curve 2310, on the other hand, decreases relatively slowly as a function of winding current and then approximately follows curve 2306. Thus, curve 2308 is a narrow inductance curve, and curve 2310 is a wide inductance curve. Both curves 2308 and 2310 are variations of curve 310 (FIG. 3).

Figure 24:
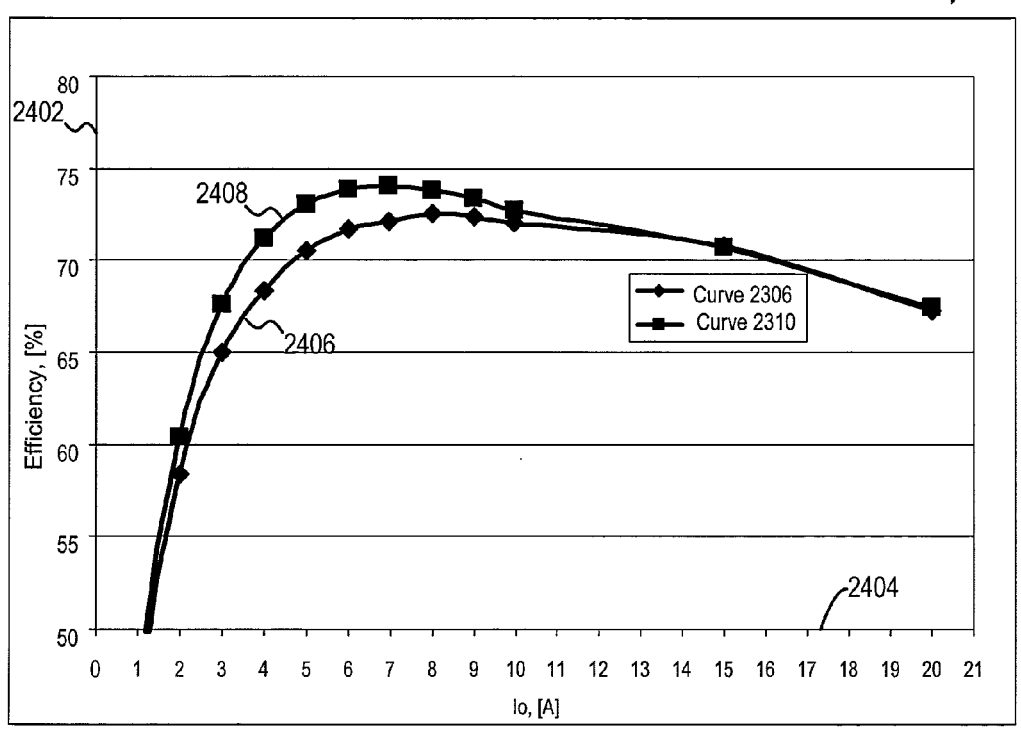
FIG. 24 is a graph of efficiency versus load current magnitude for a buck converter.
Figure 25:
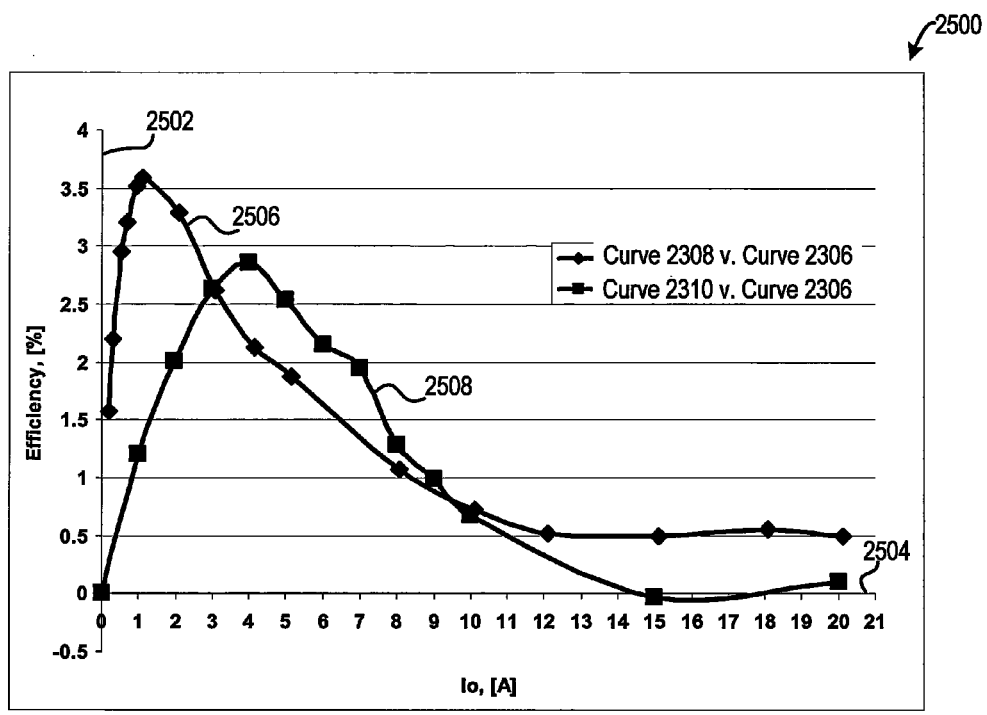
FIG. 25 is a graph of the difference in a buck converter's efficiency versus its load current magnitude.

Inductors having curves 2306, 2308, and 2310 were tested in a single-phase buck converter having an 800 KHz switching frequency. FIGS. 24-25 summarize some of the test results. FIG. 24 is a graph 2400 of efficiency versus load current for a buck converter using each of an inductor having inductance curve 2306 and inductance curve 2310. Y-axis 2402 represents the buck converter's efficiency, and X-axis 2404 represents the buck converter's load current magnitude. Curve 2406 represents the buck converter's efficiency when using an inductor having inductance curve 2306, and curve 2408 represents the buck converter's efficiency using an inductor having inductance curve 2310. As can be observed from graph 2400, the buck converter had a greater efficiency in a load range of approximately 2 to 11 amperes with inductance curve 2310 than with inductance curve 2306.

FIG. 25 is a graph 2500 of the difference in the buck converter's efficiency versus its load current magnitude. Y-axis 2502 represents difference in efficiency, and X-axis 2504 represents the buck converter's load current. Curve 2506 represents the difference in efficiency of the buck converter when an inductor having inductance curve 2306 is replaced with an inductor having inductance curve 2308, and curve 2508 represents the difference in efficiency of the buck converter when an inductor having inductance curve 2306 is replaced with an inductor having inductance curve 2310. As can be observed from graph 2500, use of inductance curve 2308 over inductance curve 2306 results in a large efficiency improvement at very light loads, and use of inductance curve 2310 over inductance curve 2306 results in a large efficiency improvement at somewhat larger, but still light, loads. Thus, FIGS. 24 and 25 provide support for the proposition that a buck or buck derived converter using an embodiment of inductor 100 having an elevated inductance value at small winding current magnitudes will have greater light load efficiency than a converter using an inductor having a relatively constant inductance value. Furthermore, as can be observed by comparing curves 2506 and 2508, the shape of inductor 100's inductance curve may affect the efficiency of a DC-to-DC converter using the inductor. For example, narrow inductance curve 2308 is optimized for better efficiency at lighter loads than wide inductance curve 2310. As another example, if a DC-to-DC converter has a relatively large ripple current, its light load efficiency may generally be higher when using an inductor having a wide inductance curve than with an inductor having a narrow inductance curve because the ripple current magnitude is relatively large compared to light load winding current magnitude.

Figure 26:
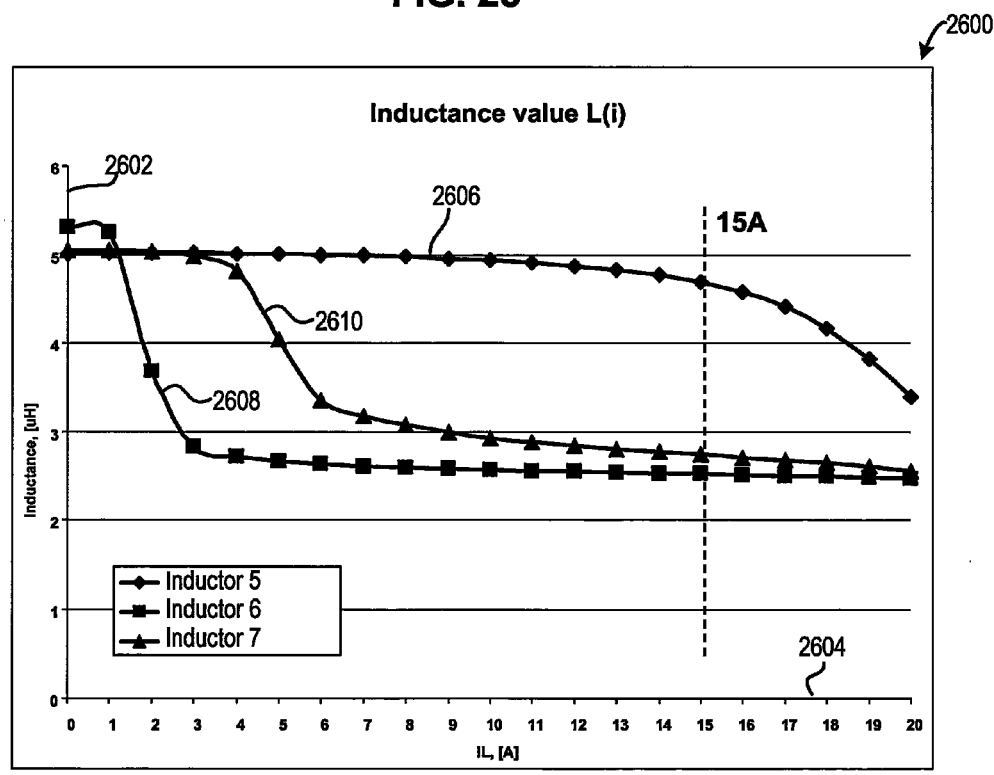
FIG. 26 is a graph of inductance value versus winding current magnitude for three inductors.

Empirical tests were conducted with inductors having an inductance value similar to that of L3 (see FIG. 3, curve 314). FIG. 26 is a graph 2600 of inductance value versus winding current magnitude for three inductors at a test frequency of 200 KHz. Y-axis 2602 represents the inductor's inductance value, and X-axis 2604 represents the inductor's winding current magnitude. Curve 2606 represents an inductor intended to have an essentially constant inductance value of around 5 microhenrys; this inductor will hereinafter be referred to as inductor 5. Curve 2608 represents an inductor having a narrow inductance curve where its inductance value ranges between approximately 5 and 2.5 microhenrys; this inductor will hereinafter be referred to as inductor 6. Curve 2610 represents an inductor having wide inductance curve where the inductance value ranges between about 5 and 2.5 microhenrys; this inductor will hereinafter be referred to as inductor 7.

Inductors 6 and 7 are embodiments of inductor 100 and may be considered to have inductance curves similar to that of L3 of FIG. 3. The construction of inductors 5, 6, and 7 is not shown. However, inductor 5 is similar to inductor 2100 of FIGS. 21 and 22, although inductor 5 has three turns and a larger core than that of inductor 2100. Inductors 6 and 7 are similar to inductor 400 of FIGS. 4 and 5, although inductors 6 and 7 have three turns and a larger core than that of inductor 400. Inductor 7 includes a non-magnetic spacer while inductor 6 does not include a non-magnetic spacer, and first and second sections of inductor 7 overlap more than do corresponding first and second sections of inductor 6.

Figure 27:
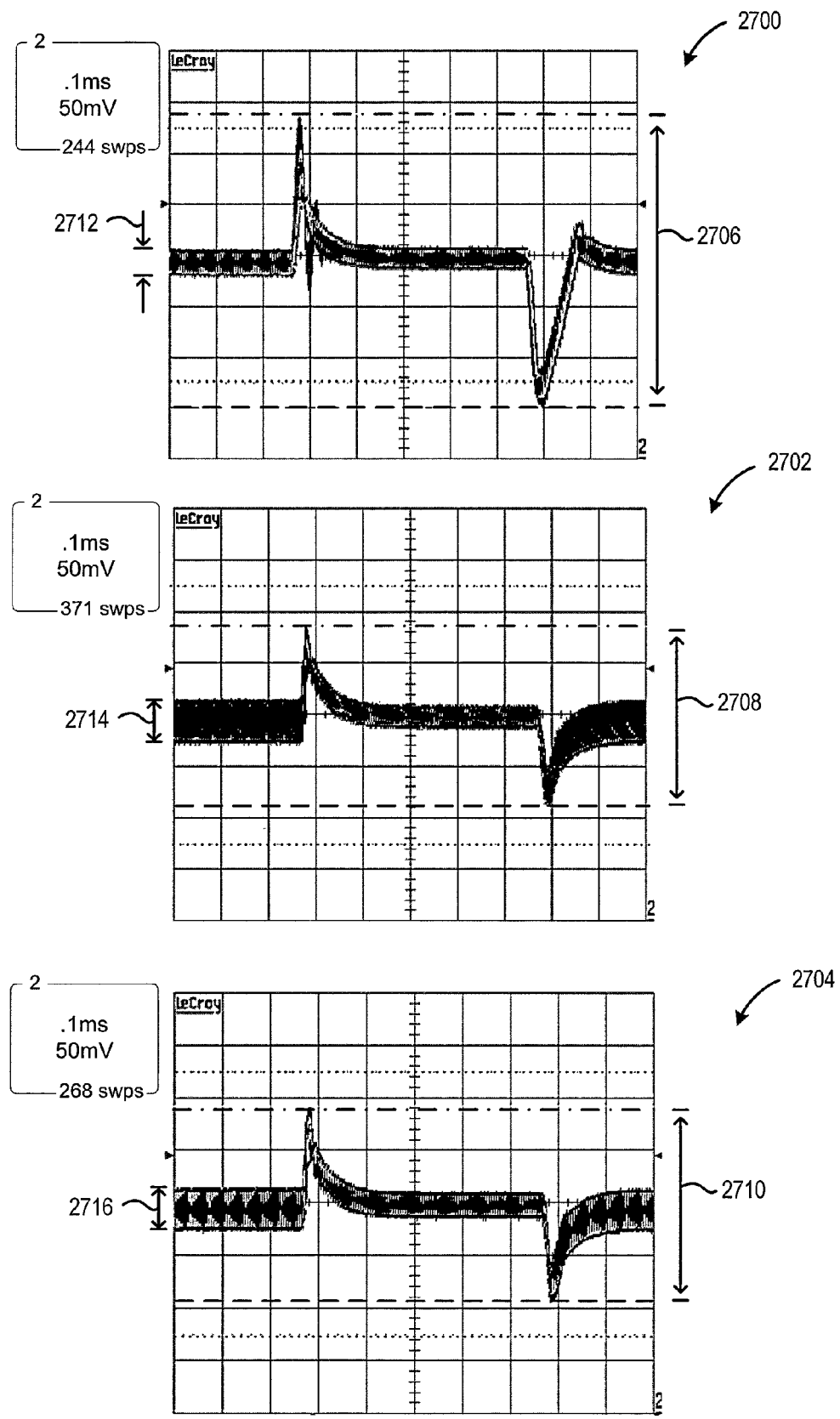
FIG. 27 shows three oscilloscope traces of the output voltage of a buck converter in response to a transient load.

Inductors 5, 6, and 7 that are characterized in FIG. 26 were tested in a single-phase buck converter having a switching frequency of 200 KHz that was converting an input voltage of 10.8 volts to an output voltage of 5 volts. The buck converter powered a transient load having a periodic 15 amperes load step. FIG. 27 shows three oscilloscope traces of the output voltage of the buck converter in response to the transient load. Oscilloscope trace 2700 was captured with the buck converter using inductor 5. The buck converter's output voltage exhibited approximately a 287-millivolts peak-to-peak voltage excursion 2706.

As shown by oscilloscope traces 2702 and 2704, the buck converter exhibited a reduced voltage excursion (and therefore, an improved transient response) when using inductor 6 or inductor 7. Specifically, as shown by oscilloscope trace 2702, the buck converter exhibited a peak-to-peak voltage excursion 2708 of only about 175-millivolts when using the narrow inductor 6. Oscilloscope trace 2704 shows that the buck converter exhibited a peak-to-peak voltage excursion 2710 of approximately 187-millivolts when using the wide inductor 7.

It can be observed from FIG. 27 that the peak-to-peak ripple voltage at heavy load is significantly greater when the buck converter uses inductor 6 or inductor 7 than when using inductor 5. Specifically, heavy load peak-to-peak ripple voltages 2714 and 2716 of respective oscilloscope traces 2702 and 2704 are significantly greater than heavy load peak-to-peak ripple voltage 2712 of oscilloscope trace 2700. The increased ripple voltage at heavy loads of inductors 6 and 7 compared to inductor 5 is due to inductors 6 and 7 having a smaller inductance value at heavy loads than inductor 5.

Figure 28:
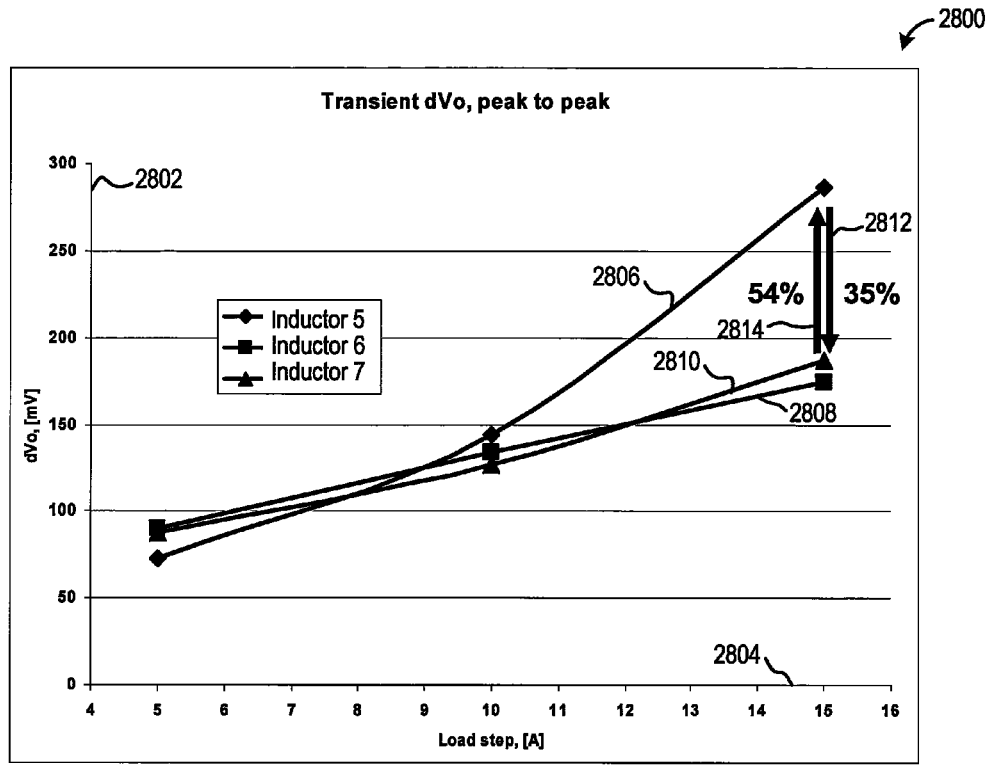
FIG. 28 is a graph of voltage excursion magnitude as a function of load step magnitude of a buck converter.

FIG. 28 is a graph 2800 of voltage excursion magnitude as a function of load step magnitude for the buck converter characterized in FIG. 27 using one of inductors 5, 6, and 7. Y-axis 2802 represents the buck converter's peak-to-peak output voltage excursion magnitude in response to the step load, and X-axis 2804 represents the magnitude of the step load. Curve 2806 corresponds to the buck converter using inductor 5; curve 2808 corresponds to the buck converter using narrow inductor 6; and curve 2810 corresponds to the buck converter using wide inductor 7. As can be observed from FIG. 28, the buck converter exhibited a smaller voltage excursion at large load steps when using inductors 6 and 7 having a non-linear inductance than when using relatively constant inductor 5. As indicated by arrow 2812, the buck converter's transient response at a 15-ampere step load can be improved by approximately 35% by using inductor 6 or 7 in place of inductor 5. Alternately, as indicated by arrow 2814, the buck converter's transient response degrades by approximately 54% at a 15-ampere step load when inductor 6 or 7 is replaced with inductor 5.

Thus, FIGS. 27 and 28 support the proposition that a buck converter using an inductor with an inductance value that decreases below a base line value at heavy loads has a better transient response than a buck converter using an inductor with an inductance value that remains essentially constant at the base line value. Furthermore, as can be observed from FIGS. 27 and 28, the shape of inductor 100's inductance curve may affect the transient response of a DC-to-DC converter using the inductor.

Figure 29:
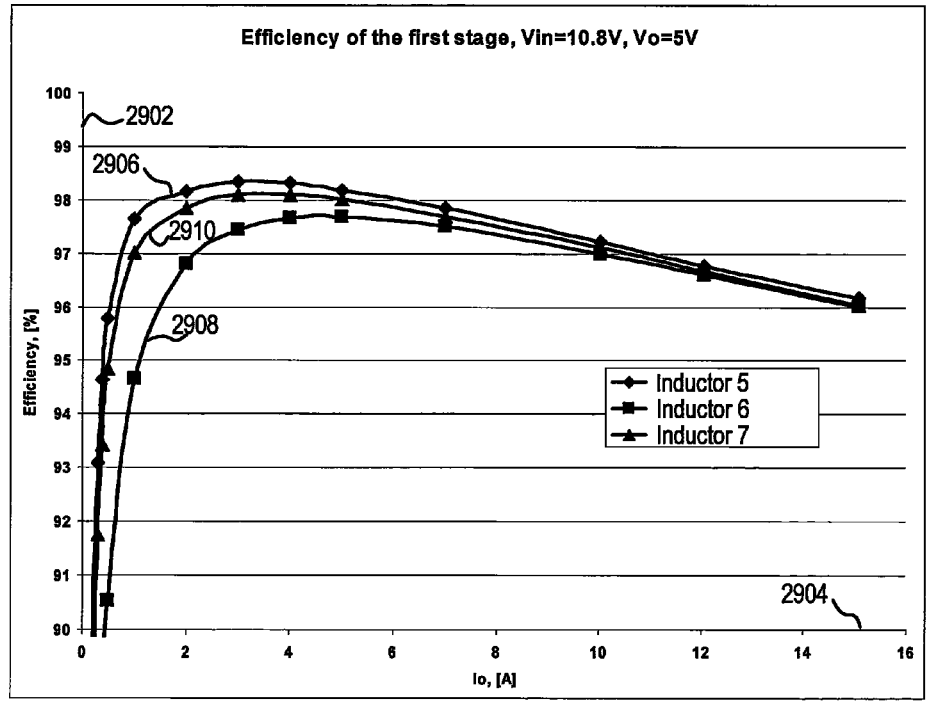
FIG. 29 is a graph of efficiency of a buck converter versus its load.

FIG. 29 is a graph 2900 of efficiency of the buck converter characterized in FIGS. 27 and 28 versus its load. Y-axis 2902 represent the buck converter's efficiency, and X-axis 2904 represents the buck converter's load. Curve 2906 corresponds to the buck converter using relatively constant inductor 5 characterized by curve 2606 in FIG. 26; curve 2908 represents the buck converter using narrow-range nonlinear inductor 6 characterized by curve 2608 in FIG. 26; and curve 2910 represents the buck converter using wide-range non-linear inductor 7 characterized by curve 2610 in FIG. 26. As can be observed from FIG. 29, although the buck converter's efficiency drops somewhat if inductor 5 is replaced with inductor 6 or 7, such efficiency drop is relatively minor, and is almost non-existent at heavy loads. Accordingly, inductors 6 or 7 can be used to significantly improve a buck converter's transient response, as illustrated in FIGS. 27-28, with only modest (if any) efficiency decrease, as shown by FIG. 29. In contrast, if a buck converter's transient response were improved by simply lowering the inductance value of an inductor having a fixed inductance value (e.g., lowering the inductance value of inductor 5 characterized in FIG. 26), the buck converter's light load efficiency would drop significantly more so than when using variable inductors 6 and 7.

In the particular examples of FIGS. 26-29, the buck converter using inductor 6 (narrow inductance curve 2608, FIG. 26) has a similar transient response to the buck converter using inductor 7 (wide inductance curve 2610, FIG. 26), as shown in FIGS. 27 and 28. However, the efficiency of the buck converter using inductor 7 is generally higher than the buck converter using inductor 6, as shown in FIG. 29. Accordingly, it may be desirable to use inductor 7 instead of inductor 6 in the particular buck converter used in the examples of FIGS. 26-29.

As discussed above, embodiments of inductor 100 may be a coupled inductor; that is embodiments of inductor 100 may have two or more windings that are magnetically coupled together, where such coupling is defined in U.S. Pat. No. 6,362,986 to Schultz et al. ("the '986 patent"), which is incorporated herein by reference in its entirety. Additionally, embodiments of inductor 100 that are coupled inductors may be used in isolated topologies, such as described in U.S. Pat. No. 7,239,530 to Djekic et al. ("the '530 patent"), which is incorporated herein by reference in its entirety. A coupled inductor may be used in a DC-to-DC converter having a plurality of power conversion units connected in parallel, such as a multiphase buck converter. Use of a plurality of power conversion units connected in parallel in a DC-to-DC converter may improve the converter's performance, improve the converter's efficiency, reduce the converter's size, and/or reduce converter's cost. Use of a coupled inductor in a DC-to-DC converter having a plurality of power conversion units connected in parallel may improve the converter's performance, as discussed in the '986 patent or in the '530 patent.

Each winding of a coupled inductor has a respective leakage inductance, and the coupled inductor has a common magnetizing inductance, as discussed in the '986 patent. In a DC-to-DC converter including a coupled inductor, the coupled inductor's leakage inductance values heavily affect the converter's transient response and efficiency. Accordingly, embodiments of inductor 100 that are coupled inductors have windings with non-linear leakage inductance values, where the windings' leakage inductance values decrease as the magnitude of current flowing through the winding increases, such as in a range of currents anticipated in normal operation of the coupled inductor. Note that the windings' leakage inductance values need not necessarily be identical, and each winding's respective leakage inductance value need not necessarily decrease at the same rate as the respective leakage inductance value of each other winding.

In a similar manner to that discussed above with respect single-phase inductors, coupled-inductor multiphase embodiments of inductor 100 may include a magnetic core including one or more of the following features for causing leakage inductance of each winding to decrease as the magnitude of current flowing through the winding increases: (1) one or more saturable magnetic elements, (2) one or more gaps of non-uniform thickness, (3) a distributed gap core material, such as a powered iron core material having a soft saturation characteristic, and (4) a non-homogenous core. Examples of coupled inductor magnetic cores that may be configured and arranged to include at least one of features (1)-(4) include, but are not limited to, magnetic cores disclosed in U.S. Patent Application Publication No. 20080246577 by Sullivan et al., which is incorporated herein by reference. Additionally, specific examples of inductors including cores with saturable magnetic elements are discussed below with respect to FIGS. 31, 41-76, and 78-85, and specific examples of inductors including cores with non-uniform gaps are discussed below with respect to FIGS. 86-87 and 89-90.

In embodiments of inductor 100 that are coupled inductors, magnetic coupling between the two or more windings generally changes as the windings' leakage inductance values change. However, if the magnetizing inductance of such inductors is sufficiently large, the magnetic coupling between such windings will remain relatively high, thereby allowing the inductor to retain advantages associated with it being a coupled inductor as its leakage inductance values decrease.

Figure 30:
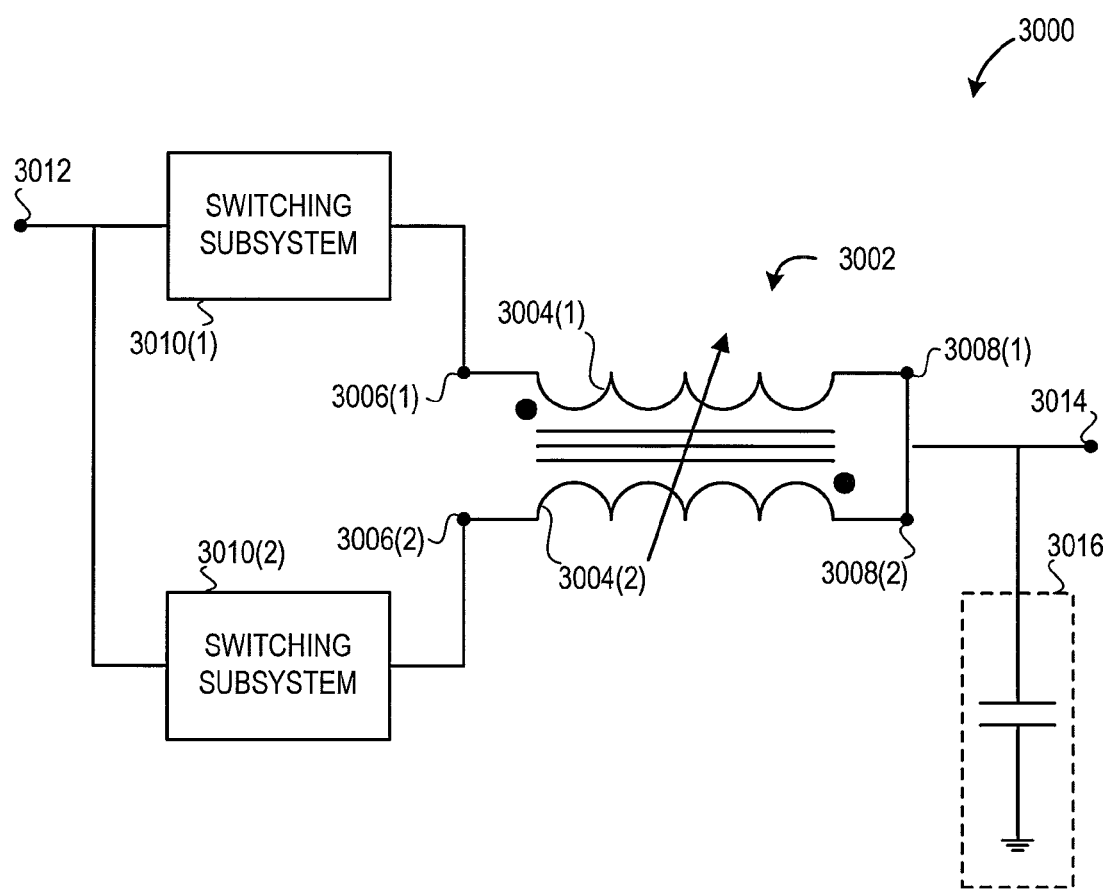
FIG. 30 schematically illustrates one DC-to-DC converter including a coupled inductor, according to an embodiment.

FIG. 30 schematically illustrates one DC-to-DC converter 3000 including a coupled inductor 3002. DC-to-DC converter 3000 is, for example, a multiphase buck converter; in such embodiments of DC-to-DC converter 3000, coupled inductor 3002 is a coupled buck inductor. DC-to-DC converter 3000 has an output current ranging from $I_1$ to $I_2$ during anticipated normal operation of DC-to-DC converter 3000, where $I_2$ is greater than $I_1$. For example, $I_1$ may be a minimum output current rating (e.g., zero amperes) and $I_2$ may be a maximum output current rating of DC-to-DC converter 3000.

Coupled inductor 3002 has two windings 3004 that are magnetically coupled together. However, coupled inductor 3002 can have more than two windings that are magnetically coupled together. Coupled inductor 3002 is an embodiment of inductor 100. Accordingly, windings 3004's leakage inductance values decrease as the magnitude of current flowing through the windings increases. For example, coupled inductor 3002 may include a magnetic core configured and arranged such that a respective leakage inductance value of each winding decreases with increasing current through the winding in output current range $I_1$ to $I_2$. In an embodiment of DC-to-DC converter 3000, each winding 3004's leakage inductance value at $I_1$ is 1.5 times to 3.5 times greater than the winding's leakage inductance value at $I_2$. However, the leakage inductance swing of coupled inductor 3002 is a design choice and may vary as appropriate for the application of coupled inductor 3002. In particular, the leakage inductance swing may be chosen to provide an acceptable compromise between efficiency and transient response. As was previously discussed, if the leakage inductance swing is too large, core losses in coupled inductor 3002 may be unacceptably high.

Each winding 3004 has a first terminal 3006 and a second terminal 3008. DC-to-DC converter 3000 includes a switching subsystem 3010 for each winding 3004. Each switching subsystem 3010 couples first terminal 3006 of its respective winding 3004 to an input power source 3012. Each switching subsystem 3010 alternately charges and discharges its respective winding 3004 in order to regulate the output voltage on output node 3014. Switching subsystems 3010, for example, include a high side switch and a low side switch configured such that DC-to-DC converter 3000 operates as a multi-phase buck converter. Each second terminal 3008 is electrically coupled to output node 3014, either within coupled inductor 3002 or external to coupled inductor 3002. An output filter 3016 is electrically coupled to output node 3014.

FIG. 31 is a cross sectional view of one coupled inductor 3100. Coupled inductor 3100, which is a two-phase coupled inductor, is an embodiment of inductor 100. Coupled inductor 3100 includes a magnetic core including rectangular magnetic element 3110 and saturable magnetic elements 3104 and 3106 protruding from rectangular magnetic element 3110. Windings 3108(1) and 3108(2) are wound through rectangular magnetic element 3110 and a respective saturable magnetic element 3104 or 3106. Saturable magnetic elements 3104 and 3106 cause each of windings 3108(1) and 3108(2) to have non-linear leakage inductance values that decrease as the magnitude of current flowing through the winding increases. For example, windings 3108 may have respective leakage inductance values that decrease with increasing winding current during anticipated normal operation of coupled inductor 3100. Saturable magnetic elements 3104 and 3106 may be formed of the same material as rectangular magnetic element 3110. Alternately, saturable magnetic elements 3104 and 3106 may be formed of a different material (e.g., a higher permeability material) than rectangular magnetic element 3110. Prototypes of coupled inductor 3100 were constructed and tested, as discussed below.

In order to compare the performance of coupled inductor 3100 to a coupled inductor with relatively constant leakage inductance values, prototypes of coupled inductor 3200 were constructed. FIG. 32 is a cross sectional view of coupled inductor 3200. Coupled inductor 3200 includes core 3202 and windings 3204(1) and 3204(2) wound through core 3202. Windings 3204(1) and 3204(2) are magnetically coupled together, and in contrast with the windings of inductor 3100, the respective leakage inductance value of each of windings 3204(1) and 3204(2) remains relatively constant as the magnitude of current flowing through the winding varies during normal operation of inductor 3200.

FIG. 33 is a graph 3300 of a winding's leakage inductance value versus winding current magnitude for each of inductors 3100 and 3200. The curves of graph 3300 were derived from empirical test data from prototypes of inductors 3100 and 3200. Y-axis 3302 represents each winding's leakage inductance value, and X-axis 3304 represents the winding current magnitude. Curve 3306 corresponds to inductor 3200, and curve 3308 corresponds to inductor 3100. As can be observed from FIG. 33, inductor 3200's leakage inductance values remain largely constant as the magnitude of current flowing through inductor 3200's windings changes. In contrast, inductor 3100's leakage inductance values decrease as the magnitude of current flowing through inductor 3100's windings increases.

Figure 34:
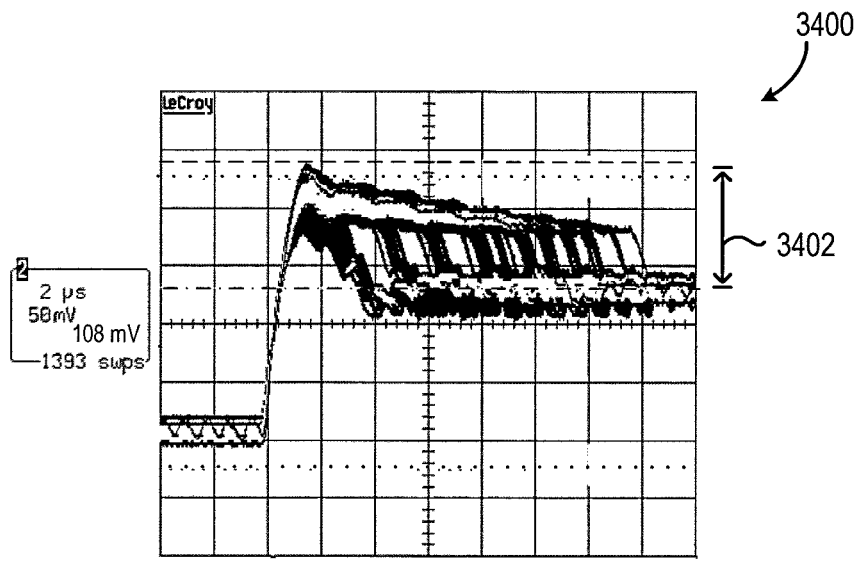
FIG. 34 is an oscilloscope trace of the output of a buck converter using the inductor of FIG. 32 in response to a transient load.
Figure 35:
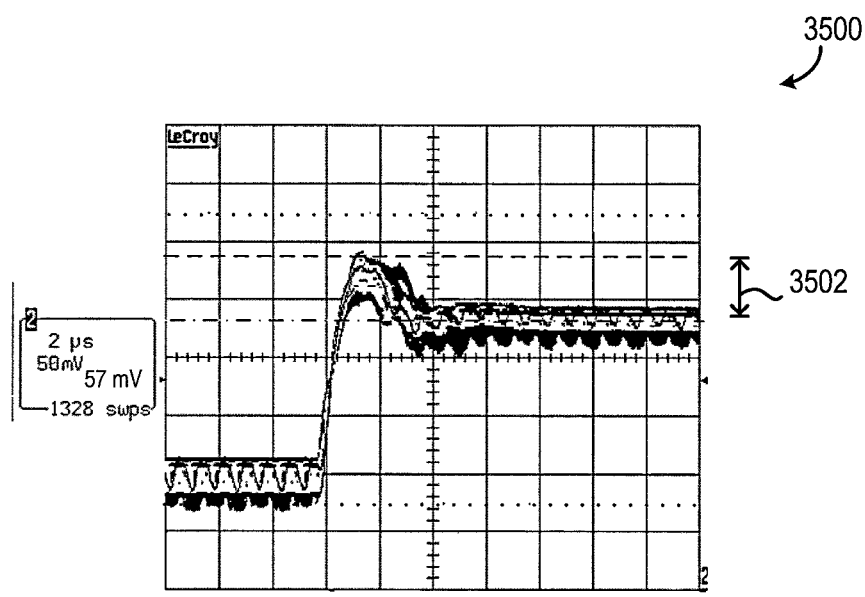
FIG. 35 is an oscilloscope trace of the output of a buck converter using the inductor of FIG. 31 in response to a transient load.

Transient response of a two-phase buck converter was tested using prototypes of inductor 3100 as well as prototypes of inductor 3200. FIG. 34 is an oscilloscope trace 3400 of the output of the buck converter using inductor 3200 under a transient load consisting of a 40 ampere to zero ampere load transition. As can be observed from FIG. 34, the buck converter's output voltage exhibited approximately an 108-millivolt voltage excursion 3402. FIG. 35 is an oscilloscope trace 3500 of the output of the buck converter using inductor 3100 under the same transient load as in FIG. 34. However, as can be observed from FIG. 35, the buck converter's output voltage exhibited an excursion 3502 of only about 57-millivolts when using inductor 3100.

Figure 36:
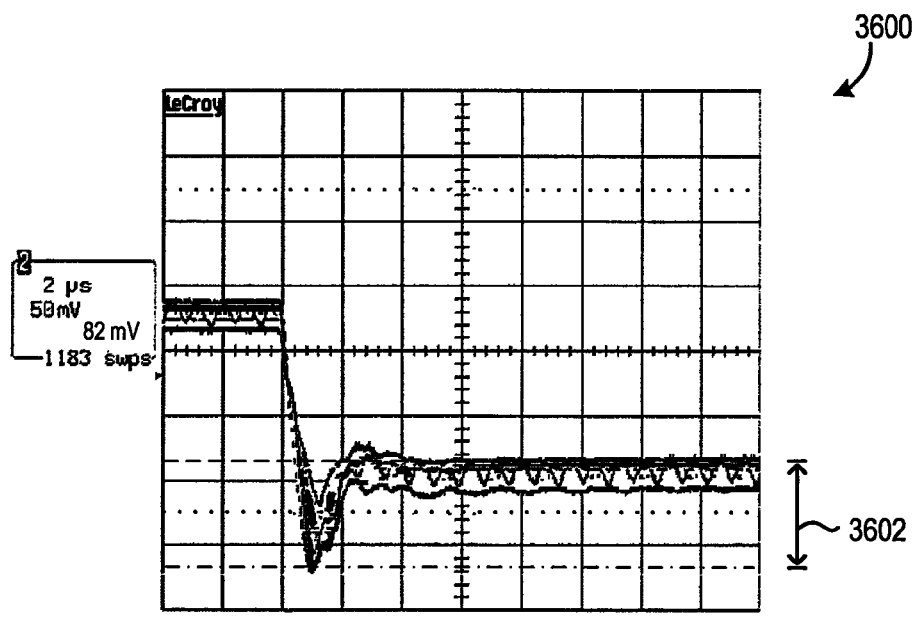
FIG. 36 is an oscilloscope trace of the output of a buck converter using the inductor of FIG. 32 in response to a transient load.
Figure 37:
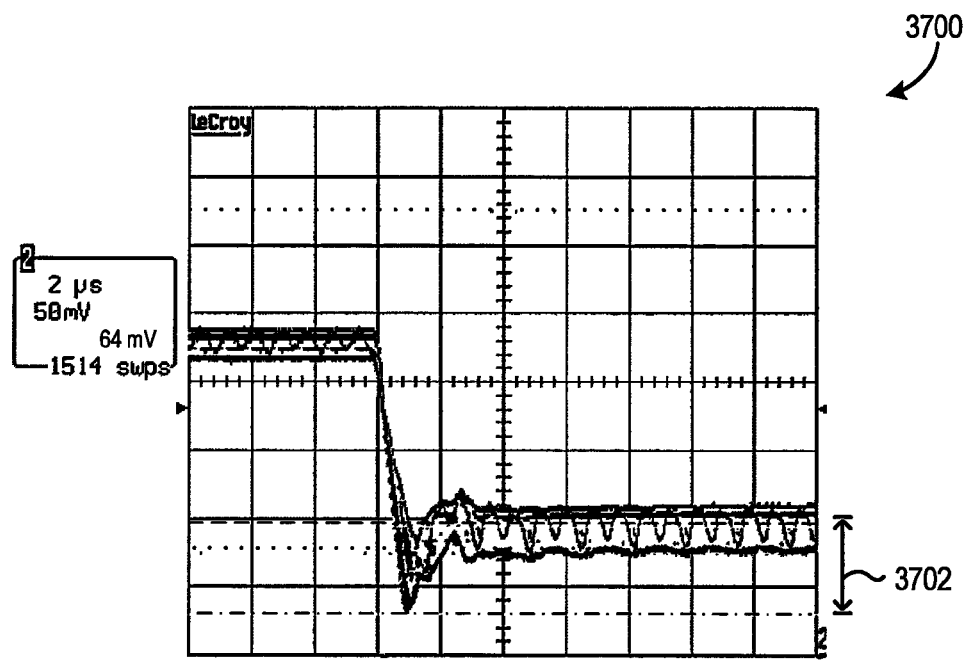
FIG. 37 is an oscilloscope trace of the output of a buck converter using the inductor of FIG. 31 in response to a transient load.

FIG. 36 is an oscilloscope trace 3600 of the output of the buck converter using inductor 3200 under a transient load consisting of a zero ampere to a 40-ampere transition. As can be observed from FIG. 36, the buck converter's output voltage exhibited approximately an 82-millivolt voltage excursion 3602. FIG. 37 is an oscilloscope trace 3700 of the output of the buck converter using inductor 3100 under the same transient load as in FIG. 36. However, as can be observed from FIG. 37, the buck converter's output voltage exhibited an excursion 3702 of only about 64 millivolts when using inductor 3100. As can be observed from FIGS. 34-37, the buck converter's transient response is improved by using inductor 3100 having variable leakage inductance values instead of inductor 3200 having relatively constant leakage inductance values.

Figure 38:
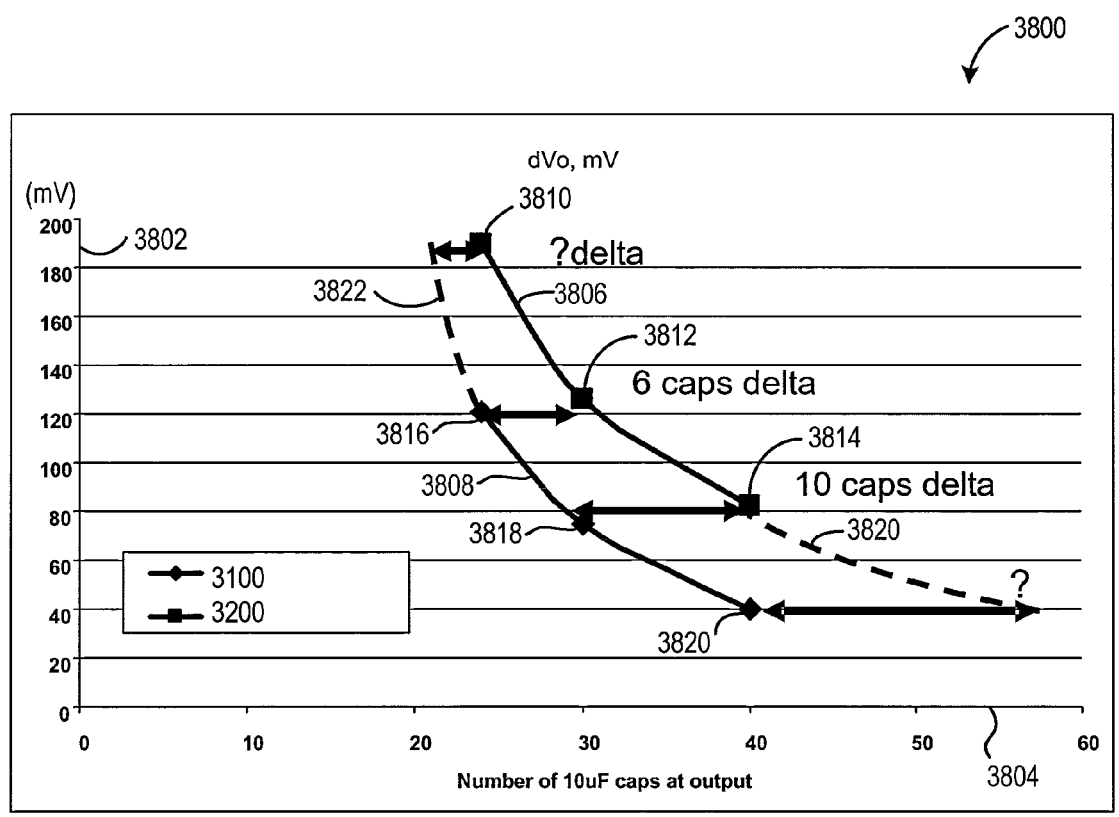
FIG. 38 is a graph of peak-to-peak output voltage excursion magnitude in response to a load step versus quantity of output capacitors.

The buck converter's transient response was further tested using inductors 3100 and 3200 with three different quantities of output capacitors. FIG. 38 is a graph 3800 of peak-to-peak output voltage excursion magnitude in response to a load step versus quantity of output capacitors. The load step was a transition from zero amperes to 40 amperes and back, and each capacitor had a capacitance value of 10 microfarads. Y-axis 3802 represents a voltage excursion magnitude consisting of the sum of overshoot and undershoot minus a nominal voltage droop resulting from the buck converter's effective output resistance. X-axis 3804 represents the quantity of 10-microfarad capacitors on the buck converter's output node.

Curve 3806 corresponds to the buck converter using inductor 3200. Three data points 3810, 3812, and 3814 were used to construct curve 3806. Curve 3808 corresponds to the buck converter using coupled inductor 3100. Three data points 3816, 3818, and 3820 were used to construct curve 3808. Dashed line portion 3820 of curve 3806 represents the predicted path of curve 3806 when the buck converter has an increased quantity of output capacitors. Similarly, dashed line 3822 represents the predicted path of curve 3808 when the buck converter has as a reduced quantity of output capacitors.

As can be observed from FIG. 38, use of inductor 3100 instead of inductor 3200 advantageously reduces the quantity of output capacitors required to limit the maximum voltage excursion to a particular value. Accordingly, use of inductor 3100 instead of inductor 3200 in the buck converter may advantageously allow the buck converter's size and/or cost to be reduced by reducing the quantity of output capacitors required.

The advantages of using inductor 3100 over inductor 3200 are amplified under tighter output voltage regulation requirements where the maximum allowable peak-to-peak output voltage excursion is reduced. For example, as can be observed from FIG. 38, if the maximum allowable peak-to-peak voltage excursion is 120 millivolts, approximately 6 fewer output capacitors are required if inductor 3100 is used instead of inductor 3200. However, if the output voltage regulation requirement is tightened such that the peak-to-peak voltage excursion may not exceed 80 millivolts, approximately 10 fewer capacitors are required if inductor 3100 is used instead of inductor 3200.

FIGS. 41-76 and 78-85 show various embodiments of coupled inductors including at least one saturable magnetic element, each of which are embodiments of inductor 100. Accordingly, each of the windings of the inductors of FIGS. 41-76 and 78-85 has a leakage inductance value that decrease as the magnitude of current flowing through the winding increases. For example, each of the inductors of FIGS. 41-76 and 78-85 may include a magnetic core configured and arranged such that a respective leakage inductance value of each winding decreases with increasing current flowing through the winding in a range of currents anticipated in normal operation of the coupled inductor.

Figure 39:
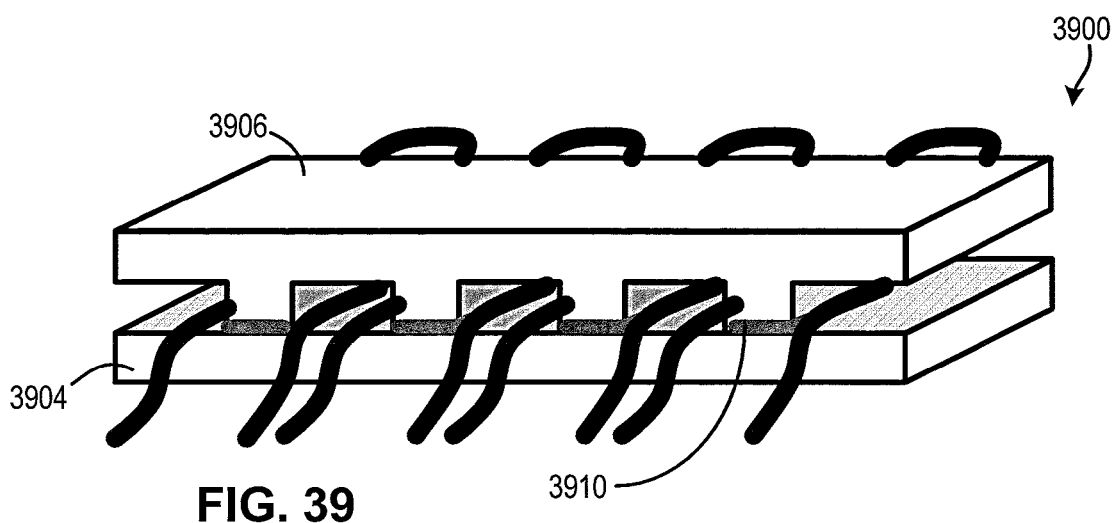
FIG. 39 is a side perspective view of one coupled inductor, according to an embodiment.
Figure 40:
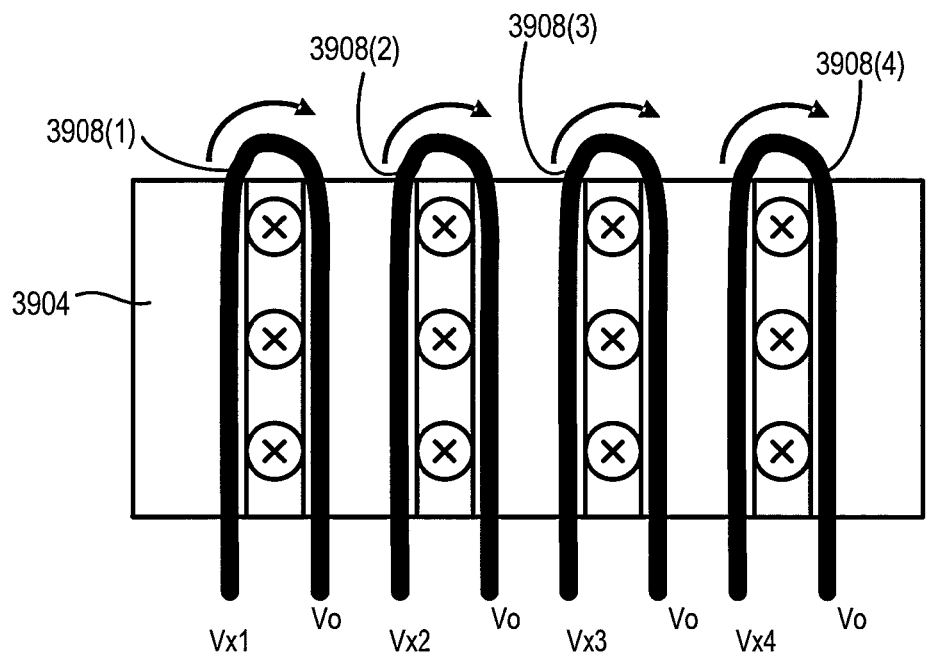
FIG. 40 is a cross sectional view of the coupled inductor of FIG. 39.

It may be helpful to refer to an inductor with relatively constant leakage inductance values before turning to coupled inductors with non-linear leakage inductance values. FIG. 39 is a side perspective view of one coupled inductor 3900 having relatively constant leakage inductance values. Although coupled inductor 3900 is illustrated as having four phases, coupled inductor 3900 can have any number of phases greater than one. Coupled inductor 3900 includes a core having first magnetic element 3904 and second magnetic element 3906. A non-magnetic spacer or air gap 3910 is disposed between first magnetic element 3904 and second magnetic element 3906. FIG. 40 is a cross sectional view of coupled inductor 3900. Windings 3908 are completely visible in FIG. 40.

Figure 41:
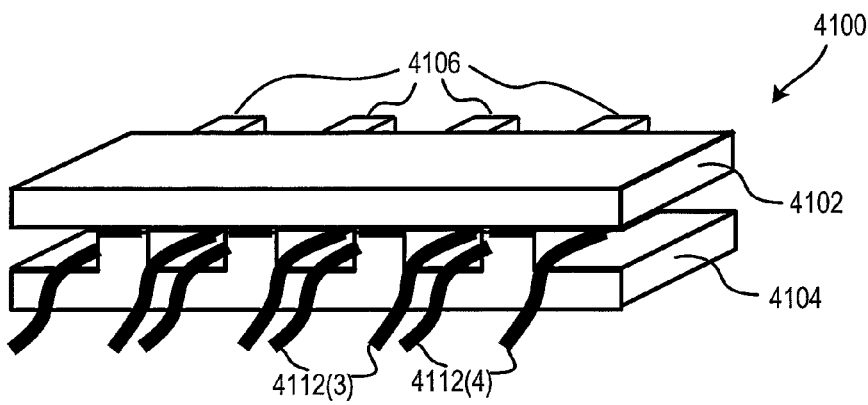
FIG. 41 is a side perspective view of one M-phase coupled inductor, according to an embodiment.
Figure 42:
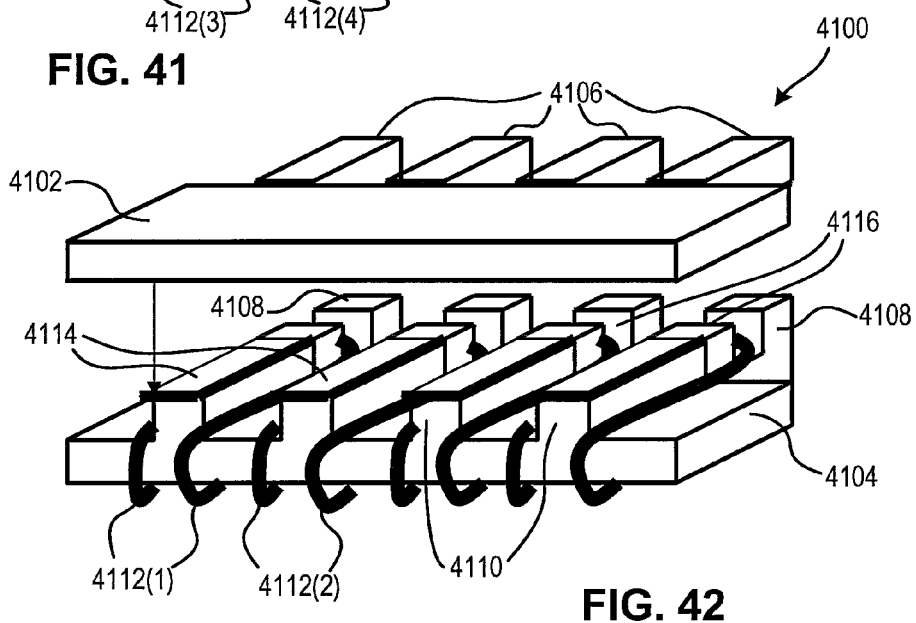
FIG. 42 is an exploded side perspective view of the coupled inductor of FIG. 41.

FIG. 41 is a side perspective view and FIG. 42 is an exploded side perspective view of one M-phase coupled inductor 4100, where M is an integer greater than one. Although coupled inductor 4100 is illustrated as being a four phase coupled inductor (M=4), coupled inductor 4100 can have any number of phases greater than one.

Figure 43:
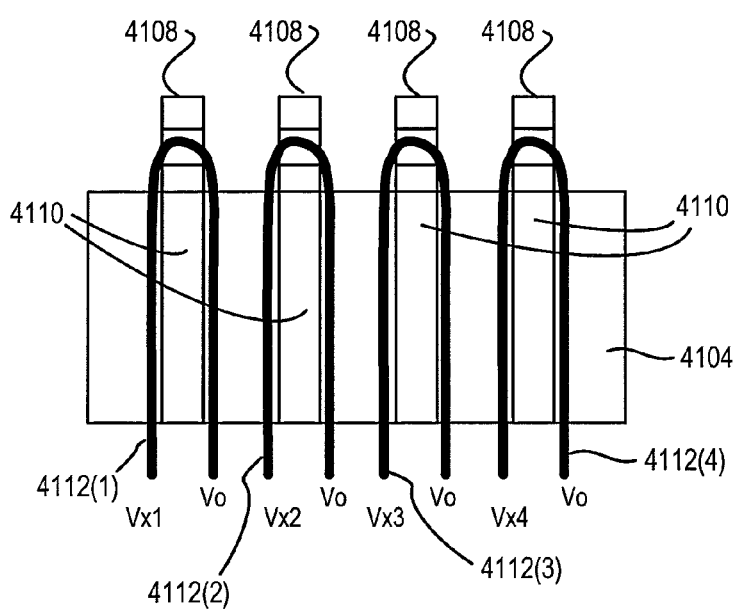
FIG. 43 is a cross sectional view of the coupled inductor of FIG. 41.

Coupled inductor 4100 includes a core having a first magnetic element 4104 and a second magnetic element 4102. FIG. 43 is a cross sectional view of coupled inductor 4100 with second magnetic element 4102 removed. First magnetic element 4104 includes M teeth 4110. A non-magnetic spacer or air gap 4114 separates each tooth 4110 from second magnetic element 4102 in order to prevent excessive drop in the leakage inductance values of coupled inductor 4100's windings.

Coupled inductor 4100's core further includes M saturable magnetic elements 4108. Saturable magnetic elements 4108, which may have a U-shape as shown in FIGS. 41-43, are for example disposed adjacent to first magnetic element 4104 such that each saturable magnetic element 4108 is disposed collinear to a respective tooth 4110. Saturable magnetic elements 4108 may be discrete components or be part of first magnetic element 4104. Saturable magnetic elements 4108 may be, but need not be, formed of a different material than second magnetic element 4102 and/or first magnetic element 4104. For example, saturable magnetic elements 4108 may be formed of a material having a higher permeability than the one or more materials forming second magnetic element 4102 and first magnetic element 4104. A respective magnetic element 4106 is disposed over each saturable magnetic element 4108. Magnetic elements 4106 have, for example, a rectangular shape. Each saturable magnetic element 4108 and its respective magnetic element 4106 collectively form a passageway 4116.

Coupled inductor 4100 further includes M windings 4112. Each winding 4112 is at least partially wound about a respective tooth 4110 and through a passageway 4116 of a respective saturable magnetic element 4108 to form for example about a 180 degree turn in the winding within the saturable magnetic element. Each winding 4112 has a respective leakage inductance and is magnetically coupled to each other winding 4112. Saturable magnetic elements 4108 saturate as the magnitude of current flowing through windings 4112 increases, thereby causing the leakage inductance values of windings 4112 to decrease in proportion to the magnitude of current flowing through the windings.

Figure 44:
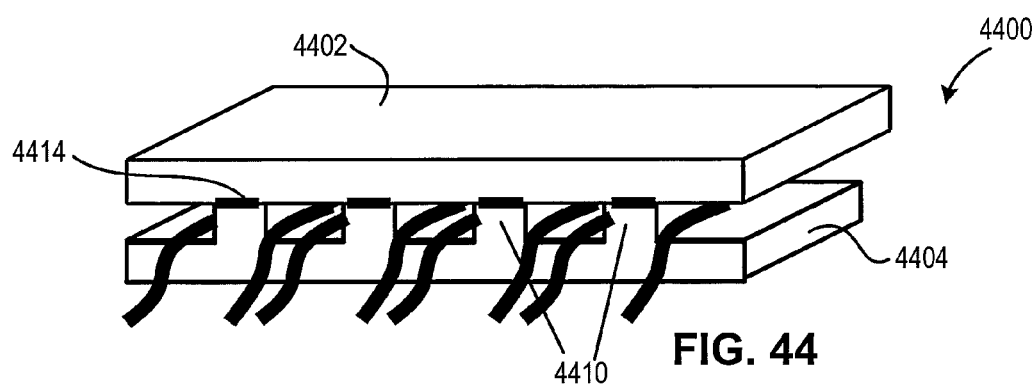
FIG. 44 is a side perspective view of one M-phase coupled inductor, according to an embodiment.
Figure 45:
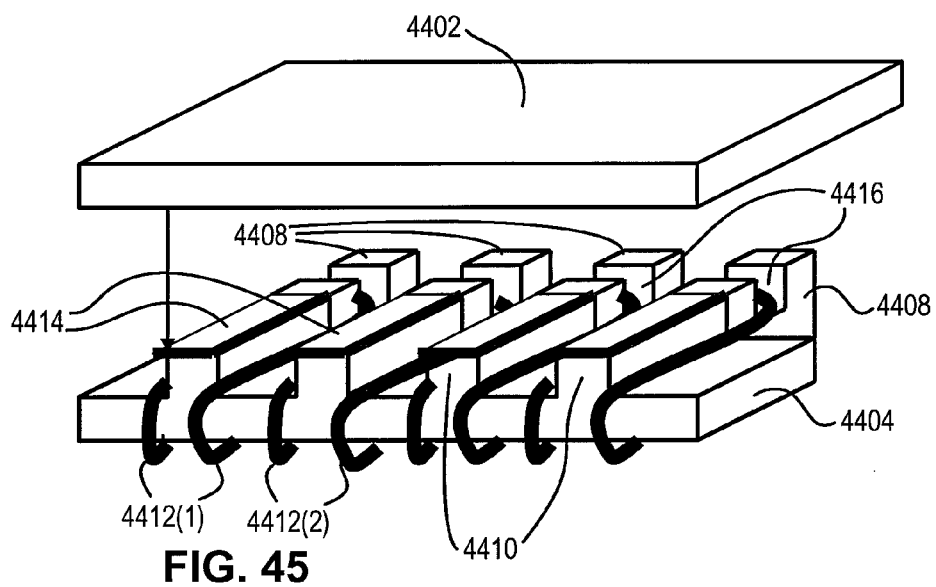
FIG. 45 is an exploded side perspective view of the coupled inductor of FIG. 44.

FIG. 44 is a side perspective view and FIG. 45 is an exploded side perspective view of one M-phase coupled inductor 4400, where M is an integer greater than one. Although coupled inductor 4400 is illustrated as being a four phase coupled inductor (M=4), coupled inductor 4400 can have any number of phases greater than one.

Figure 46:
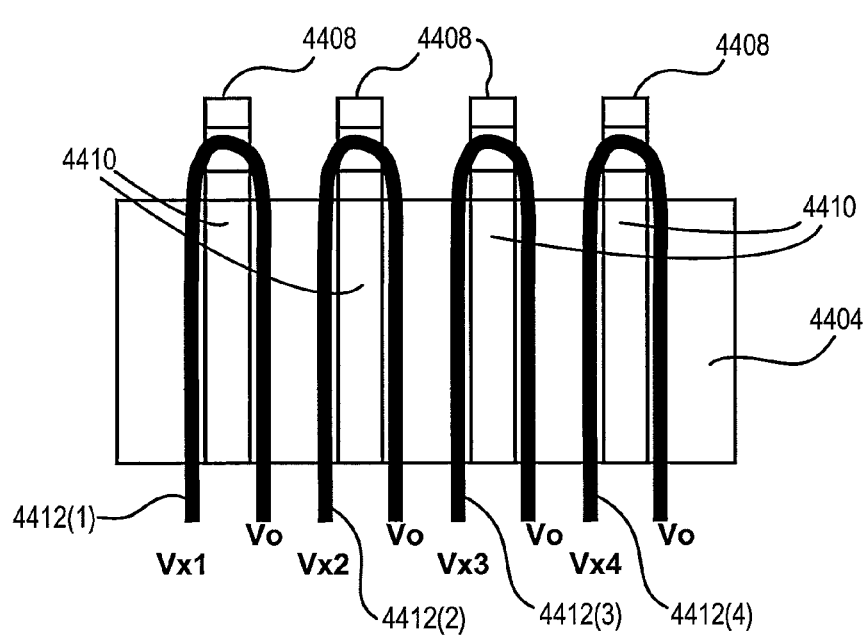
FIG. 46 is a cross sectional view of the coupled inductor of FIG. 44.

Coupled inductor 4400 includes a core having a first magnetic element 4404 and a second magnetic element 4402. FIG. 46 is a cross sectional view of coupled inductor 4400 with second magnetic element 4402 removed. First magnetic element 4404 includes M teeth 4410. A non-magnetic spacer or air gap 4414 separates each tooth 4410 from second magnetic element 4402 in order to prevent excessive drop in the leakage inductance values of coupled inductor 4400.

The core of coupled inductor 4400 further includes M saturable magnetic elements 4408, each for example having a U-shape. Each saturable magnetic element 4408 is for example disposed adjacent to first magnetic element 4404 such that each saturable magnetic element 4408 is disposed collinear to a respective tooth 4410. Saturable magnetic elements 4408 may be discrete components or may be part of first magnetic element 4404. Saturable magnetic elements 4408 may be, but need not be, formed of a different material than second magnetic element 4402 and/or first magnetic element 4404. For example, saturable magnetic elements 4408 may be formed of a material having a higher permeability than the one or more materials forming second magnetic element 4402 and first magnetic element 4404. Second magnetic element 4402 extends over each saturable magnetic element 4408 to form a passageway 4416 in each saturable magnetic element.

Coupled inductor 4400 further includes M windings 4412. Each winding 4412 is at least partially wound about a respective tooth 4410 and through a passageway 4416 of a respective saturable magnetic element 4408 to form for example about a 180 degree turn in the winding within the saturable magnetic element. Each winding 4412 has a respective leakage inductance and is magnetically coupled to each other winding 4412. Saturable magnetic elements 4408 saturate as the magnitude of current flowing through windings 4412 increases, thereby causing the leakage inductance values of windings 4412 to decrease in proportion to the magnitude of current flowing through the windings.

Figure 47:
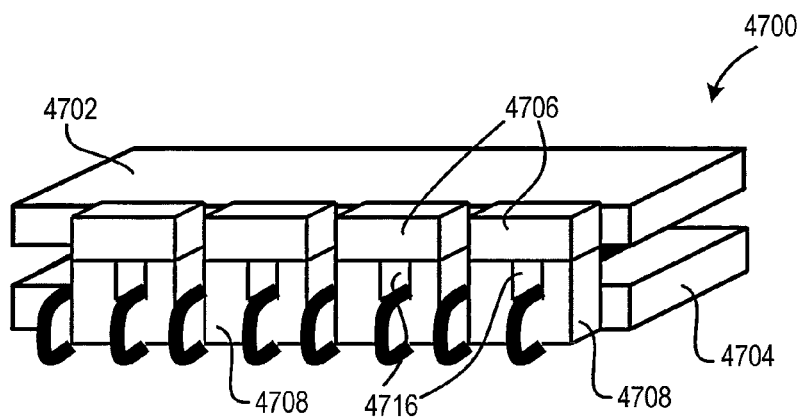
FIG. 47 is a side perspective view of one M-phase coupled inductor, according to an embodiment.
Figure 48:
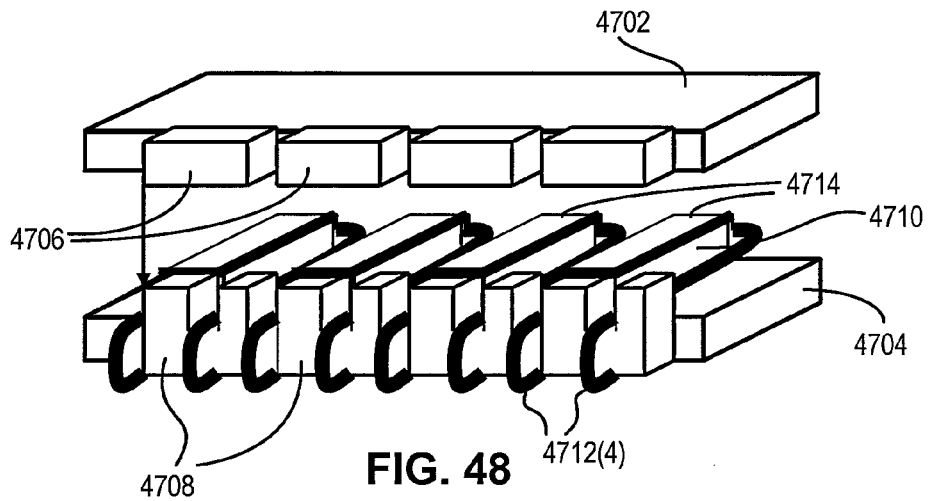
FIG. 48 is an exploded side perspective view of the coupled inductor of FIG. 47.

FIG. 47 is a side perspective view and FIG. 48 is an exploded side perspective view of one M-phase coupled inductor 4700, where M is an integer greater than one. Although coupled inductor 4700 is illustrated as being a four phase coupled inductor (M=4), coupled inductor 4700 can have any number of phases greater than one.

Figure 49:
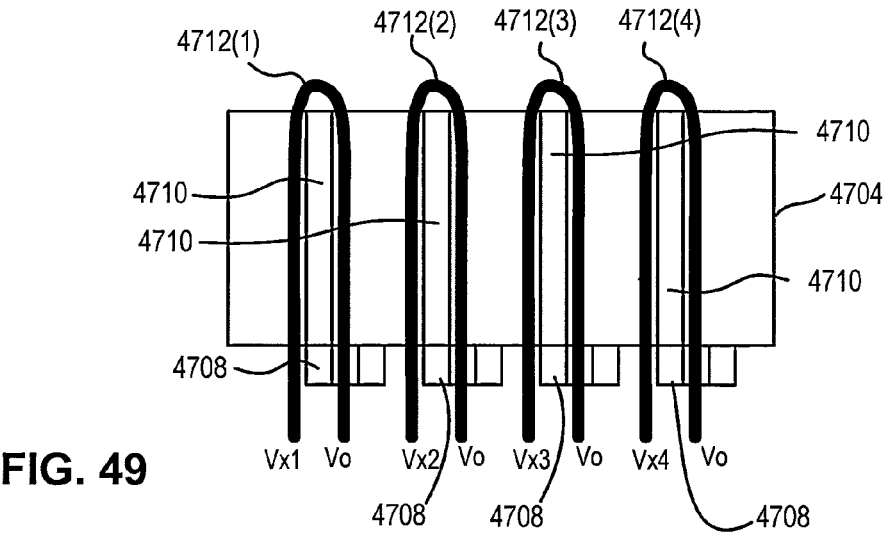
FIG. 49 is a cross sectional view of the coupled inductor of FIG. 47.

Coupled inductor 4700 includes a core having a first magnetic element 4704 and a second magnetic element 4702. FIG. 49 is a cross sectional view of coupled inductor 4700 with second magnetic element 4702 removed. First magnetic element 4704 includes M teeth 4710, and a non-magnetic spacer or air gap 4714 separates each tooth 4710 from second magnetic element 4702. The non-magnetic spacers or air gaps 4714 prevent the leakage inductance values of the windings of coupled inductor 4700 from excessively decreasing as the magnitude of current through the windings increases.

The magnetic core of coupled inductor 4700 further includes M saturable magnetic elements 4708, each for example having a U-shape. Saturable magnetic elements 4708 may be discrete magnetic elements or may be part of first magnetic element 4704. Saturable magnetic elements 4708 may be, but need not be, formed of a different material than second magnetic element 4702 and/or first magnetic element 4704. For example, saturable magnetic elements 4708 may be formed of a material having a higher permeability than the one or more materials forming second magnetic element 4702 and first magnetic element 4704. One respective magnetic element 4706 is disposed on each saturable magnetic element 4708 to collectively form a passageway 4716 in each saturable magnetic element. Magnetic elements 4706 each have, for example, a rectangular shape. Each saturable magnetic element 4708 is for example disposed partially collinear to a respective tooth 4710 such that its passageway 4716 is displaced from the respective tooth and the remaining teeth.

Coupled inductor 4700 includes M windings 4712. Each winding 4712 is at least partially wound about a respective tooth 4710 and through the passageway 4716 of a respective saturable magnetic element 4708. Each winding 4712 is magnetically coupled to each other winding 4712, and each winding 4712 has a respective leakage inductance. In contrast to the saturable magnetic elements of coupled inductors 4100 and 4400, windings 4712 do not form a turn within saturable magnetic elements 4708. Saturable magnetic elements 4108 saturate as the magnitude of current flowing through windings 4712 increases, thereby causing the leakage inductance values of windings 4712 to decrease in proportion to the magnitude of current flowing through the windings.

Figure 50:
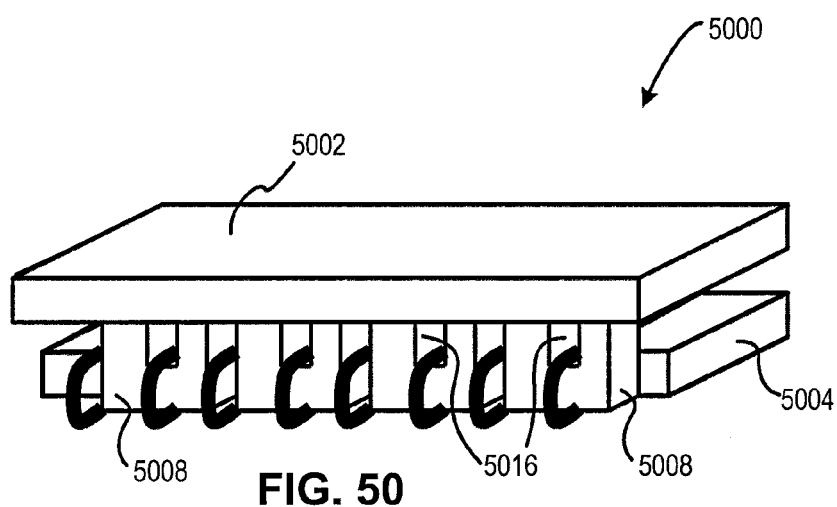
FIG. 50 is a side perspective view of one M-phase coupled inductor, according to an embodiment.
Figure 51:
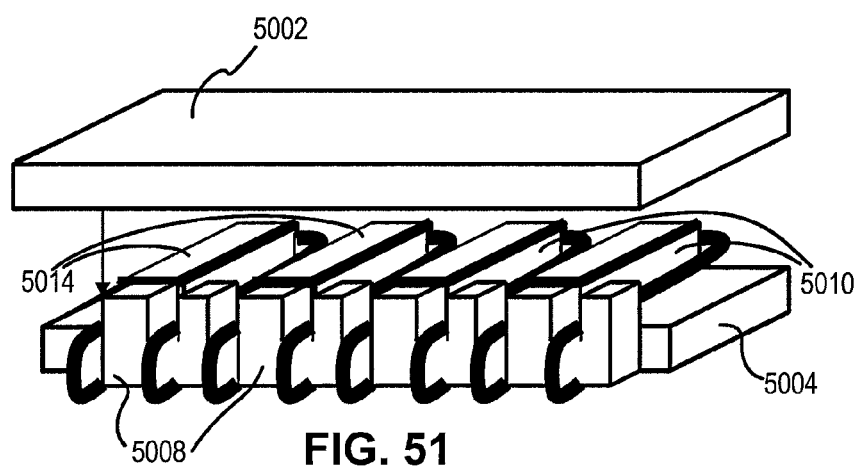
FIG. 51 is an exploded side perspective view of the coupled inductor of FIG. 50.

FIG. 50 is a side perspective view and FIG. 51 is an exploded side perspective view of one M-phase coupled inductor 5000, where M is an integer greater than one. Although coupled inductor 5000 is illustrated as being a four phase coupled inductor (M=4), coupled inductor 5000 can have any number of phases greater than one.

Figure 52:
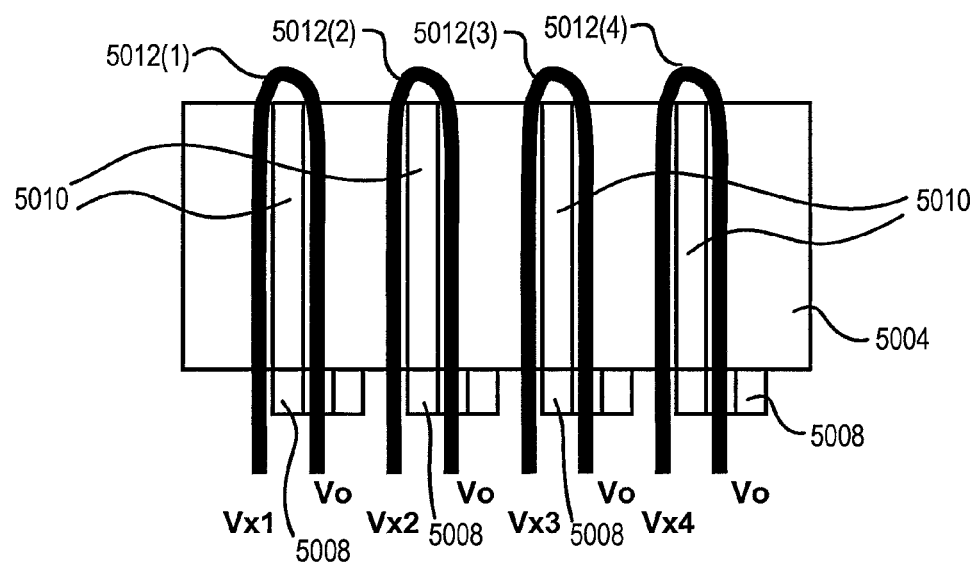
FIG. 52 is a cross sectional view of the coupled inductor of FIG. 50.

Coupled inductor 5000 includes a core having a first magnetic element 5004 and a second magnetic element 5002. FIG. 52 is a cross sectional view of coupled inductor 5000 with second magnetic element 5002 removed. First magnetic element 5004 includes M teeth 5010, and a non-magnetic spacer or air gap 5014 separates each tooth 5010 from second magnetic element 5002. The non-magnetic spacers or air gaps 5014 prevent the leakage inductance values of the windings of coupled inductor 5000 from excessively decreasing as the magnitude of current through the windings increases.

The magnetic core of coupled inductor 5000 further includes M saturable magnetic elements 5008, each for example having a U-shape. Saturable magnetic elements 5008 may be discrete components or may be part of first magnetic element 5004. Second magnetic element 5002 overlaps each saturable magnetic element 5008 to form a passageway 5016 in each saturable magnetic element. Each saturable magnetic element 5008 is for example disposed partially collinear to a respective tooth 5010 such that its passageway 5016 is displaced from the tooth and the remaining teeth. Saturable magnetic elements 5008 may be, but need not be, formed of a different material than second magnetic element 5002 and/or first magnetic element 5004. For example, saturable magnetic elements 5008 may be formed of a material having a higher permeability than the one or more materials forming second magnetic element 5002 and first magnetic element 5004.

Coupled inductor 5000 includes M windings 5012. Each winding 5012 is at least partially wound about a respective tooth 5010 and through the passageway 5016 of a respective saturable magnetic element 5008. Each winding 5012 is magnetically coupled to each other winding 5012, and each winding 5012 has a respective leakage inductance. In contrast to the saturable magnetic elements of coupled inductors 4100 and 4400, windings 5012 do not form a turn within saturable magnetic elements 5008. Saturable magnetic elements 5008 saturate as the magnitude of current flowing through windings 5012 increases, thereby causing the leakage inductance values of windings 5012 to decrease in proportion to the magnitude of current flowing through the windings.

Figure 53:
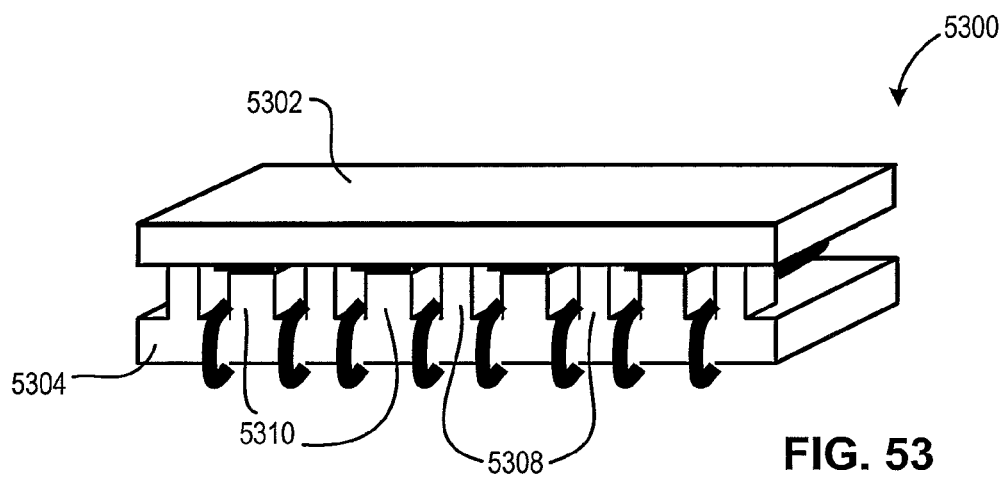
FIG. 53 is a side perspective view of one M-phase coupled inductor, according to an embodiment.
Figure 54:
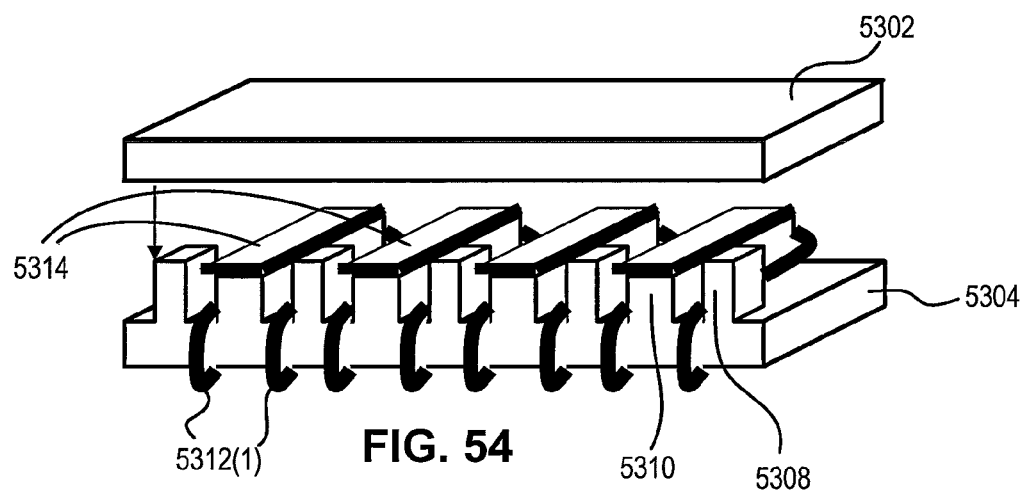
FIG. 54 is an exploded side perspective view of the coupled inductor of FIG. 53.
Figure 55:
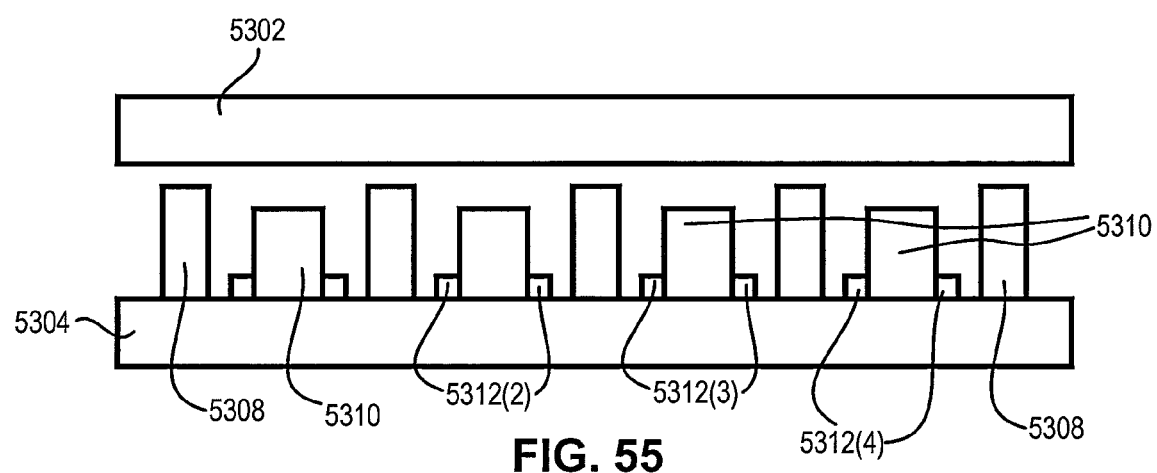
FIG. 55 is an exploded side plan view of the coupled inductor of FIG. 53.

FIG. 53 is a side perspective view of one M-phase coupled inductor 5300, where M is an integer greater than one. Although coupled inductor 5300 is illustrated as being a four phase coupled inductor (M=4), coupled inductor 5300 can have any number of phases greater than one. FIG. 54 is an exploded side perspective view of coupled inductor 5300, and FIG. 55 is an exploded side plan view of coupled inductor 5300.

Figure 56:
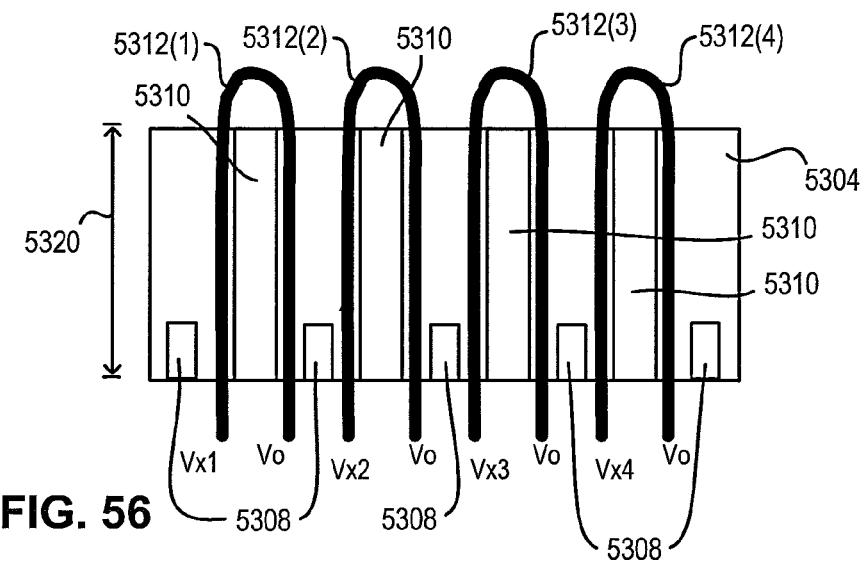
FIG. 56 is a cross sectional view of the coupled inductor of FIG. 53.

Coupled inductor 5300 includes a core having a first magnetic element 5304 and a second magnetic element 5302. First magnetic element 5304 includes M teeth 5310, and each tooth 5310 is separated from second magnetic element 5302 by a non-magnetic spacer or air gap 5314. The non-magnetic spacers or air gaps 5314 prevent the leakage inductance values of the windings of coupled inductor 5300 from excessively decreasing as the magnitude of current through the windings increases. FIG. 56 is a cross sectional view of coupled inductor 5300 with second magnetic element 5302 removed.

First magnetic element 5304 includes M+1 saturable magnetic elements 5308. One saturable magnetic element 5308 is disposed between each pair of teeth 5310, and one saturable magnetic element 5308 is disposed at each end of coupled inductor 5300. Thus, each tooth 5310 is disposed between a respective pair of saturable magnetic elements 5308. Saturable magnetic elements 5308 may be, but need not be, formed of a different material than second magnetic element 5302 and/or first magnetic element 5304. For example, saturable magnetic elements 5308 may be formed of a material having a higher permeability than the one or more materials forming second magnetic element 5302 and first magnetic element 5304. Saturable magnetic elements 5308 only partly span depth 5320 of coupled inductor 5300.

For example, saturable magnetic elements 5308 may span less than one-half of depth 5320. In other embodiments of coupled inductor 5300, saturable magnetic elements 5308 are discrete elements that are not part of first magnetic element 5304.

Coupled inductor 5300 further includes M windings 5312, where each winding is at least partially wound about a respective tooth 5310. Furthermore, each winding 5312 passes between its respective tooth 5310 and two different saturable magnetic elements 5308. Each winding 5312 is magnetically coupled with each other winding 5312, and each winding has a respective leakage inductance. Saturable magnetic elements 5308 saturate as the magnitude of current flowing through windings 5312 increases, thereby causing the leakage inductance values of windings 5312 to decrease in proportion to the magnitude of current flowing through the windings.

Figure 57:
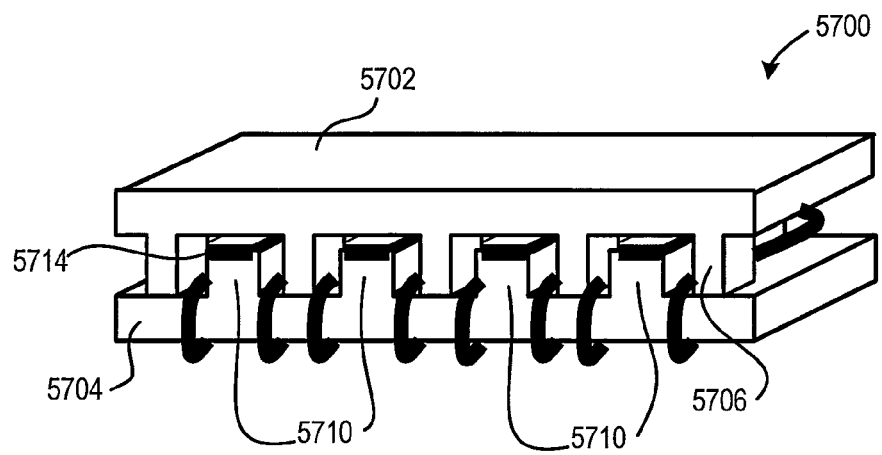
FIG. 57 is a side perspective view of one M-phase coupled inductor, according to an embodiment.
Figure 58:
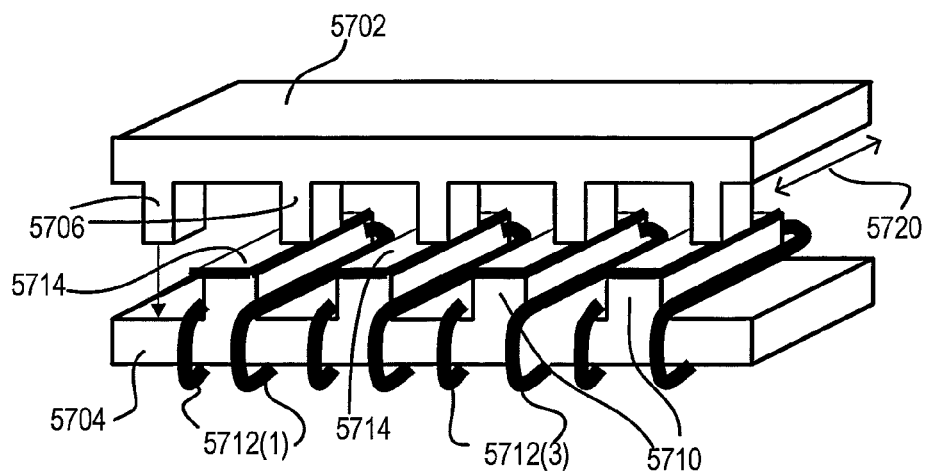
FIG. 58 is an exploded side perspective view of the coupled inductor of FIG. 57.
Figure 59:
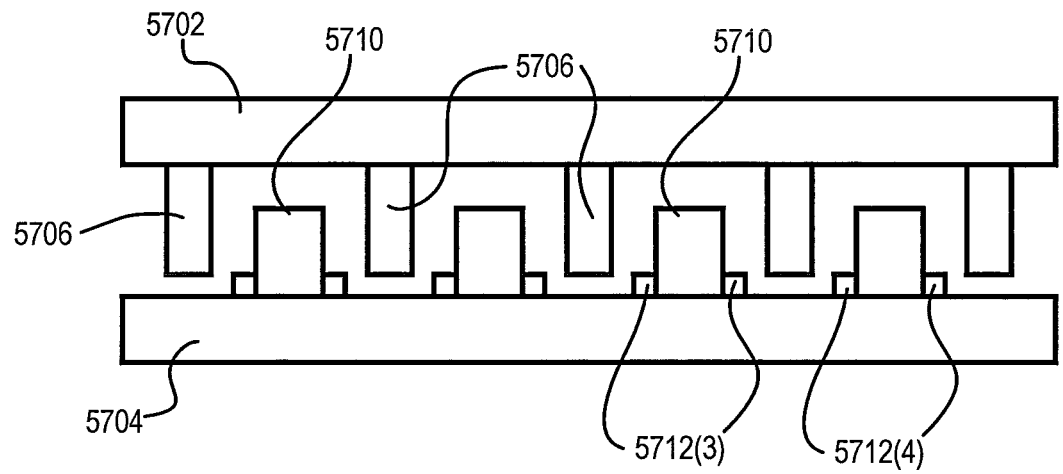
FIG. 59 is an exploded side plan view of the coupled inductor of FIG. 57.

FIG. 57 is a side perspective view of one M-phase coupled inductor 5700, where M is an integer greater than one. Although coupled inductor 5700 is illustrated as being a four phase coupled inductor (M=4), coupled inductor 5700 can have any number of phases greater than one. FIG. 58 is an exploded side perspective view of coupled inductor 5700, and FIG. 59 is an exploded side plan view of coupled inductor 5700.

Figure 60:
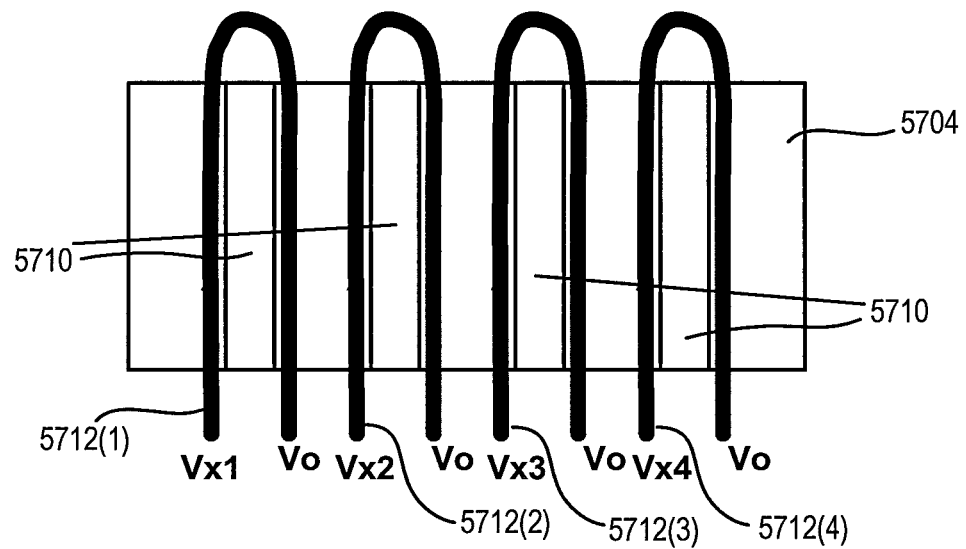
FIG. 60 is a cross sectional view of the coupled inductor of FIG. 57.

Coupled inductor 5700 is similar to coupled inductor 5300 of FIGS. 53-56. Specifically, coupled inductor 5700 includes a first magnetic element 5704 and second magnetic element 5702, where first magnetic element 5704 includes M teeth 5710. A non-magnetic spacer or air gap 5714 separates each tooth 5710 from second magnetic element 5702. The non-magnetic spacers or air gaps 5714 prevent the leakage inductance values of the windings of coupled inductor 5700 from excessively decreasing as the magnitude of current through the windings increases. FIG. 60 is a cross sectional view of coupled inductor 5700 with second magnetic element 5702 removed.

Coupled inductor 5700 also includes M+1 saturable magnetic elements 5706; however, in contrast to coupled inductor 5300, saturable magnetic elements 5706 are part of second magnetic element 5702—not first magnetic element 5704. Saturable magnetic elements 5706 may be, but need not be, formed of a different material than second magnetic element 5702 and/or first magnetic element 5704. For example, saturable magnetic elements 5706 may be formed of a material having a higher permeability than the one or more materials forming second magnetic element 5702 and first magnetic element 5704. Saturable magnetic elements 5706 only span part of depth 5720 of coupled inductor 5700. For example, saturable magnetic elements 5706 may span less than half of depth 5720.

Coupled inductor 5700 further includes M windings 5712, where each winding is at least partially wound about a respective tooth and passes between the tooth and two saturable magnetic elements 5706. Saturable magnetic elements 5706 saturate as the magnitude of current flowing through windings 5712 increases, thereby causing the leakage inductance values of windings 5712 to decrease in proportion to the magnitude of current flowing through the windings.

Figure 61:
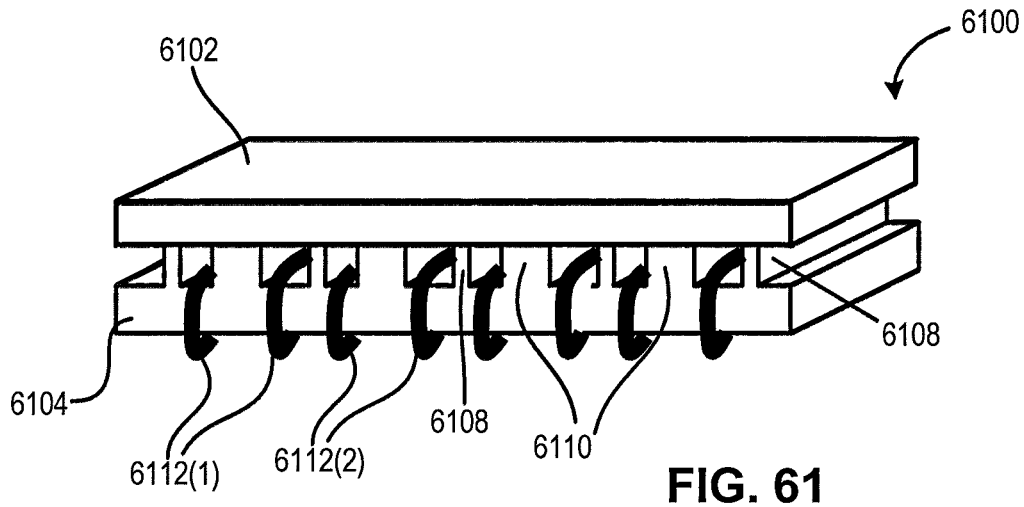
FIG. 61 is a side perspective view of one M-phase coupled inductor, according to an embodiment.
Figure 62:
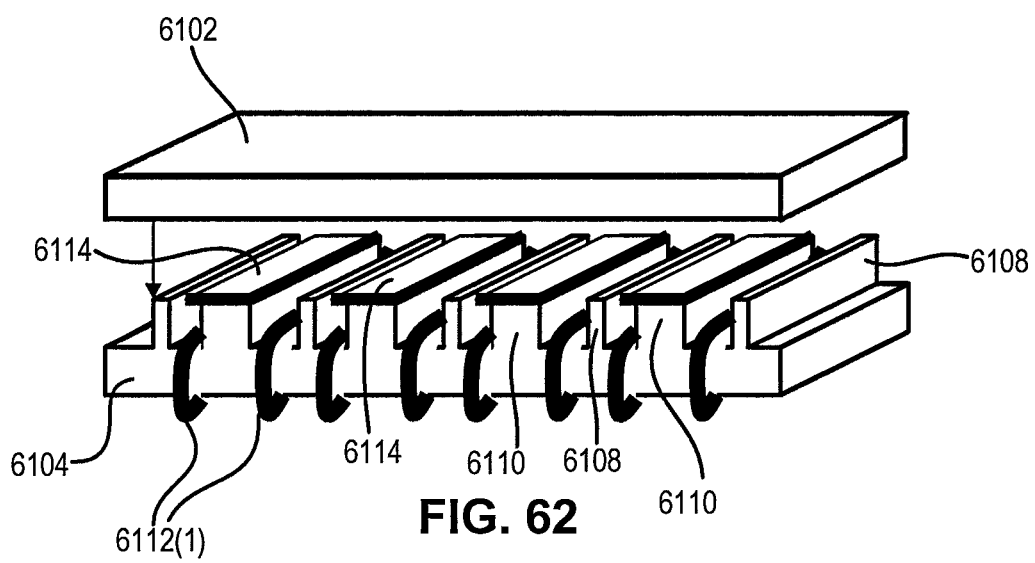
FIG. 62 is an exploded side perspective view of the coupled inductor of FIG. 61.
Figure 63:
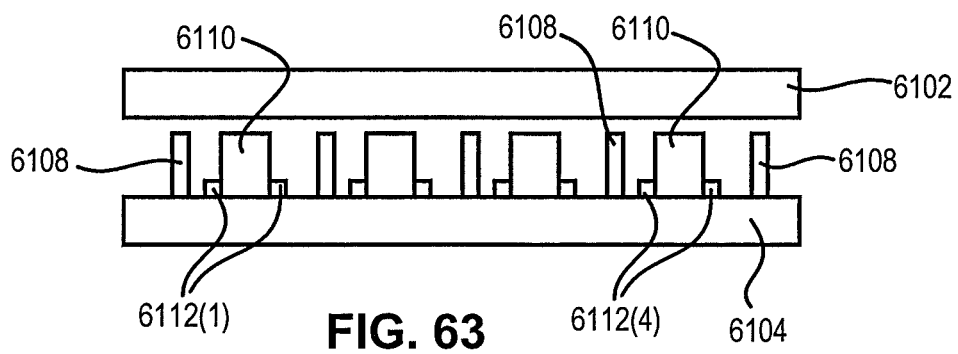
FIG. 63 is an exploded side plan view of the coupled inductor of FIG. 61.

FIG. 61 is a side perspective view of one M-phase coupled inductor 6100, where M is an integer greater than one. Although coupled inductor 6100 is illustrated as being a four phase coupled inductor (M=4), coupled inductor 6100 can have any number of phases greater than one. FIG. 62 is an exploded side perspective view of coupled inductor 6100, and FIG. 63 is an exploded side plan view of coupled inductor 6100.

Figure 64:
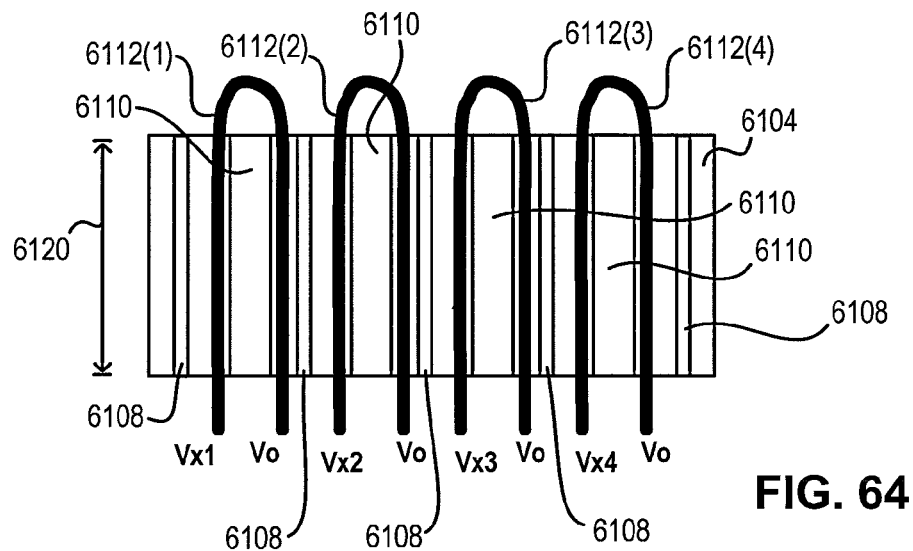
FIG. 64 is a cross sectional view of the coupled inductor of FIG. 61.

Coupled inductor 6100 includes a first magnetic element 6104 and a second magnetic element 6102. First magnetic element 6104 includes M teeth 6110, and each tooth is separated from second magnetic element 6102 by a non-magnetic spacer or air gap 6114. The non-magnetic spacers or air gaps 6114 prevent the leakage inductance values of the windings of coupled inductor 6100 from excessively decreasing as the magnitude of current through the windings increases. FIG. 64 is a cross sectional view of coupled inductor 6100 with second magnetic element 6102 removed.

First magnetic element 6104 further includes M+1 saturable magnetic elements 6108 that span at least one-half of the depth 6120 of coupled inductor 6100. For example, saturable magnetic elements 6108 may span the entire depth 6120, as illustrated in FIGS. 61-64. One saturable magnetic element 6108 is disposed between each pair of teeth 6110, and one saturable magnetic element 6108 is also disposed at each end of couple inductor 6100. Thus, each tooth 6110 is disposed between a pair of saturable magnetic elements 6108. Saturable magnetic elements 6108 may be, but need not be, formed of a different material than second magnetic element 6102 and/or first magnetic element 6104. For example, saturable magnetic elements 6108 may be formed of a material having a higher permeability than the one or more materials forming second magnetic element 6102 and first magnetic element 6104.

Coupled inductor 6100 further includes M windings 6112, where each winding is at least partially wound about a respective tooth 6110. Furthermore, each winding 6112 passes between its respective tooth 6110 and two separate saturable magnetic elements 6108. Each winding 6112 is magnetically coupled to each other winding 6112 in coupled inductor 6100, and each winding 6112 has a respective leakage inductance. Saturable magnetic elements 6108 saturate as the magnitude of current flowing through windings 6112 increases, thereby causing the leakage inductance values of windings 6112 to decrease in proportion to the magnitude of current flowing through the windings.

Figure 65:
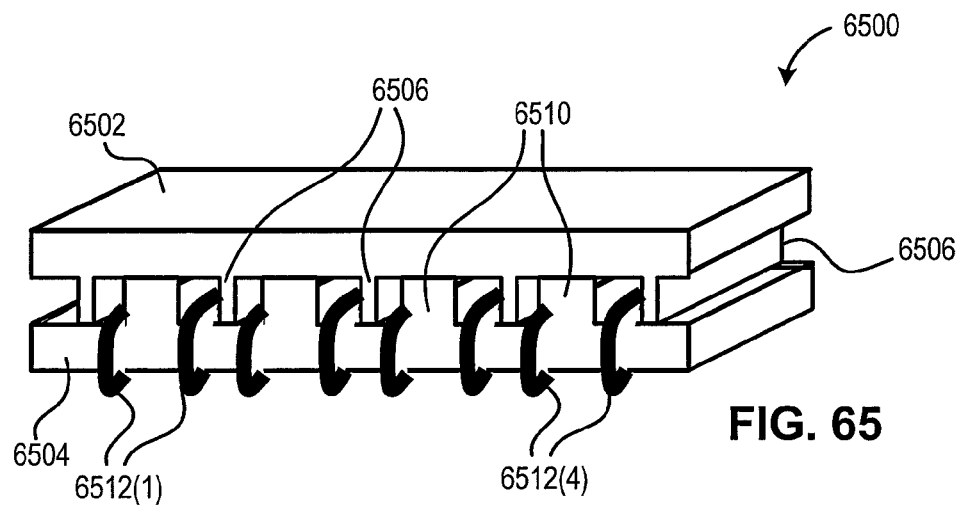
FIG. 65 is a side perspective view of one M-phase coupled inductor, according to an embodiment.
Figure 66:
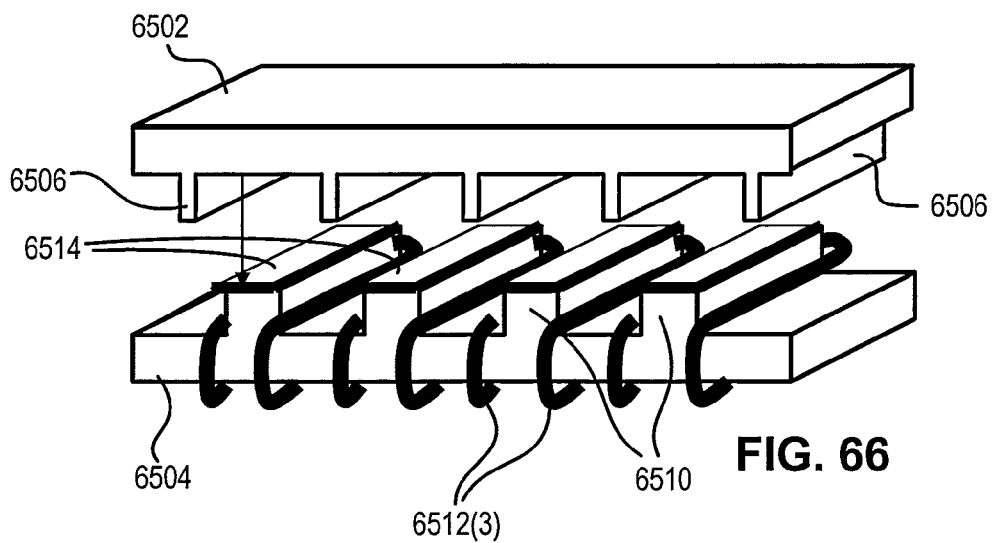
FIG. 66 is an exploded side perspective view of the coupled inductor of FIG. 65.
Figure 67:
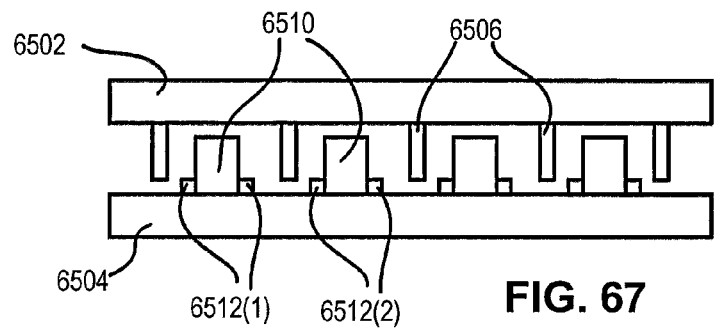
FIG. 67 is an exploded side plan view of the coupled inductor of FIG. 65.

FIG. 65 is a side perspective view of one M-phase coupled inductor 6500, where M is an integer greater than one. Although coupled inductor 6500 is illustrated as being a four phase coupled inductor (M=4), coupled inductor 6500 can have any number of phases greater than one. FIG. 66 is an exploded side perspective view of coupled inductor 6500, and FIG. 67 is an exploded side plan view of coupled inductor 6500.

Figure 68:
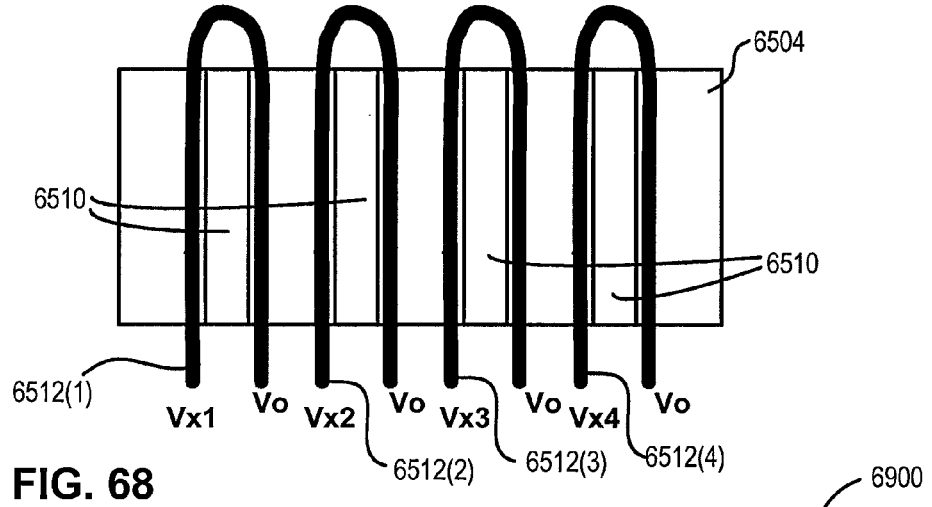
FIG. 68 is a cross sectional view of the coupled inductor of FIG. 65.

Coupled inductor 6500 is similar to coupled inductor 6100 of FIGS. 61-64. For example, the core of coupled inductor 6500 includes a first magnetic element 6504 and a second magnetic element 6502. First magnetic element 6504 includes M teeth 6510 where each tooth 6510 is separated from second magnetic element 6502 by a non-magnetic spacer or air gap 6514. The non-magnetic spacers or air gaps 6514 prevent the leakage inductance values of the windings of coupled inductor 6500 from excessively decreasing as the magnitude of current through the windings increases. FIG. 68 is a cross sectional view of coupled inductor 6500 with second magnetic element 6502 removed.

The core of coupled inductor 6500 also includes M+1 saturable magnetic elements 6506. However, saturable magnetic elements 6506 are part of second magnetic element 6502 in coupled inductor 6500—not first magnetic element 6504 as in coupled inductor 6100. One saturable magnetic element 6506 is disposed between each adjacent pair of teeth

6510, and one saturable magnetic element 6506 is disposed at each end of coupled inductor 6500. Stated differently, each tooth 6510 is disposed between a respective pair of saturable magnetic elements 6506. Saturable magnetic elements 6506 may be, but need not be, formed of a different material than second magnetic element 6502 and/or first magnetic element 6504. For example, saturable magnetic elements 6506 may be formed of a material having a higher permeability than the one or more materials forming second magnetic element 6502 and first magnetic element 6504.

Coupled inductor 6500 further includes M windings 6512, where each winding is at least partially wound about a respective tooth 6510 and between two saturable magnetic elements 6506. Each winding 6512 is magnetically coupled to each other winding 6512, and each winding 6512 has a respective leakage inductance. Saturable magnetic elements 6506 saturate as the magnitude of current flowing through windings 6512 increases, thereby causing the leakage inductance values of windings 6512 to decrease in proportion to the magnitude of current flowing through the windings.

Figure 69:
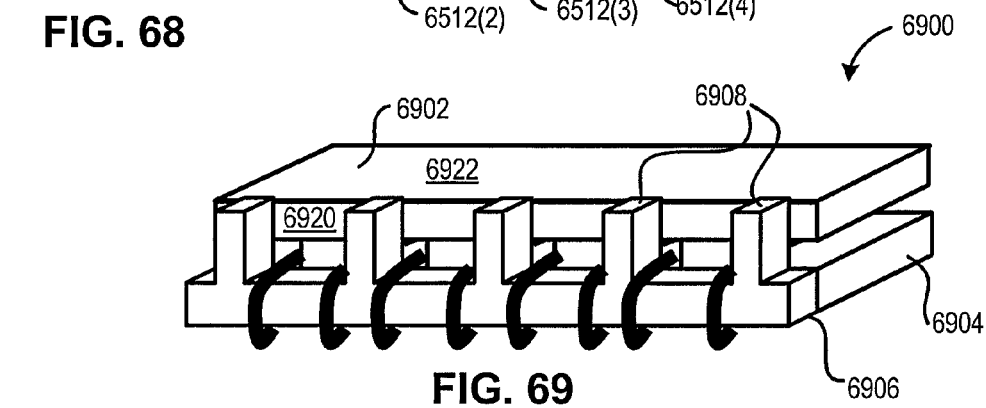
FIG. 69 is a side perspective view of one M-phase coupled inductor, according to an embodiment.
Figure 70:
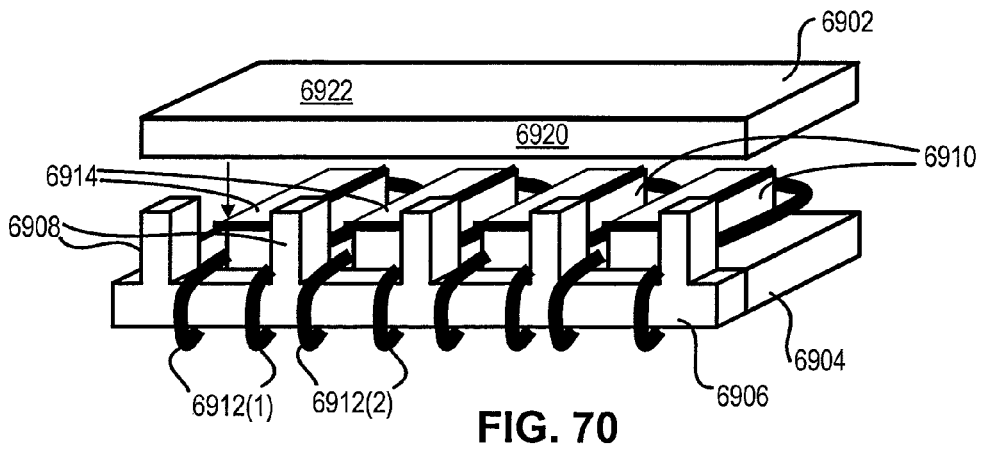
FIG. 70 is an exploded side perspective view of the coupled inductor of FIG. 69.
Figure 71:
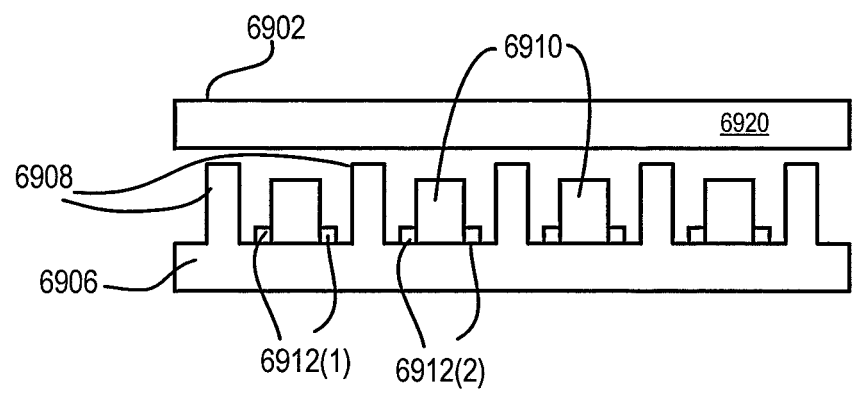
FIG. 71 is an exploded side plan view of the coupled inductor of FIG. 69.

FIG. 69 is a side perspective view of one M-phase coupled inductor 6900, where M is an integer greater than one. Although coupled inductor 6900 is illustrated as being a four phase coupled inductor (M=4), coupled inductor 6900 can have any number of phases greater than one. FIG. 70 is an exploded side perspective view of coupled inductor 6900, and FIG. 71 is an exploded side plan view of coupled inductor 6900.

Figure 72:
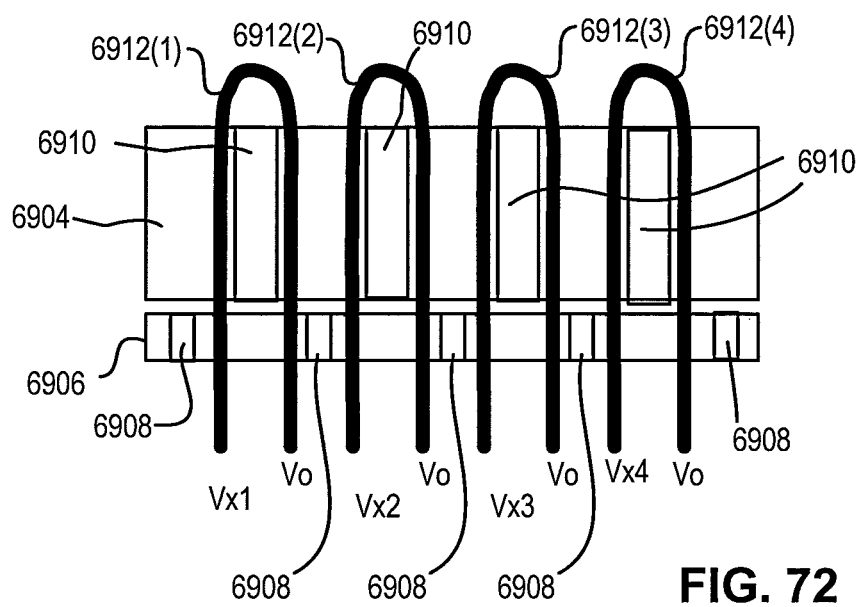
FIG. 72 is a cross sectional view of the coupled inductor of FIG. 69.

Coupled inductor 6900 includes a primary magnetic core including a first magnetic element 6904 and a second magnetic element 6902. FIG. 72 is cross sectional view of coupled inductor 6900 with second magnetic element 6902 removed. First magnetic element 6904 includes M teeth 6910, each of which is separated from second magnetic element 6902 by a non-magnetic spacer or air gap 6914. The non-magnetic spacers or air gaps 6914 prevent the leakage inductance values of the windings of coupled inductor 6900 from excessively decreasing as the magnitude of current through the windings increases.

Coupled inductor 6900 also includes a secondary magnetic core 6906. The primary magnetic core and secondary magnetic core 6906 may be formed of the same material or different magnetic materials. For example, the primary magnetic core may be formed of a first material, and the secondary magnetic core 6906 may be formed of second material, where the second material has a higher permeability than the first material. Secondary magnetic core 6906 is shown as being separate from the primary magnetic core in FIG. 72 solely for illustrative purposes—in actuality, the primary magnetic core and secondary magnetic core 6906 are joined together.

Secondary magnetic core 6906 includes M+1 saturable magnetic elements 6908, none of which are collinear to teeth 6910, for example. Saturable magnetic elements 6908 extend up along a side (e.g., planar) surface 6920 of second magnetic element 6902. Saturable elements magnetic 6908 extend, for example, up to a top surface 6922 of second magnetic element 6902. One or more additional magnetic elements (not shown) may connect saturable magnetic elements 6908 to second magnetic element 6902.

Coupled inductor 6900 includes M windings 6912, each of which is at least partially wound about a respective tooth 6910. Furthermore, each winding passes along secondary magnetic core 6906 between a respective pair of saturable magnetic elements 6908. Each winding 6912 is magnetically coupled to each other winding 6912, and each winding 6912 has a respective leakage inductance. Saturable magnetic elements 6908 saturate as the magnitude of current flowing through windings 6912 increases, thereby causing the leakage inductance values of windings 6912 to decrease in proportion to the magnitude of current flowing through the windings.

Figure 73:
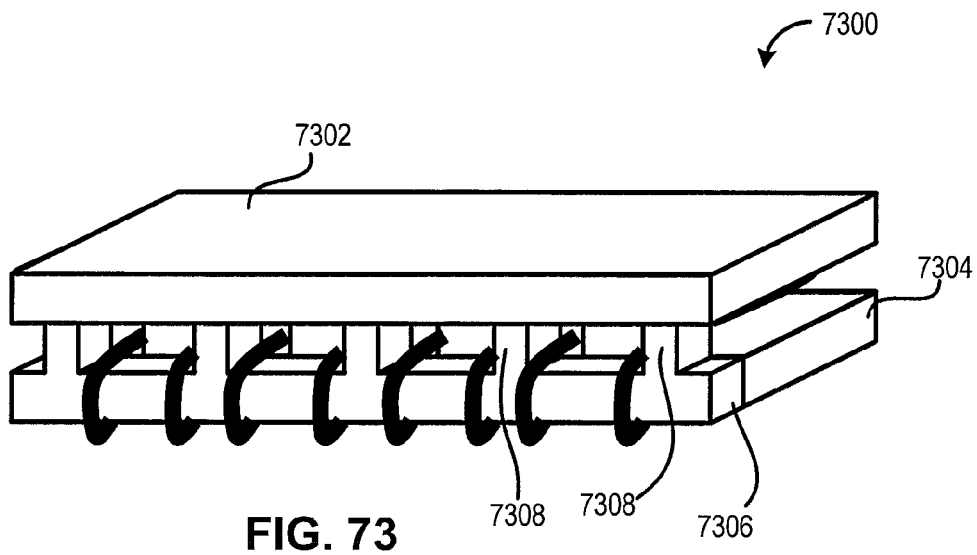
FIG. 73 is a side perspective view of one M-phase coupled inductor, according to an embodiment.
Figure 74:
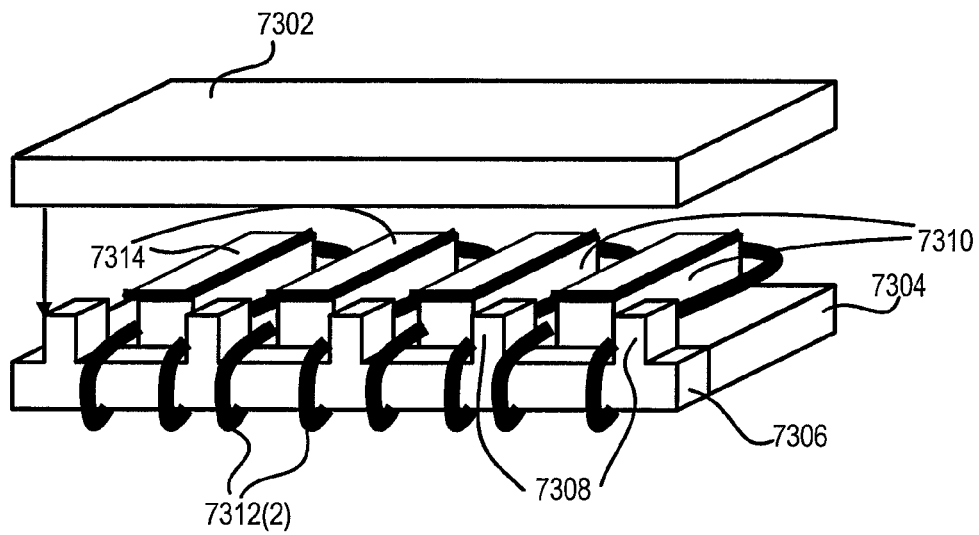
FIG. 74 is an exploded side perspective view of the coupled inductor of FIG. 73.
Figure 75:
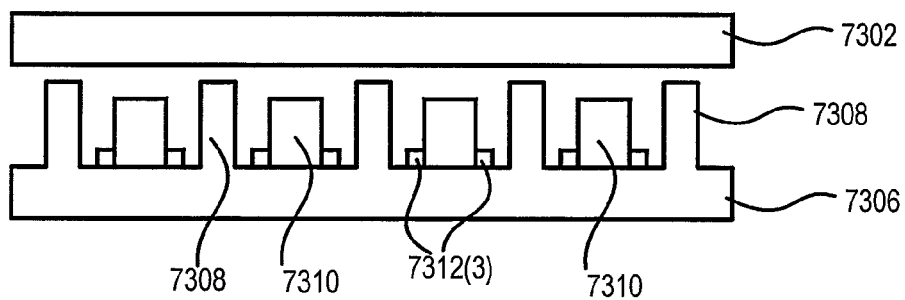
FIG. 75 is an exploded side plan view of the coupled inductor of FIG. 73.

FIG. 73 is a side perspective view of one M-phase coupled inductor 7300, where M is an integer greater than one. Although coupled inductor 7300 is illustrated as being a four phase coupled inductor (M=4), coupled inductor 7300 can have any number of phases greater than one. FIG. 74 is an exploded side perspective view of coupled inductor 7300, and FIG. 75 is an exploded side plan view of coupled inductor 7300.

Figure 76:
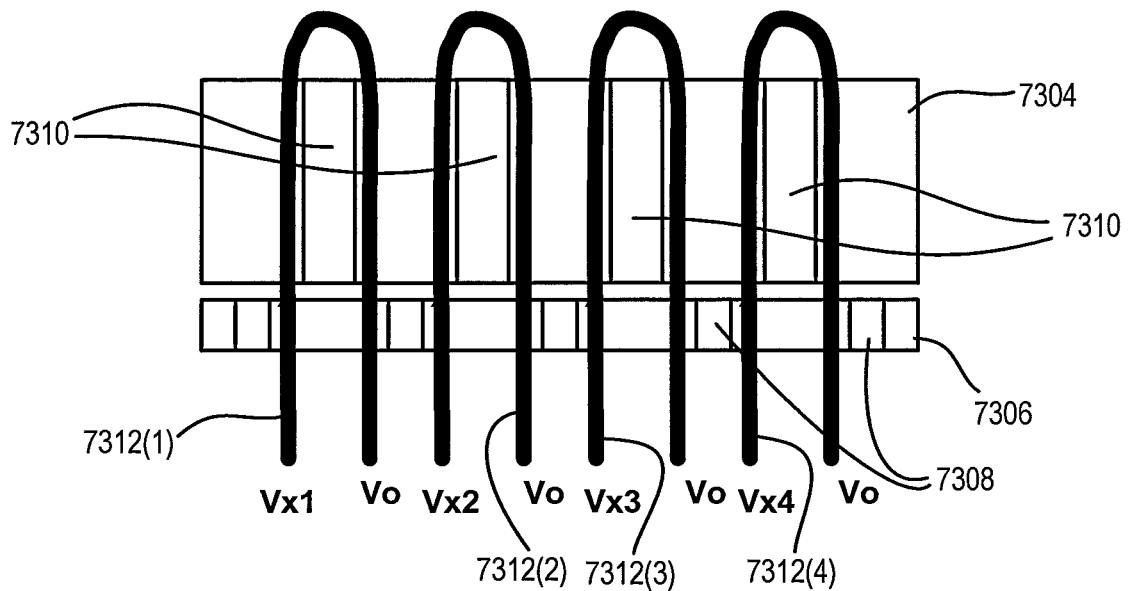
FIG. 76 is a cross sectional view of the coupled inductor of FIG. 73.

Coupled inductor 7300 includes a primary magnetic core including first magnetic element 7304 and second magnetic element 7302. FIG. 76 is a cross sectional view of coupled inductor 7300 with second magnetic element 7302 removed. First magnetic element 7304 includes M teeth 7310. Each tooth 7310 is separated from second magnetic element 7302 by a non-magnetic spacer or air gap 7314. The non-magnetic spacers or air gaps 7314 prevent the leakage inductance values of the windings of coupled inductor 7300 from excessively decreasing as the magnitude of current through the windings increases.

Coupled inductor 7300 further includes a secondary magnetic core 7306 including M+1 saturable magnetic elements 7308. The primary magnetic core and secondary magnetic core 7306 may be formed of the same material or different magnetic materials. For example, the primary magnetic core may be formed of a first material, and the secondary magnetic core 7306 may be formed of second material, where the second material has a higher permeability than the first material. Secondary magnetic core 7306 is shown as being separate from the primary magnetic core in FIG. 76 solely for illustrative purposes—in actuality, the primary magnetic core and secondary magnetic core 7306 are joined together. Second magnetic element 7302 overlaps each saturable magnetic element 7308. None of saturable magnetic elements 7308 are collinear with teeth 7310, for example.

Coupled inductor 7300 further includes M windings 7312, where each winding is at least partially wound about a respective tooth 7310 and along secondary core 7306 between a respective pair of saturable magnetic elements 7308. Each winding 7312 is magnetically coupled to each other winding 7312, and each winding 7312 has a respective leakage inductance. Saturable magnetic elements 7308 saturate as the magnitude of current flowing through windings 7312 increases, thereby causing the leakage inductance values of windings 7312 to decrease in proportion to the magnitude of current flowing through the windings.

Figure 77:
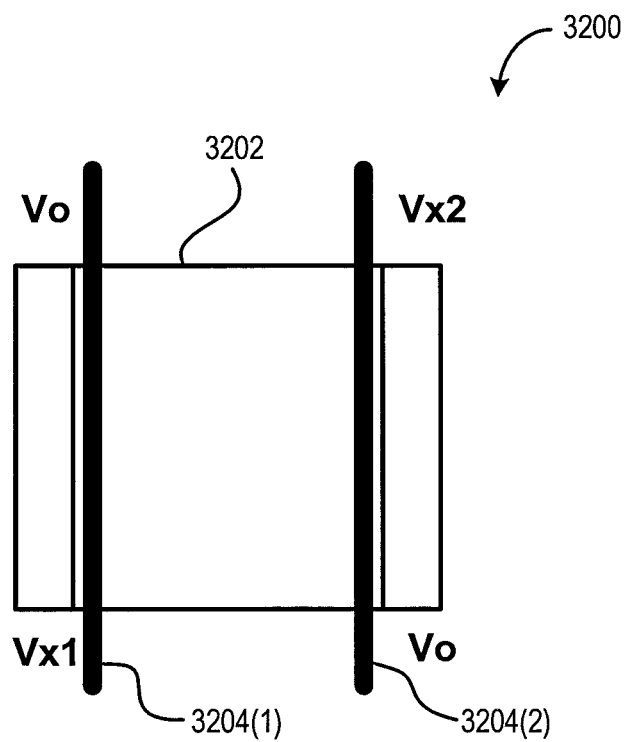
FIG. 77 is a cross sectional view of the coupled inductor of FIG. 32.
Figure 78:
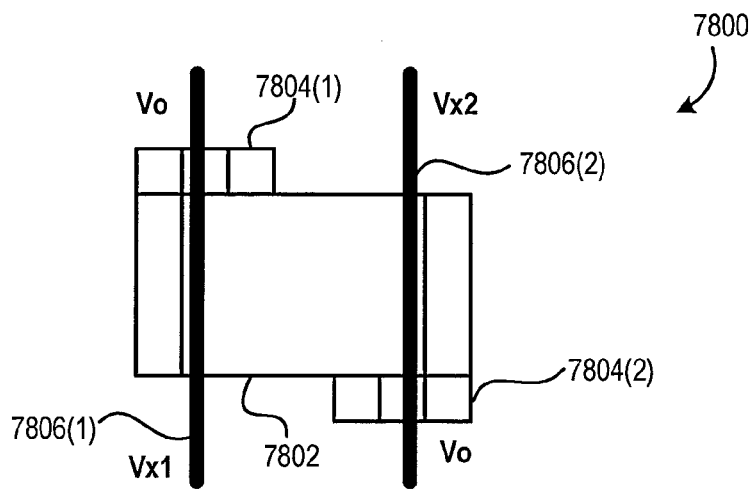
FIG. 78 is a cross sectional view of one two-phase coupled inductor having non-linear leakage inductance values, according to an embodiment.
Figure 79:
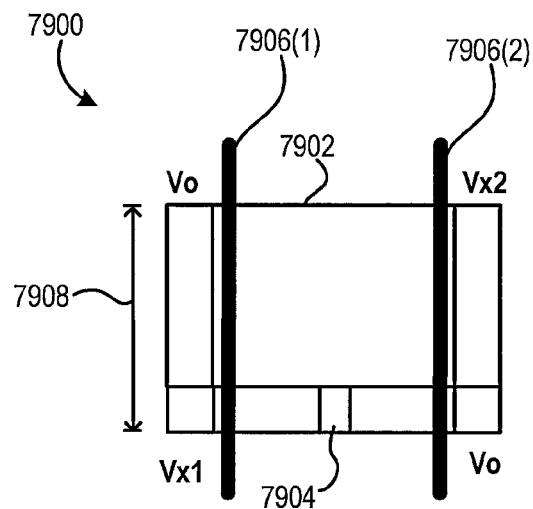
FIG. 79 is a cross sectional view of one two-phase coupled inductor having non-linear leakage inductance values, according to an embodiment.
Figure 80:
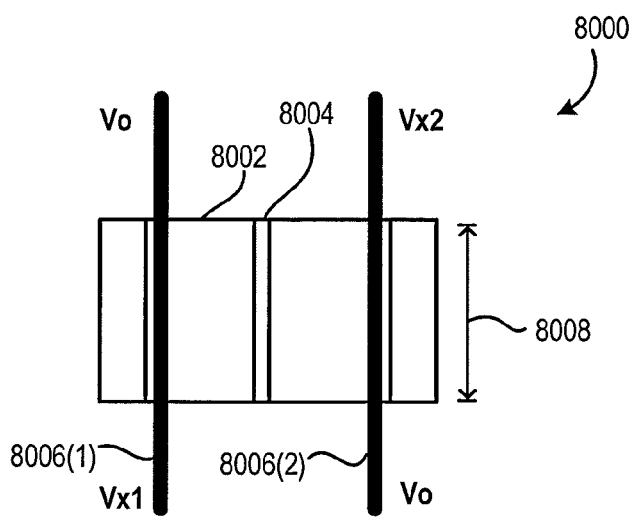
FIG. 80 is a cross sectional view of one two-phase coupled inductor having non-linear leakage inductance values, according to an embodiment.

FIGS. 78-80 show various two-phase "staple" coupled inductors with at least one saturable magnetic element causing the inductors to have variable leakage inductance values—such inductors are embodiments of coupled inductor 100. The coupled inductors of FIGS. 78-80 may be contrasted with standard two-phase coupled inductor 3200, which is repeated in FIG. 77 for convenience. FIG. 77 is a cross sectional view of coupled inductor 3200 which includes core 3202 and windings 3204(1) and 3204(2) wound through core 3202. Windings 3204(1) and 3204(2) are magnetically coupled together, and the leakage inductance value of each of windings 3204(1) and 3204(2) remains relatively constant as the magnitude of current flowing through the winding varies.

FIG. 78 is a cross sectional view of one two-phase coupled inductor 7800. Coupled inductor 7800 includes windings 7806 and a core 7802 having saturable magnetic elements 7804(1) and 7804(2) disposed on opposite sides of core 7802. Saturable magnetic elements 7804 may be formed of the same material as core 7802, or saturable magnetic elements 7804 may be formed of a different material than core 7802. For example, saturable magnetic elements 7804 may be formed of a material having a higher permeability than the material forming core 7802.

Windings 7806 are magnetically coupled together, and each winding 7806 has a respective leakage inductance. Saturable magnetic elements 7804 saturate as the magnitude of current flowing through windings 7806 increases, thereby causing the leakage inductance values of windings 7806 to decrease in proportion to the magnitude of current flowing through the windings. Each winding 7806(1) and 7806(2) runs through core 7802 and a respective saturable element magnetic 7804.

FIG. 79 is a cross sectional view of one two-phase coupled inductor 7900. Coupled inductor 7900 includes windings 7906(1) and 7906(2) and a core 7902 having saturable magnetic element 7904. Saturable magnetic element 7904 extends along only part of coupled inductor 7900's depth 7908. For example, saturable magnetic element 7904 may extend along less than one-half of coupled inductor 7900's depth. Saturable magnetic element 7904 may be formed of the same material as core 7902, or saturable magnetic element 7904 may be formed of a different material than core 7902. For example, saturable magnetic element 7904 may be formed of a material having a higher permeability than the material forming core 7902.

Windings 7906 are magnetically coupled together, and each winding 7906 has a respective leakage inductance. Saturable magnetic element 7904 saturates as the magnitude of current flowing through windings 7906 increases, thereby causing the leakage inductance values of windings 7906 to decrease in proportion to the magnitude of current flowing through the windings. Windings 7906(1) and 7906(2) run through core 7902, but not through saturable magnetic element 7904.

FIG. 80 is a cross sectional view of one two-phase coupled inductor 8000. Coupled inductor 8000 includes windings 8006 and core 8002 having saturable magnetic element 8004. Saturable magnetic element 8004 spans at least one-half of depth 8008 of core 8002. For example, saturable magnetic element 8004 may span the entire depth 8008 of core 8002. Saturable magnetic element 8004 may be formed of the same material as core 8002, or saturable magnetic element 8004 may be formed of a different material than core 8002. For example, saturable magnetic element 8004 may be formed of a material having a higher permeability than the material forming core 8002.

Windings 8006 are magnetically coupled together, and each winding 8006 has a respective leakage inductance. Saturable magnetic element 8004 saturates as the magnitude of current flowing through windings 8006 increases, thereby causing the leakage inductance values of windings 8006 to decrease in proportion to the magnitude of current flowing through the windings. Windings 8006(1) and 8006(2) run through core 8002 but not through saturable magnetic element 8004.

Figure 81:
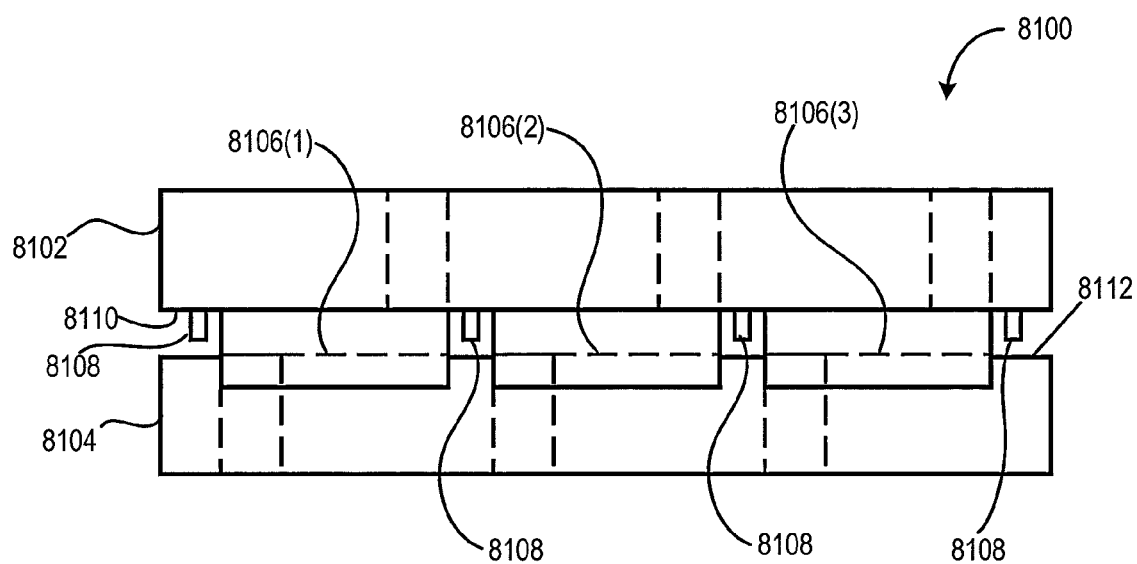
FIG. 81 is a top plan view of one M-phase coupled inductor, according to an embodiment.

FIG. 81 is a top plan view of one M-phase coupled inductor 8100, where M is an integer greater than one. Although coupled inductor 8100 is illustrated as being a three phase coupled inductor (M=3), coupled inductor 8100 can have any number of phases greater than one.

Coupled inductor 8100 includes a core including end magnetic element 8102 and end magnetic element 8104. End magnetic element 8102 is, for example, disposed parallel to end magnetic element 8104. The core additionally includes M legs (not visible in FIG. 81) disposed between and connecting end magnetic elements 8102 and 8104. Coupled inductor 8100 further includes M windings 8106. Each winding is at least partly wound about a respective leg—the reason the legs are not visible in the top plan view of FIG. 81 is that they are covered by a respective winding 8106. Each winding 8106 extends along bottom surfaces (e.g., planar surfaces) of end magnetic elements 8102 and 8104, as indicated by dashed lines in FIG. 81. Windings 8106 advantageously have a relatively short length and accordingly have a relatively low resistance, thereby advantageously reducing power loss and increasing current-handling capability. Each of windings 8106 has a respective leakage inductance and is magnetically coupled to each other winding 8106.

The core of coupled inductor 8100 further includes at least M+1 saturable magnetic elements 8108. Each of saturable magnetic elements 8108 are disposed along side 8110 of end magnetic element 8102 and extend towards end magnetic element 8104. Each winding 8106 is disposed between two saturable magnetic elements 8108, and each leg is therefore disposed between a respective pair of saturable magnetic elements 8108. Furthermore, in some embodiments of coupled inductor 8100, additional saturable magnetic elements (not shown) are disposed on side 8112 of end magnetic element 8104 opposite of saturable magnetic elements 8108 and extend towards end magnetic element 8102. Saturable magnetic elements 8108 may be, but need not be, formed of a different material than that forming end magnetic elements 8102 and 8104 and the legs. For example, saturable magnetic elements 8108 may be formed of a material having a higher permeability than the material forming end magnetic elements 8102 and 8104 and the legs.

Saturable magnetic elements 8108 saturate as the magnitude of current flowing through windings 8106 increases, thereby causing the leakage inductance values of windings 8106 to decrease in proportion to the magnitude of current flowing through the windings. The core of coupled inductor 8100 optionally includes one or more non-magnetic spacers and/or air gaps (not shown) in order to control the drop in leakage inductance as the magnitude of current through windings 8106 increases.

Figure 82:
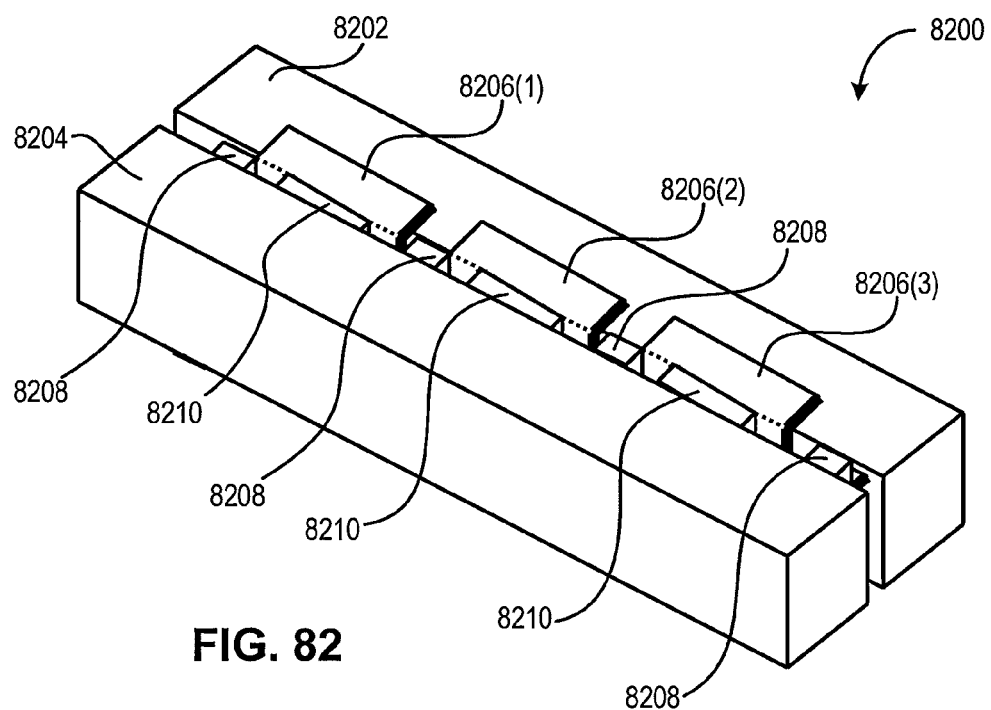
FIG. 82 is a top perspective view of one M-phase coupled inductor, according to an embodiment.

FIG. 82 is a top perspective view of one M-phase coupled inductor 8200, where M is an integer greater than one. Although coupled inductor 8200 is illustrated as being a three phase coupled inductor (M=3), coupled inductor 8200 can have any number of phases greater than one.

Similar to coupled inductor 8100 of FIG. 81, the core of coupled inductor 8200 includes end magnetic element 8202, end magnetic element 8204, and M legs 8210 disposed between and connecting end magnetic elements 8202 and 8204. End magnetic element 8202 is, for example, disposed parallel to end magnetic element 8204. Coupled inductor 8200 further includes M+1 saturable magnetic elements 8208 disposed between end magnetic elements 8202 and 8204. Each leg 8210 is disposed between a respective pair of saturable magnetic elements 8208. Saturable magnetic elements 8208 may be, but need not be, formed of a different material than end magnetic elements 8202 and 8204 and legs 8210. For example, saturable magnetic elements 8208 may be formed of a material having a higher permeability than the materials forming end magnetic elements 8202 and 8204 and legs 8210. As another example, end magnetic elements 8202 and 8204 as well as legs 8210 could be formed of a ferrite material, while saturable magnetic elements 8208 are formed of a powered iron material.

Coupled inductor 8200 includes M windings 8206 each at least partially wound about a respective leg 8210. Each winding 8206 is magnetically coupled to each other winding 8206, and each winding 8206 has a respective leakage inductance. Saturable magnetic elements 8208 saturate as the magnitude of current flowing through windings 8206 increases, thereby causing the leakage inductance values of windings 8206 to decrease in proportion to the magnitude of current flowing through the windings. Coupled inductor 8200's core may optionally include one or more non-magnetic spacers and/or air gaps to control the drop in leakage inductance as the magnitude of current through windings 8206 increases.

Figure 83:
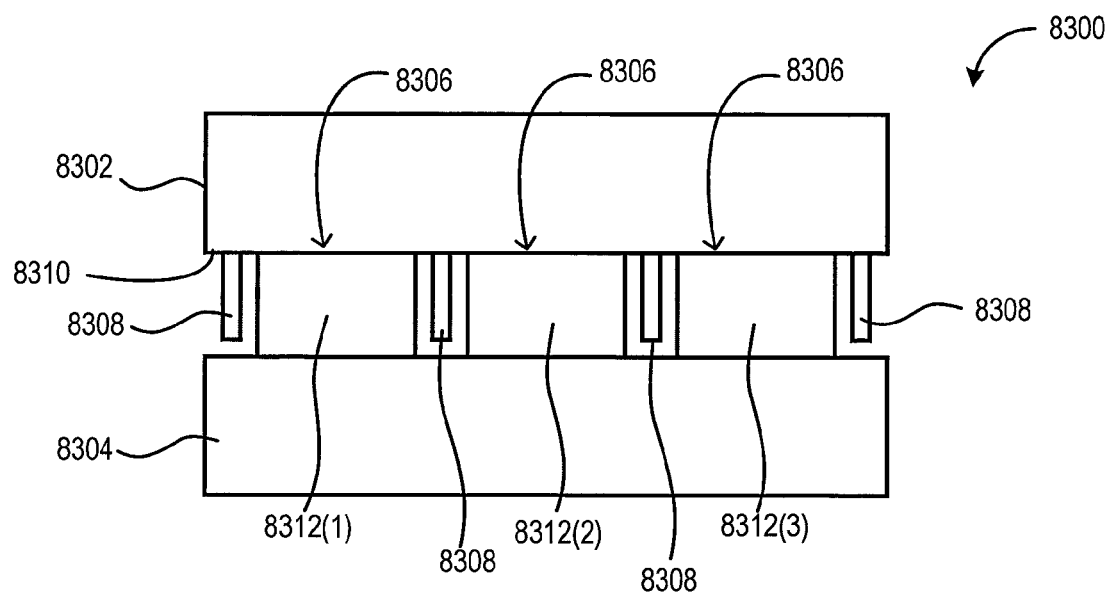
FIG. 83 is a top plan view of one M-phase coupled inductor, according to an embodiment.

FIG. 83 is a top plan view of one M-phase coupled inductor 8300, where M is an integer greater than one. Although coupled inductor 8300 is illustrated as being a three phase coupled inductor (M=3), coupled inductor 8300 can have any number of phases greater than one.

Coupled inductor 8300 includes a core including end magnetic element 8302, end magnetic element 8304, and M legs 8306 disposed between and connecting end magnetic elements 8302 and 8304. End magnetic element 8302 is, for example, disposed parallel to end magnetic element 8304. The core further includes M saturable magnetic elements 8308 disposed on a side 8310 of end magnetic element 8302 and extending towards end magnetic element 8304. Each leg 8306 is disposed between a respective pair of saturable magnetic elements 8308. Saturable magnetic elements 8308 may be, but need not be, formed of a different material than the one or more materials forming end magnetic elements 8302 and 8304 and legs 8306. For example, saturable magnetic elements 8308 may be formed of higher permeability material than the one or more materials forming end magnetic elements 8302 and 8304 and/or legs 8306.

Coupled inductor 8300 includes M windings 8312 where each winding is at least partially wound about an outer surface of a respective leg. Only one planar surface of each winding 8312 is visible in the top plan view of FIG. 83.

Each winding 8312 is magnetically coupled to each other winding 8312, and each winding 8312 has a respective leakage inductance. Saturable magnetic elements 8308 saturate as the magnitude of current flowing through windings 8312 increases, thereby causing the leakage inductance values of windings 8312 to decrease in proportion to the magnitude of current flowing through the windings. Coupled inductor 8300's core may optionally include one or more non-magnetic spacers and/or air gaps (not shown) to control the drop in leakage inductance as the magnitude of current through windings 8312 increases.

Figure 84:
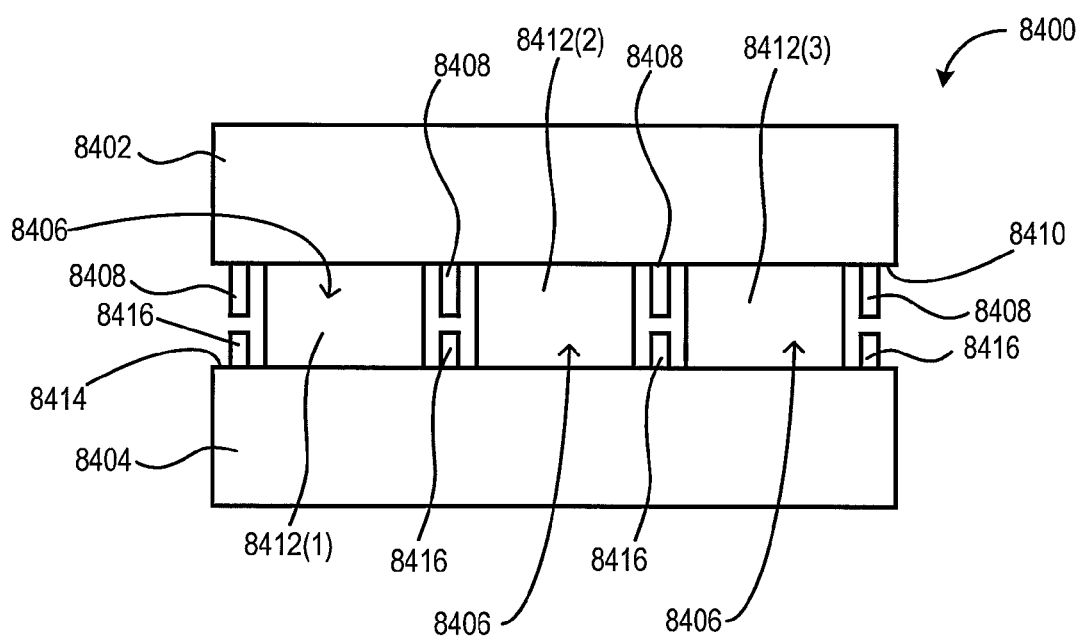
FIG. 84 is a top plan view of one M-phase coupled inductor, according to an embodiment.

FIG. 84 is a top plan view of one M-phase coupled inductor 8400, where M is an integer greater than one. Although coupled inductor 8400 is illustrated as being a three phase coupled inductor (M=3), coupled inductor 8400 can have any number of phases greater than one.

Coupled inductor 8400 is similar to coupled inductor 8300 of FIG. 83. Specifically, coupled inductor 8400 includes a core including end magnetic element 8402, end magnetic element 8404, and M legs 8406 disposed between and connecting end magnetic elements 8402 and 8404. End magnetic element 8402 is, for example, disposed parallel to end magnetic element 8404. Coupled inductor 8400 further includes M windings 8412, where each winding 8412 is at least partially wound about a respective leg 8406. However, only one planar surface of each winding 8412 is visible in the top plan view of FIG. 84.

In contrast to coupled inductor 8300, coupled inductor 8400 includes two sets of saturable magnetic elements. Saturable magnetic elements 8408 are disposed on side 8410 of end magnetic element 8402 and extend towards end magnetic element 8404. Saturable elements 8416 are disposed opposite of saturable elements 8408 on side 8414 of end magnetic element 8404 and extend towards end magnetic element 8402. Each leg 8406 is disposed between a respective pair of saturable magnetic elements 8408 and a respective pair of saturable magnetic elements 8416. Saturable magnetic elements 8408 and 8416 may be, but need not be, formed of a different material than the one or more materials forming end magnetic elements 8402 and 8404 and legs 8406. For example, end magnetic elements 8402 and 8404 and legs 8406 may be formed of first magnetic material, and saturable magnetic elements 8408 and 8416 may be formed of a second magnetic material, where the second magnetic material has a higher permeability than the first magnetic material.

Each winding 8412 is magnetically coupled to each other winding 8412, and each winding 8412 has a respective leakage inductance. Saturable magnetic elements 8408 and 8416 saturate as the magnitude of current flowing through windings 8412 increases, thereby causing the leakage inductance values of windings 8412 to decrease in proportion to the magnitude of current flowing through the windings. The core of coupled inductor 8400 may optionally include one or more non-magnetic spacers and/or air gaps (not shown) to control the drop in leakage inductance as the magnitude of current through windings 8412 increases.

Figure 85:
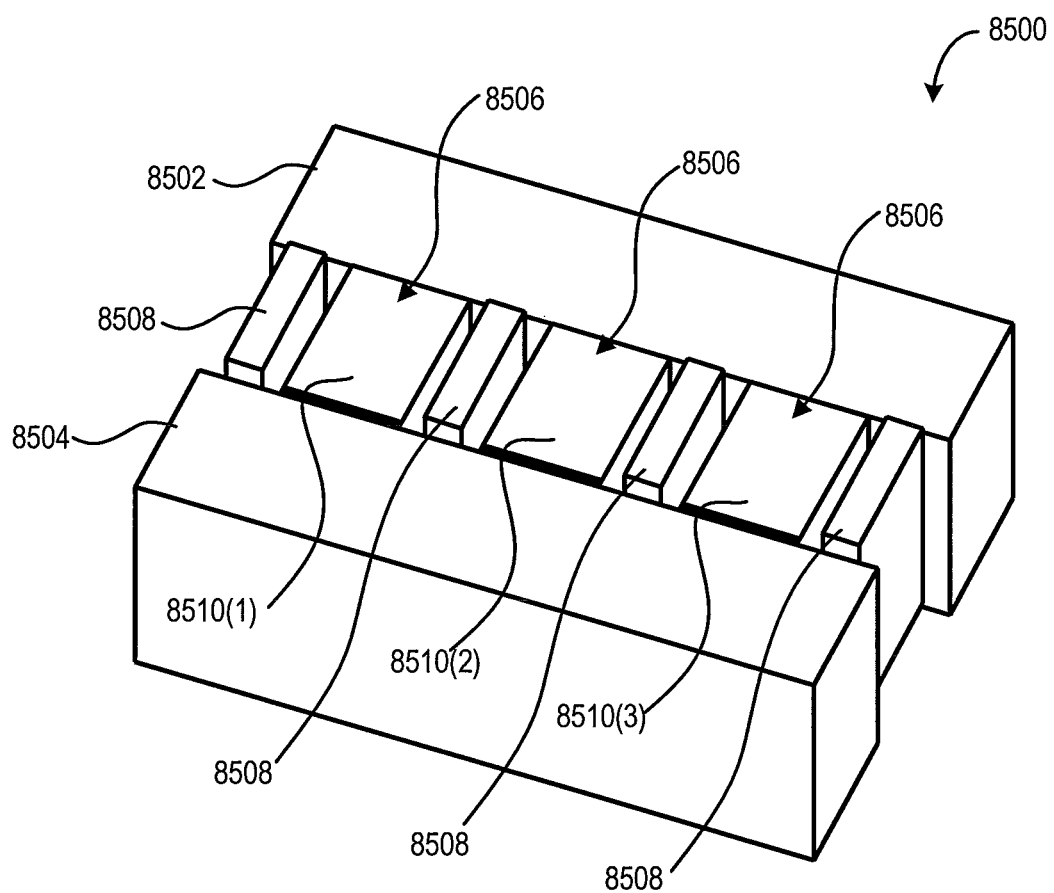
FIG. 85 is a top perspective view of one M-phase coupled inductor, according to an embodiment.

FIG. 85 is a top perspective view of one M-phase coupled inductor 8500, where M is an integer greater than one. Although coupled inductor 8500 is illustrated as being a three phase coupled inductor (M=3), coupled inductor 8500 can have any number of phases greater than one.

Similar to coupled inductors 8300 and 8400 of FIGS. 83 and 84 respectively, the core of coupled inductor 8500 includes end magnetic element 8502, end magnetic element 8504, and M legs 8506 disposed between and connecting end magnetic elements 8502 and 8504. Coupled inductor 8500 additionally includes M windings 8510 at least partially wound about a respective leg 8506. Each winding 8510 is magnetically coupled to each other winding 8510, and each winding 8510 has a respective leakage inductance.

Coupled inductor 8500 further includes M+1 saturable magnetic elements 8508 disposed between end magnetic elements 8502 and 8504. Each leg 8506 is disposed between a respective pair of saturable magnetic elements 8508. Saturable magnetic elements 8508 may be, but need not be, formed of a different material than end magnetic elements 8502 and 8504 and/or legs 8506. For example, saturable magnetic elements 8508 may be formed of a material having a higher permeability than the materials forming end magnetic elements 8502 and 8504 and legs 8506. As another example, end magnetic elements 8502 and 8504 as well as legs 8506 could be formed of a ferrite material, while saturable magnetic elements 8508 are formed of a powered iron material.

Saturable magnetic elements 8508 saturate as the magnitude of current flowing through windings 8506 increases, thereby causing the leakage inductance values of windings 8506 to decrease in proportion to the magnitude of current flowing through the windings. Coupled inductor 8500's core may optionally include one or more non-magnetic spacers and/or air gaps to control the drop in leakage inductance as the magnitude of current through windings 8510 increases.

Figure 86:
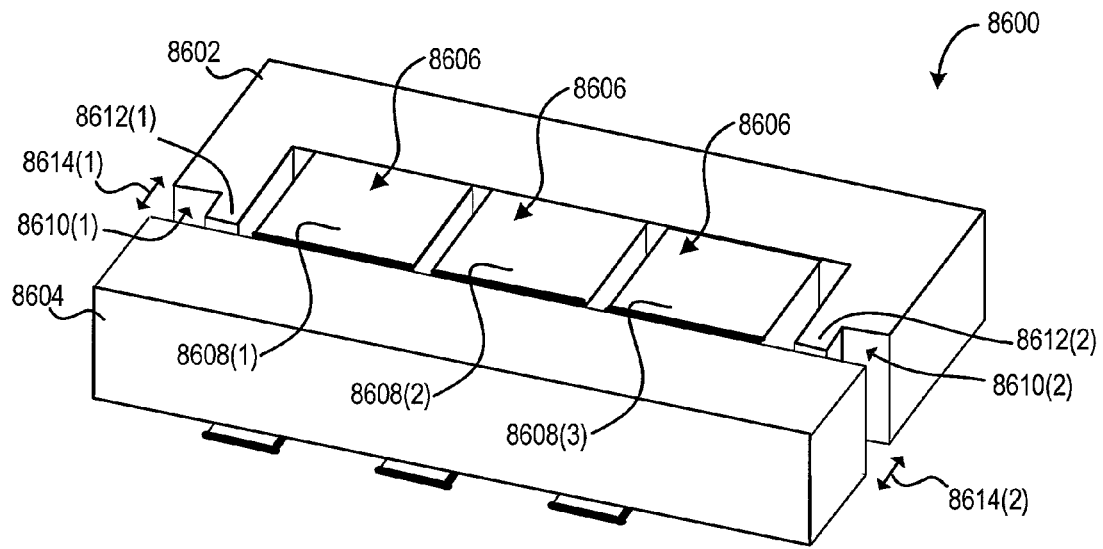
FIG. 86 is a top perspective view of one M-phase coupled inductor, according to an embodiment.

FIG. 86 is a top perspective view of one M-phase coupled inductor 8600, where M is an integer greater than one. Although coupled inductor 8600 is illustrated as being a three phase coupled inductor (M=3), coupled inductor 8600 can have any number of phases greater than one.

Figure 87:
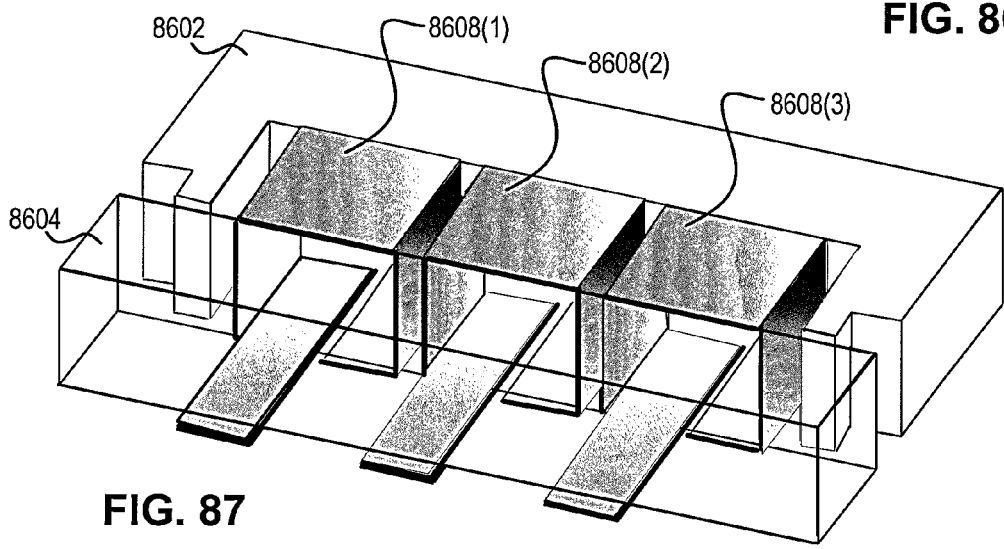
FIG. 87 is a top perspective view of the coupled inductor of FIG. 86, with some of its elements illustrated as being partially transparent in order to show additional details of its windings' structures.

The core of coupled inductor 8600 includes end magnetic element 8602, end magnetic element 8604, and M legs 8606 disposed between and connecting end magnetic elements 8602 and 8604. Coupled inductor 8600 additionally includes M windings 8608 at least partially wound about a respective leg 8606. Each winding 8608 is magnetically coupled to each other winding 8608, and each winding 8608 has a respective leakage inductance. FIG. 87 is a top perspective view of coupled inductor 8600 with end magnetic elements 8604 and legs 8606 illustrated as being partially transparent to show additional structure of windings 8608.

Coupled inductor 8600 further includes gaps 8610 between end magnetic element 8602 and end magnetic element 8604. Gaps 8610 are filled with a non-magnetic material (e.g., air). End magnetic element 8602 further includes at least one extension 8612 protruding into each gap 8610. Extensions 8612 cause each gap 8610 to have a non-uniform thickness 8614. Such non-uniform thicknesses 8614 cause windings 8608 to have non-linear leakage inductance values—that is windings 8608 have relatively large leakage inductance values at low winding current magnitudes and relatively small leakage inductance values at high winding current magnitudes. In other embodiments of coupled inductor 8600, extensions 8612 are discrete elements that are not integrated into end magnetic element 8602. Furthermore, although coupled inductor 8600 is illustrated as including two gaps 8610, other embodiments of coupled inductor 8600 may have solely a single gap 8610 or three or more gaps 8610.

Figure 88:
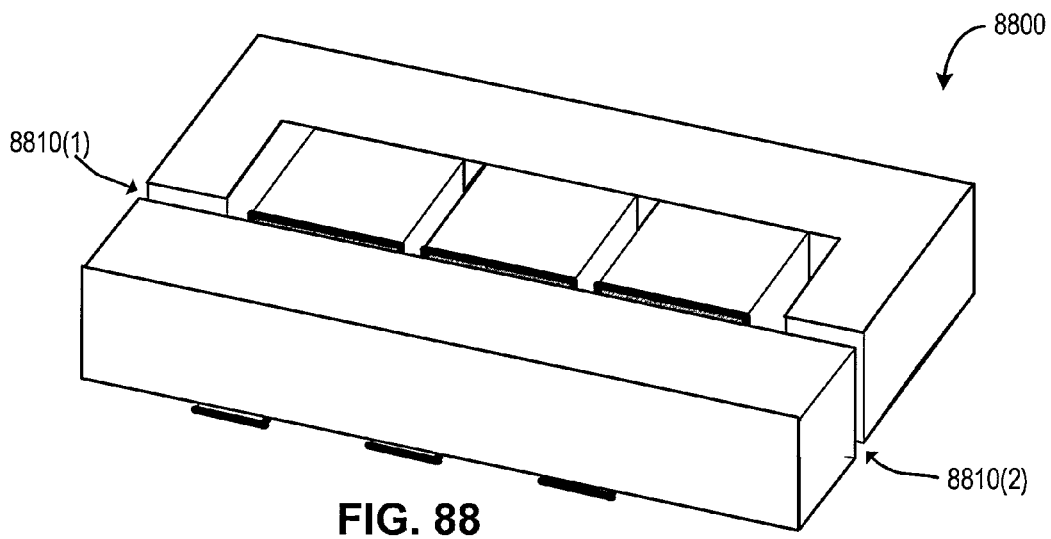
FIG. 88 is a top perspective view of one M-phase coupled inductor, according to an embodiment.

Coupled inductor 8600 may be contrasted to coupled inductor 8800 of FIG. 88. Coupled inductor 8800 is similar to coupled inductor 8600, however, the thicknesses of gaps 8810 of coupled inductor 8800 are uniform—as a result, the windings of coupled inductor 8800 have relatively constant leakage inductance values.

Figure 89:
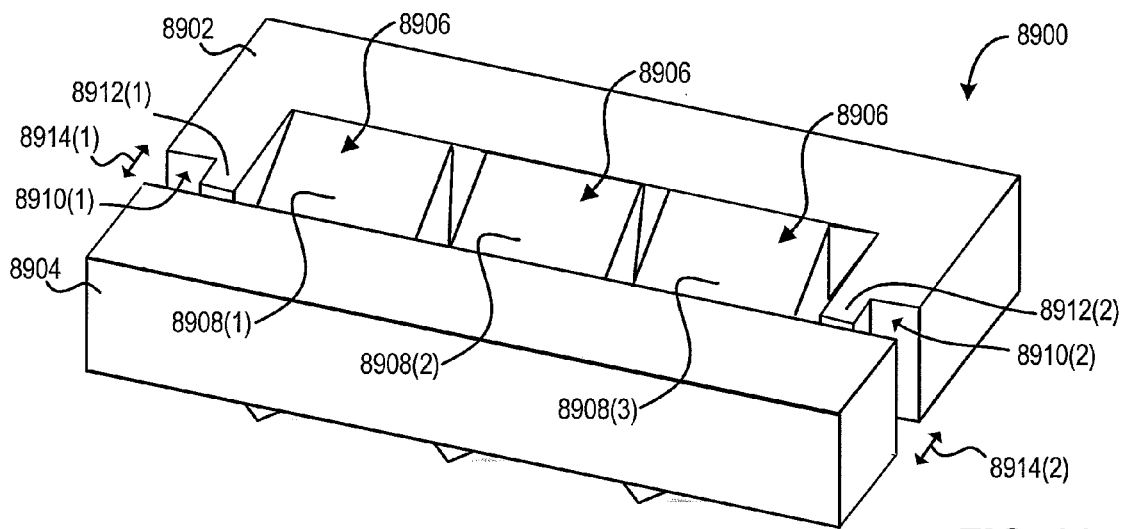
FIG. 89 is a top perspective view of one M-phase coupled inductor, according to an embodiment.

FIG. 89 is a top perspective view of one M-phase coupled inductor 8900, where M is an integer greater than one. Although coupled inductor 8900 is illustrated as being a three phase coupled inductor (M=3), coupled inductor 8900 can have any number of phases greater than one.

Figure 90:
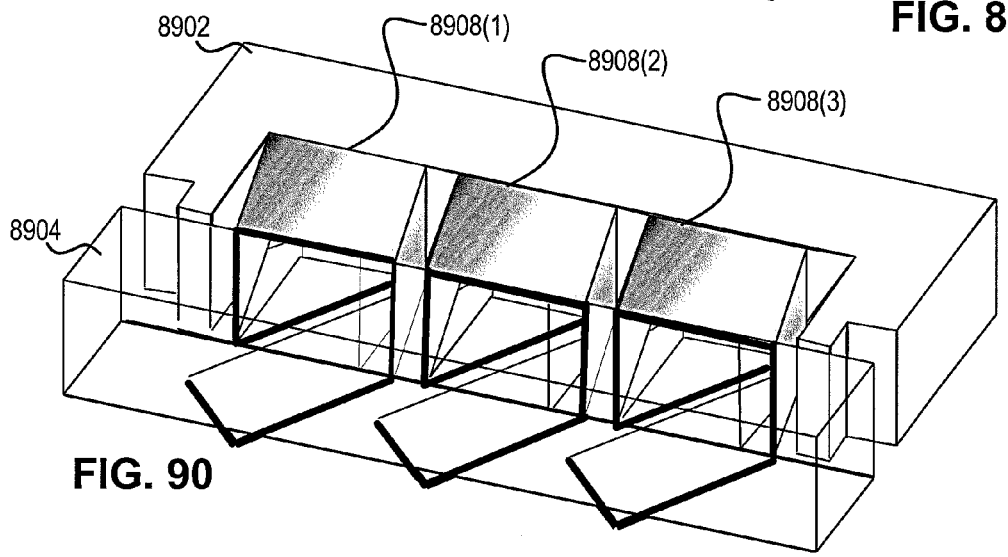
FIG. 90 is a top perspective view of the coupled inductor of FIG. 89, with some of its elements illustrated as being partially transparent in order to show additional details of its windings' structures.

The core of coupled inductor 8900 includes end magnetic element 8902, end magnetic element 8904, and M legs 8906 disposed between and connecting end magnetic elements 8902 and 8904. Coupled inductor 8900 additionally includes M windings 8908 at least partially wound about a respective leg 8906. Each winding 8908 is magnetically coupled to each other winding 8908, and each winding 8908 has a respective leakage inductance. FIG. 90 is a top perspective view of coupled inductor 8900 with end magnetic elements 8904 and legs 8906 illustrated as being partially transparent to show additional structure of windings 8908. As can be observed, windings 8908 are angularly displaced from the outer surface of their respective legs 8906.

Coupled inductor 8900 further includes gaps 8910 between end magnetic element 8902 and end magnetic element 8904. Gaps 8910 are filled with a non-magnetic material (e.g., air). End magnetic element 8902 further includes at least one extension 8912 protruding into each gap 8910. Extensions 8912 cause each gap 8910 to have a non-uniform thickness 8914. Such non-uniform thicknesses 8914 cause windings 8908 to have non-linear leakage inductance values—that is windings 8908 have relatively large leakage inductance values at low winding current magnitudes and relatively small leakage inductance values at high winding current magnitudes. In other embodiments of coupled inductor 8900, extensions 8912 are discrete elements that are not integrated into end magnetic element 8902. Furthermore, although coupled inductor 8900 is illustrated as including two gaps 8910, other embodiments of coupled inductor 8900 may have solely a single gap 8910 or three or more gaps 8910.

Figure 91:
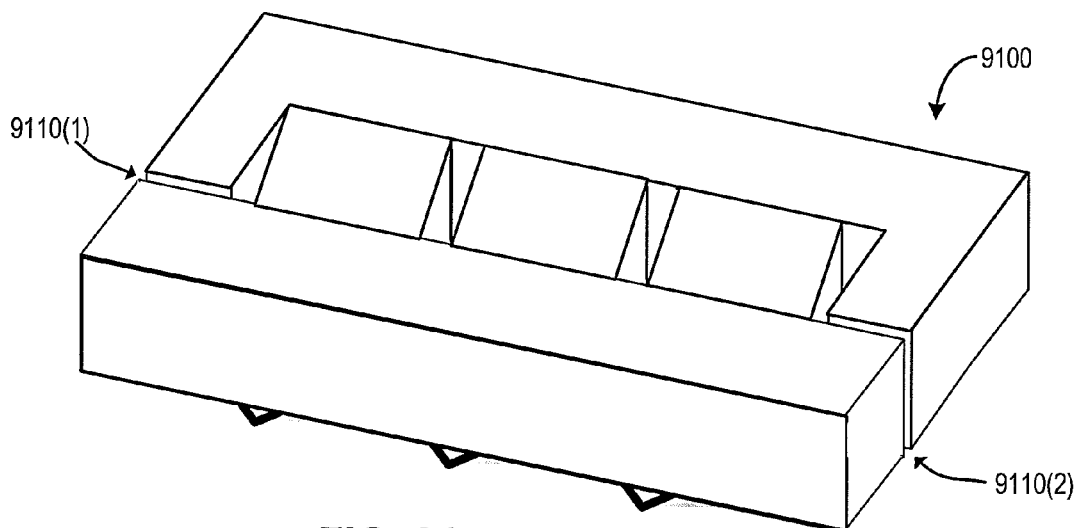
FIG. 91 is a top perspective view of one M-phase coupled inductor, according to an embodiment.

Coupled inductor 8900 may be contrasted to coupled inductor 9100 of FIG. 91. Coupled inductor 9100 is similar to coupled inductor 8900, however, the thicknesses of gaps 9110 of coupled inductor 9100 are uniform—as a result, the windings of coupled inductor 9100 have relatively constant leakage inductance values.

Changes may be made in the above methods and systems without departing from the scope hereof. Note that the matter contained in the above description or shown in the accompanying drawings should be interpreted as illustrative and not in a limiting sense. For example, those skilled in the art should appreciate that items as shown in the embodiments may be constructed, connected, arranged, and/or combined in other formats without departing from the scope of this disclosure. The following claims are intended to cover generic and specific features described herein, as well as all statements of the scope of the present method and system, which, as a matter of language, might be said to fall there between.

What is claimed is:
1. A DC-to-DC converter, comprising:
an output filter;
a coupled inductor including:
  a magnetic core, including:
    first and second end magnetic elements separated from each other in a first direction,
    M magnetic teeth disposed between the first and second end magnetic elements in the first direction, M being an integer greater than one, and
    a plurality of saturable magnetic elements each disposed between the first and second end magnetic elements in the first direction, each of the plurality of saturable magnetic elements providing a respective path for leakage magnetic flux within the magnetic core, and
  M windings, each winding having a first and a second terminal, each second terminal being electrically coupled to the output filter, each winding being wound at least partially about at least a portion of a respective one of the M magnetic teeth, each winding being magnetically coupled to each other winding by the magnetic core, each winding having a respective leakage inductance,
  the magnetic core being configured and arranged such that a respective leakage inductance value of each winding decreases with increasing current through the winding in a range of currents through the winding anticipated during normal operation of the DC-to-DC converter and the coupled inductor; and
M switching subsystems, each switching subsystem coupling the first terminal of a respective winding to an input power source, the switching subsystems for alternately charging and discharging their respective windings.
2. The DC-to-DC converter of claim 1, M being greater than two.

3. The DC-to-DC converter of claim 2, wherein:
the first end magnetic element, the second end magnetic element, and the M magnetic teeth are each formed of a first material that does not saturate during anticipated normal operation of the DC-to-DC converter; and
the plurality of saturable magnetic elements are formed of a second material that saturates as current through the windings increases during anticipated normal operation of the DC-to-DC converter and the coupled inductor, the first material being different than the second material.

4. The DC-to-DC converter of claim 2, each switching subsystem comprising a high side switch and a low side switch configured such that the DC-to-DC converter operates as a multi-phase buck converter, the coupled inductor being a coupled buck inductor.

5. The DC-to-DC converter of claim 2, each second terminal being electrically connected within the coupled inductor.

6. The DC-to-DC converter of claim 2, each second terminal being electrically connected external to the coupled inductor.

7. The DC-to-DC converter of claim 1, wherein each of the plurality of saturable magnetic elements is disposed in a second direction between a respective two of the M magnetic teeth, the second direction being orthogonal to the first direction.

8. The DC-to-DC converter of claim 1, wherein the plurality of saturable magnetic elements comprises a first and a second saturable magnetic element disposed at opposing ends of the coupled inductor and forming a respective gap of non-uniform thickness in the first direction, each of the M magnetic teeth being disposed between the first and second saturable magnetic elements in a second direction orthogonal to the first direction.

9. An inductor having a non-linear inductance value, comprising:
a first magnetic element formed of a first material that does not saturate during anticipated normal operation of the inductor, the first magnetic element including a base and first and second legs collectively having a u-shape as seen when the first magnetic element is cross-sectionally view in a first direction;
a second magnetic element formed of a second material that saturates as the magnitude of current flowing through the inductor increases in a range of currents anticipated in normal operation of the inductor, the first material being different than the second material, the second magnetic element disposed on the first and second legs of the first magnetic element;
a third magnetic element formed of the first material and disposed on the second magnetic element, such that the second magnetic element separates the first and second legs from the third magnetic element; and
a winding wound through the magnetic core in the first direction,
the first, second, and third magnetic elements being collectively configured and arranged such that the inductor has an inductance value that decreases as magnitude of current through the inductor increases in the range of currents anticipated in normal operation of the inductor.

10. The inductor of claim 9, the winding forming less than one complete turn around the magnetic core.

11. An inductor having a non-linear inductance value, comprising:
a first magnetic element including a base and first and second legs collectively having a u-shape as seen when the first magnetic element is cross-sectionally viewed in a first direction;
a winding wound through the first magnetic element in the first direction;
a second magnetic element separated from each of the first and second legs in the second direction by at least one gap, the at least one gap having a gap cross-sectional area as seen when the inductor is cross-sectionally viewed in the second direction, the second direction being orthogonal to the first direction; and
a saturable magnetic element bridging the at least one gap in the second direction, the saturable magnetic element having a cross-sectional area as seen when the saturable magnetic element is cross-sectionally viewed in the second direction that is less than the gap cross-sectional area, the saturable magnetic element configured and arranged such that the inductor has an inductance value that decreases as magnitude of current through the inductor increases in a range of currents anticipated in normal operation of the inductor.

12. The inductor of claim 11, the at least one gap comprising two gaps symmetric with respect to a center axis of the inductor.

13. The inductor of claim 11, the saturable magnetic element being disposed on a respective outer surface of each of the first and second magnetic elements.

\* \* \* \* \*

UNITED STATES PATENT AND TRADEMARK OFFICE
CERTIFICATE OF CORRECTION

PATENT NO. : 9,627,125 B2
APPLICATION NO. : 14/486175
DATED : April 18, 2017
INVENTOR(S) : Alexandr Ikriannikov et al.

It is certified that error appears in the above-identified patent and that said Letters Patent is hereby corrected as shown below:

In the Claims

At Column 35, Line 42:
Delete "view in a first" and insert --viewed in a first--

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*